US012572955B1

(12) United States Patent
Taler

(10) Patent No.: US 12,572,955 B1
(45) Date of Patent: Mar. 10, 2026

(54) METHODS AND SYSTEMS FOR CUSTOMIZED SPATIAL COMPUTING OFFERS

(71) Applicant: Synchrony Bank, Stamford, CT (US)

(72) Inventor: Jordan H. Taler, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 0 days.

(21) Appl. No.: 18/971,733

(22) Filed: Dec. 6, 2024

(51) Int. Cl.
| | |
|---|---|
| *G06Q 30/02* | (2023.01) |
| *G06Q 30/0251* | (2023.01) |
| *G06Q 30/0601* | (2023.01) |
| *G06V 20/20* | (2022.01) |
| *G06V 20/50* | (2022.01) |
| *G06V 40/16* | (2022.01) |

(52) U.S. Cl.
CPC ..... *G06Q 30/0255* (2013.01); *G06Q 30/0643* (2013.01); *G06V 20/20* (2022.01); *G06V 20/50* (2022.01); *G06V 40/174* (2022.01)

(58) Field of Classification Search
CPC ........... G06Q 30/0255; G06Q 30/0643; G06Q 30/0207–30/0277; G06V 20/20; G06V 20/50; G06V 40/174
See application file for complete search history.

(56) References Cited

U.S. PATENT DOCUMENTS

| | | | | |
|---|---|---|---|---|
| 11,922,447 B1 * | 3/2024 | Chiu | .................. | G06Q 30/0224 |
| 12,039,564 B2 * | 7/2024 | Keng | ........................ | G06N 5/01 |
| 2013/0231999 A1 * | 9/2013 | Emrich | .............. | G06Q 30/0271 705/14.43 |
| 2019/0130448 A1 * | 5/2019 | Kairinos | ............ | G06Q 30/0261 |
| 2019/0197561 A1 * | 6/2019 | Adato | ........................ | G06T 7/73 |
| 2019/0304198 A1 * | 10/2019 | Costa | ...................... | G06F 1/163 |
| 2020/0380541 A1 * | 12/2020 | Laing | ................. | G06Q 30/0244 |
| 2021/0118004 A1 * | 4/2021 | Qi | ....................... | G06Q 30/0236 |
| 2021/0400195 A1 * | 12/2021 | Adato | ................. | H02J 7/00036 |
| 2022/0198506 A1 * | 6/2022 | Yuvaraj | .................... | G06F 9/547 |
| 2023/0368268 A1 * | 11/2023 | Wang | ................. | G06Q 30/0631 |
| 2024/0078568 A1 * | 3/2024 | Bryant | .............. | G06Q 30/0218 |
| 2024/0185285 A1 * | 6/2024 | Keng | ................. | G06Q 30/0244 |
| 2024/0320701 A1 * | 9/2024 | Murakami | ............. | G06Q 30/06 |
| 2024/0362676 A1 * | 10/2024 | Bangad | .............. | G06Q 30/0211 |
| 2024/0420223 A1 * | 12/2024 | Terborg | ........... | G06Q 30/02017 |
| 2025/0029170 A1 * | 1/2025 | Chachek | ............... | H04W 4/024 |
| 2025/0037164 A1 * | 1/2025 | Hopkins | ............ | G06Q 30/0261 |
| 2025/0116868 A1 * | 4/2025 | Amayeh | .............. | G06V 40/169 |
| 2025/0139657 A1 * | 5/2025 | Chen | .................. | G06Q 30/0211 |
| 2025/0315855 A1 * | 10/2025 | Mishra | ................... | G06N 3/092 |

* cited by examiner

*Primary Examiner* — Thuy N Nguyen
(74) *Attorney, Agent, or Firm* — Polsinelli LLP

(57) ABSTRACT

A device may capture real-time images of a product. Capturing may include using an outward-facing sensor on a device. A device may identify the product by using an identification machine learning model. A device may obtain user interaction data corresponding to previous images displayed on the device. A device may identify available offers. A device may identify a set of offers from the available offers using an offer selection machine learning model trained to automatically select offers presentable to users through devices. The offer selection machine learning model may be trained using a dataset of historical interaction data and corresponding offers. A device may present the set of offers through the device. A device may monitor in real-time user interaction with the set of offers. A device may update the offer selection machine learning model according to the real-time user interaction with the set of offers.

20 Claims, 20 Drawing Sheets

700

RECEIVE API CALL TO OBTAIN OFFERS
PRESENTABLE TO USER
702

NEW USER?
704

YES

GENERATE NEW COOKIE WITH
USER ID AND SESSION ID
706

NO

NEW SESSION?
708

NO

YES

PERSIST NEW SESSION ID IN COOKIE ASSOCIATED WITH
USER ID
710

IDENTIFY OFFER PARAMETERS FOR PRESENTATION OF
OFFER(S)
712

TRANSMIT REQUEST TO GENERATE OFFER(S) TO OFFER
GENERATION SYSTEM
714

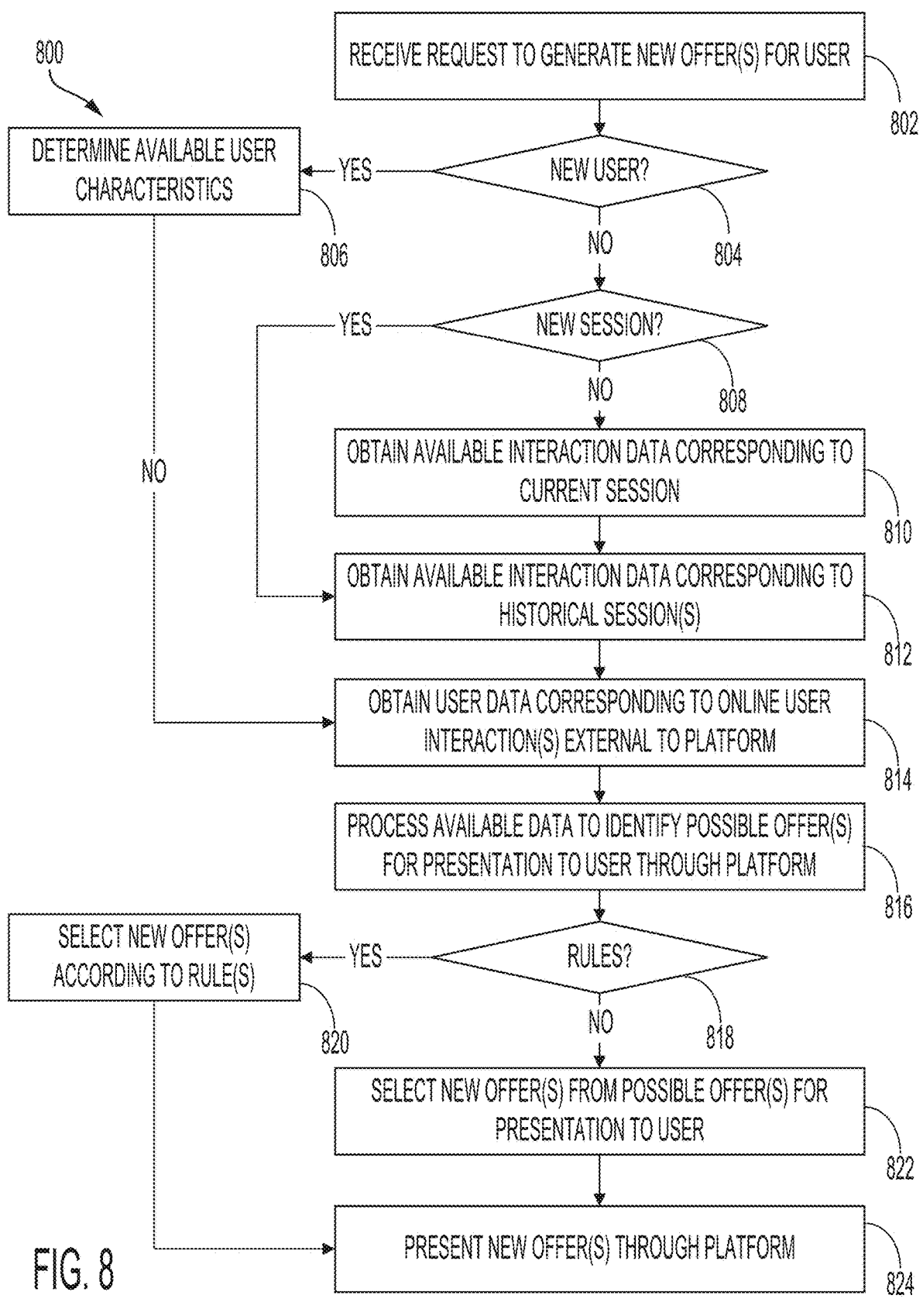

800

DETERMINE AVAILABLE USER CHARACTERISTICS

806

RECEIVE REQUEST TO GENERATE NEW OFFER(S) FOR USER

802

NEW USER?    804

YES

NO

NEW SESSION?    808

YES

NO

OBTAIN AVAILABLE INTERACTION DATA CORRESPONDING TO CURRENT SESSION

810

OBTAIN AVAILABLE INTERACTION DATA CORRESPONDING TO HISTORICAL SESSION(S)

812

NO

OBTAIN USER DATA CORRESPONDING TO ONLINE USER INTERACTION(S) EXTERNAL TO PLATFORM

814

PROCESS AVAILABLE DATA TO IDENTIFY POSSIBLE OFFER(S) FOR PRESENTATION TO USER THROUGH PLATFORM

816

SELECT NEW OFFER(S) ACCORDING TO RULE(S)

820

RULES?    818

YES

NO

SELECT NEW OFFER(S) FROM POSSIBLE OFFER(S) FOR PRESENTATION TO USER

822

PRESENT NEW OFFER(S) THROUGH PLATFORM

Sample Data 1905 (e.g., data extracted from data store(s))

Analysis 1940 based on Sample Data 1905

Training Data 1970 used by ML Engine 1920 for initial training 1965 of ML Model(s) 1925

Sample Data

Analysis based on Sample Data

Machine Learning (ML) Engine 1920

Machine Learning (ML) Model(s) 1925

Validation 1975:
Does the Analysis 1930 match the Analysis 1940?
Has Feedback 1950 been received regarding the Analysis 1930?

Further training 1955 of ML Model(s) 1935 by ML Engine 1930 based on Validation 1975

Analysis 1930 based on Sample Data 1905 (e.g., pattern 1980, summaries, deviations, trends, predictions, pivots, etc.)

FIG. 19

METHODS AND SYSTEMS FOR CUSTOMIZED SPATIAL COMPUTING OFFERS

FIELD

The present disclosure relates generally to presenting a set of offers according to the user online interactions.

BACKGROUND

In the digital marketplace, businesses frequently use online advertisements to engage customers and promote products. These ads, displayed while customers browse products on various webpages, are intended to capture attention and drive sales. However, the effectiveness of these ads is often compromised by their poor quality and lack of relevance, leading to high rates of ad blindness and user disengagement.

A significant issue with these online ads is their generic nature. Many ads fail to consider the individual preferences and browsing behaviors of customers, resulting in promotions that do not align with their interests or needs. This lack of personalization diminishes the perceived value of the ads, causing customers to ignore them. Consequently, businesses struggle to achieve meaningful engagement and conversion rates from their advertising efforts.

Moreover, the overwhelming volume of ads displayed on digital marketplaces can lead to ad fatigue, where customers become desensitized to promotional content. This oversaturation not only frustrates users but also reduces the likelihood of ad interaction. As customers encounter numerous irrelevant ads, they are more likely to develop negative perceptions of the brand, further hindering the effectiveness of online advertising campaigns.

To address these challenges, a more sophisticated approach to ad targeting and delivery is required. By leveraging advanced data analytics, spatial computing, and machine learning algorithms, businesses can create highly personalized and relevant ads that resonate with individual customers. Enhancing the quality and targeting of digital offers can improve customer satisfaction, increase engagement rates, and ultimately drive higher conversion rates.

SUMMARY

Methods and systems described herein may improve the quality of offers presented to a customer through using mixed-reality, spatial computing, and other technology. Higher quality offers result in computational efficiency and transactional efficiency, improving outcomes for both the customer and merchant. Mixed-reality and spatial computing technologies provide for increased data and an improved understanding of what products and offers are relevant to a customer.

In some aspects, the techniques described herein relate to a computer-implemented method. The method may include capturing real-time images of a product in surroundings of a user. Capturing may include using one or more outward-facing sensors on a device. The method may include identifying the product by using an identification machine learning model. The method may also include obtaining user interaction data corresponding to previous images displayed on the device. The method may further include identifying available offers. Additionally, the method may include identifying a set of offers from the available offers. The set of offers may be identified by inputting the product, the user interaction data, and the available offers through an offer selection machine learning model trained to automatically select offers presentable to users through devices. The offer selection machine learning model may be trained using a dataset of historical interaction data and corresponding offers presented to different users. The method may include presenting the set of offers through the device. The method may also include monitoring in real-time user interaction with the set of offers. The method may further include updating the offer selection machine learning model according to the real-time user interaction with the set of offers.

In some aspects, embodiments relate to a system including one or more processors and a non-transitory computer readable medium storing a plurality of instructions that, as a result of being executed by the one or more processors, causes the system to perform a method described herein.

In some aspects, embodiments relate to a non-transitory, computer-readable medium storing a plurality of instructions that, as a result of being executed by one or more processors of a computer system, cause the computer system to perform a method described herein.

BRIEF DESCRIPTION OF THE DRAWINGS

Illustrative embodiments are described in detail below with reference to the following figures.

FIG. 8 shows an illustrative example of a process for selecting a set of offers based on user interaction data corresponding to user interactions on a website associated with a payment instrument service and on external websites in accordance with at least one embodiment;

FIG. 19 is a block diagram illustrating a machine learning model according to embodiments of the present invention.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Disclosed embodiments may provide a framework through which a dynamic offers API is implemented to process, in real-time, requests to select and present a set of offers tailored according to user interactions with different websites or application landing pages associated with a payment instrument service.

Figure 1:
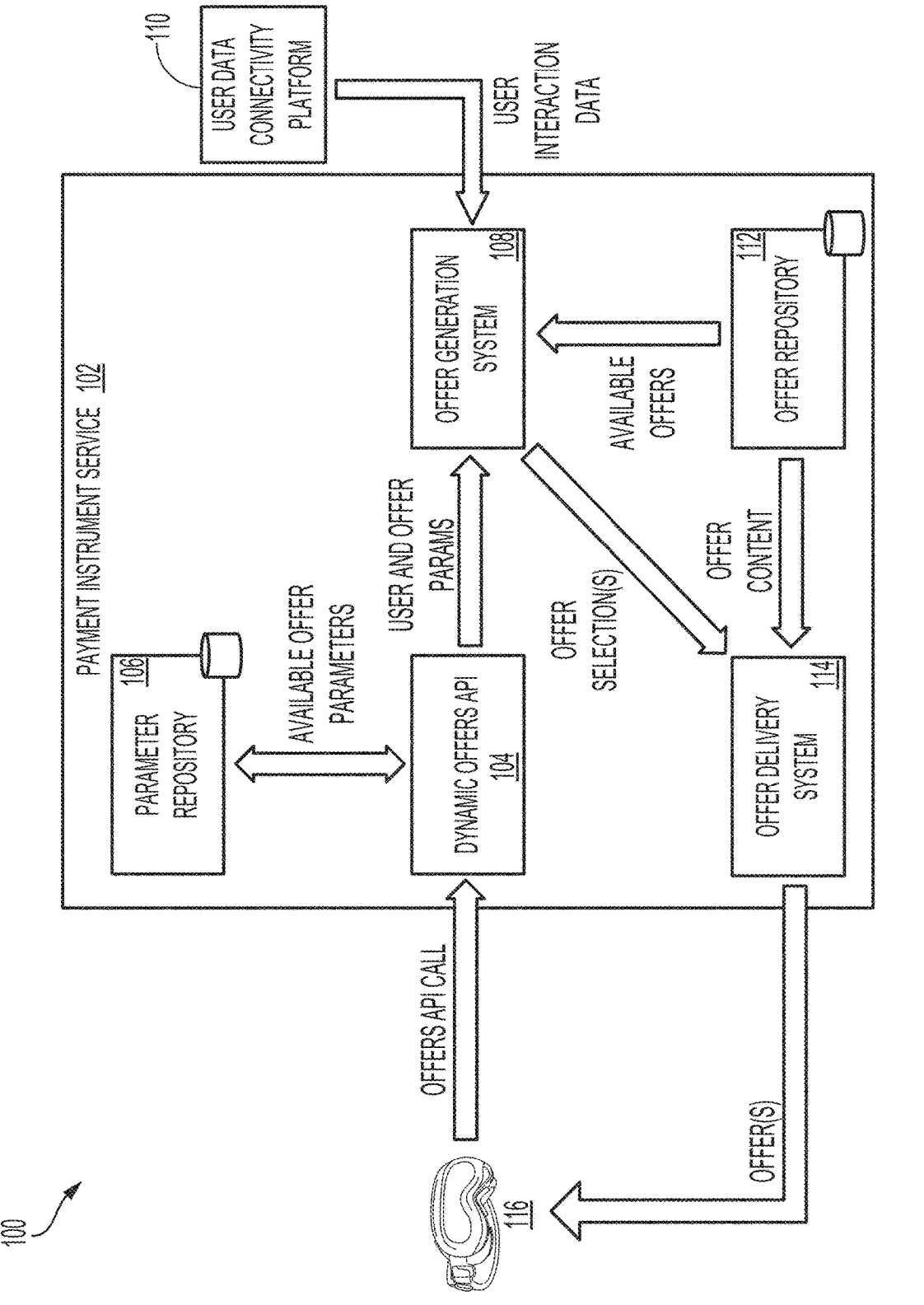
FIG. 1 shows an illustrative example of an environment in which a dynamic offers application programming interface (API) processes an API call to present a set of offers through a website or application of a mixed-reality device implemented by a payment instrument service in accordance with at least one embodiment.

FIG. 1 shows an illustrative example of an environment 100 in which a dynamic offers API 104 processes an API call to present a set of offers through a website implemented by a payment instrument service 102 in accordance with at least one embodiment. In the environment 100, a user 116, through a browser application or native application executed on a mixed-reality device utilized by the user 116, may submit a request to access a website or other landing page associated with a payment instrument service 102. For instance, through a browser application, the user 116 may enter the Uniform Resource Identifier (URI) corresponding to a website provided by the payment instrument service 102. In some examples, if the user 116 has installed, onto their computing device (e.g., a mixed-reality device), a native application provided by the payment instrument service 102 for accessing the payment instrument service 102, the native application may automatically transmit a request to the payment instrument service 102 to access a landing page or other interface (such as a graphical user interface (GUI)) on a mixed-reality device application provided by the payment instrument service 102. In embodiments, the website or landing page may be displayed on the screen of the mixed-reality device. In some embodiments, text of the website or landing page may be broadcast through an audio speaker of the mixed-reality device.

A mixed-reality device may be a device that merges a real-world environment and a computer-generated one. Computer-generated images, graphics, or text may be superimposed over a real-world environment. In some embodiments, a mixed-reality device may include image capture ability, speech interpretation, and computer-generated voiceovers. Mixed-reality devices may include a camera, a speaker (which may be directed to only the user), a microphone, and/or a display. Mixed-reality devices may have the form of a headset or glasses. Examples of mixed-reality devices may include Meta Quest headsets, Apple Vision Pro headsets, Ray-Ban Metas glasses, Meta Orion AI Glasses, or other suitable devices. In some embodiments, a mixed-reality device may be a combination of two or more separated components. For example, a mixed-reality device may include a camera and a separate display. The camera and the display may be in communication with each other through Bluetooth, cellular, WiFi, or other suitable means. As an example, the mixed-reality device may include a Ray-Ban Metas glasses (e.g., glasses that do not include a display) and a smartphone. The smartphone may display the captured images from the glasses in real time with graphics superimposed over the images.

Methods and systems described herein may improve spatial computing technology by adding to the capabilities of spatial computing and mixed-reality devices, transaction technology by making product offers more efficient in terms of time and value to both merchants and customers, and computing technology by reducing time and power spent displaying less relevant offers.

The payment instrument service 102, in an embodiment, is a service that processes applications for payment instruments, issues payment instruments, determines user-specific allowances to payment instruments, processes transactions associated with payment instruments, processes cancellations of accounts associated with payment instruments, and performs other such operations. In an embodiment, the payment instrument service 102 further provides an online marketplace, through which different brands and other entities associated with the payment instrument service 102 can present various offers related to different payment instruments and financing options that may be made available to users. Further, through the online marketplace, the different brands and other entities may provide offers related to different goods and/or services provided by these different brands and other entities. In some instances, the different payment instruments and financing options associated with these different brands and other entities, and that may be offered to users, are facilitated by the payment instrument service 102.

Figure 13:
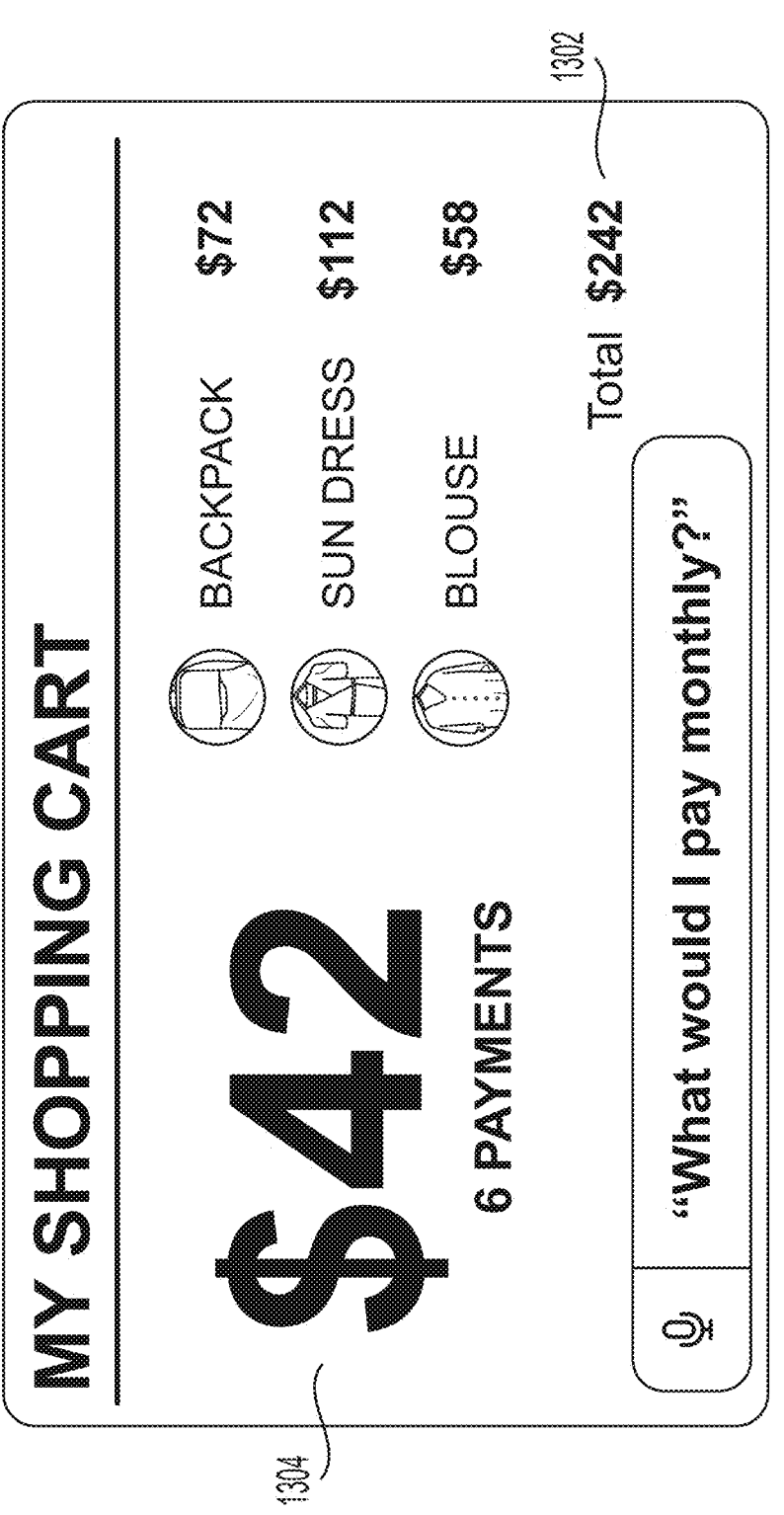
FIG. 13 shows a visualization of a shopping cart according to embodiments of the present invention.

In an embodiment, the payment instrument service 102 is a service such as the service 1312 described herein at least in connection with FIG. 13. In an embodiment, the payment instrument service 102 is a service provided by a merchant. In an embodiment, the payment instrument service 102 is a service provided by a computing resources provider such as the computing resource provide 1328 described herein at least in connection with FIG. 13 (e.g., a service such as service 1330 and/or service 1332 described herein at least in connection with FIG. 13). In an embodiment, the payment instrument service 102 is a payment instrument service such as the payment instrument service 1338 described herein at least in connection with FIG. 13. In some instances, the payment instrument service 102 may be a service operated by the issuer of the payment instruments described herein. In some instances, the payment instrument service 102 may be a service operated by a third-party on behalf of the issuer of the payment instruments described herein.

In an embodiment, the payment instrument service 102 exposes a dynamic offers API 104 through which the user 116 (through their browser application, native application provided by the payment instrument service 102, graphics or sound projected using the device) can submit one or more API calls to identify a set of offers that may be presented to the user 116 through the landing page or any other website provided by the payment instrument service 102. When the user 116 submits a request to the payment instrument service 102 to access the website or other landing page associated with the payment instrument service 102, the browser application or native application executed on the user's computing device may automatically, and in real-time, transmit an API call to the dynamic offers API 104 to identify a set of offers that may be presented to the user 116 through the website or other landing page. In response to this API call, the dynamic offers API 104 may automatically query a parameter repository 106 implemented by the payment instrument service 102 to identify the available offer parameters used by the payment instrument service 102 to categorize and organize the different offers made available by different brands and other entities for presentation through the website or other landing page associated with the payment instrument service 102. For example, the available offer parameters may include the types of offers made available (e.g., financing offers, discounts, deals, etc.), the offer categories (e.g., décor, automotive, apparel, electronics, health and fitness, home furnishings, etc.), the brands or other entities associated with the payment instrument service 102, and the like. The available offer parameters may further include an indication of whether the payment instrument service 102 provides its own set of offers according to any of the defined offer types and/or categories.

The different parameters included in the parameter repository 106 may be defined by the payment instrument service 102 according to the configuration of the website and any other landing pages or subsites provided by the payment instrument service 102 and through which different offers may be presented. For example, the initial landing page (e.g., homepage) provided by the payment instrument service 102 may allow for the presentation of a featured set of offers without indication of the type or category of offers being presented. Thus, the parameter repository 106 may indicate, for this initial landing page, that the offer parameters include the brands or other entities associated with the payment instrument service 102 for which offers may be presented. Further, the offer parameters may further include an indication as to whether offers associated with the payment instrument service are available for presentation through the initial landing page. As another illustrative example, if the user 116 navigates to the online marketplace provided by the payment instrument service 102, and through which different offers may be presented according to different types, categories, and brands, the parameter repository 106 may indicate, for the landing page associated with the online marketplace, the various parameters corresponding to these different offer types, offer categories, and brands associated with the available offers presentable through the online marketplace. Thus, the query submitted through the dynamic offers API 104 may provide an indication of the website or other landing page being accessed by the user 116 (e.g., URI, application page indicator, etc.).

In an embodiment, the API call from the user 116 submitted through the dynamic offers API 104 can include identifying information associated with the user 116, as well as identifying information corresponding to an ongoing online session with the payment instrument service 102. For instance, when the user 116 accesses the payment instrument service 102, the API call from the user 116 submitted through the dynamic offers API 104 may include fields corresponding to a user identifier associated with the user 116 and a session identifier associated with an ongoing online session with the payment instrument service 102. These identifiers may be generated by the payment instrument service 102. For instance, if the user 116 is accessing the payment instrument service 102 for the first time, the API call submitted through the dynamic offers API 104 may include null values for these identifiers (e.g., no user identifier or session identifier has been generated for the user 116 and the present online session with the payment instrument service 102). Accordingly, the payment instrument service 102 may automatically generate new user and session identifiers for the user 116 and the ongoing online session between the user 116 and the payment instrument service 102. These new identifiers may be persisted in a browser cookie if the user 116 is accessing the payment instrument service 102 through a browser application executed on their computing device. Alternatively, these new identifiers may be stored in application storage if the user 116 is accessing the payment instrument service 102 through a native application executed on the user's mixed-reality device and provided by the payment instrument service 102.

The user identifier and the session identifier may be universally unique identifiers (UUIDs), which may also be referred to as globally unique identifiers (GUID). A UUID may be generated using any suitable technique for generating a unique identifier. A UUID may not be mathematically guaranteed to be unique but may have a probability of being not unique that is low enough to be considered unique within the context of users associated with the payment instrument service 102 and of online sessions with the payment instrument service 102 by these users. As an example, the UUIDs generated by the payment instrument service 102 may be version 4 UUIDs, which include thirty-two hexadecimal characters representing 128 bits. In one or more embodiments, the bits that comprise the version 4 UUID are randomly generated. Therefore, there are $2^{128}$ possible combinations of bits, leaving the probability that two such generated UUIDs are the same very low within reasonable time and computation power constraints. A UUID used as the initial identifier may be generated using other techniques for UUID generation. For example, a version 1 UUID is generated based on a Media Access Control (MAC) address of a computing device (or component therein) in combination with an exact time of generation, which would not be duplicated unless the two UUIDs were generated using the same device, having the same MAC address, at the same time. Any other technique for generating a UUID may be used without departing from the scope of embodiments described herein.

In an embodiment, if the user 116 maintains an existing user identifier in a browser cookie (in the case of a request to access the website or other landing page associated with the payment instrument service 102) or in application storage (in the case of a request to access a landing page through a native application) but not persist a session identifier corresponding to an existing online session with the payment instrument service 102, the payment instrument service 102 automatically generates a new session identifier corresponding to this new online session with the payment instrument service 102. The payment instrument service 102, through an API response transmitted through the dynamic offers API 104, may persist this new session identifier in the existing browser cookie associated with the user's browser application or application storage associated with the native application.

In an embodiment, the dynamic offers API 104 automatically transmits the user identifier associated with the user 116, the session identifier corresponding to the present online session with the payment instrument service 102, and the identified available offer parameters to an offer generation system 108 for selection of one or more offers that may be presented to the user 116 through the website or native application. The offer generation system 108 may be implemented on a computer system or other system (e.g., server, virtual machine instance, etc.) associated with the payment instrument service 102. Alternatively, the offer generation system 108 may be implemented as an application or other executable process executed on one or more computer systems associated with the payment instrument service 102. In an embodiment, the offer generation system 108 uses the provided user identifier and session identifier to obtain any current and historical interaction data associated with the user 116. For instance, as the user 116 interacts with payment instrument service 102 (e.g., accesses an existing payment instrument account, interacts with the online marketplace, etc.), the offer generation system 108 may automatically monitor and record these interactions within a database, cache, or other repository in association with the user and session identifiers. Thus, the offer generation system 108 may use the provided user identifier and session identifier to query the database, cache, or other repository used to maintain user interaction data to obtain the historical and current user interaction data associated with the user 116.

In an embodiment, if the user 116 has not previously interacted with the payment instrument service 102 (i.e., the user identifier and the session identifier provided through the dynamic offers API 104 are null), the offer generation system 108 can obtain alternative information that may be used to uniquely identify the user 116. For example, the offer generation system 108 may identify the Internet Protocol (IP) address of the user 116 based on the communications between the user 116 and the payment instrument service 102. As another illustrative example, through monitoring of user interactions with the payment instrument service 102, if the user 116 provides any identifying information (e.g., name, electronic mail address, physical address, etc.), the offer generation system 108 may automatically associate this identifying information with the user 116 during the ongoing session with the payment instrument service 102. In some instances, the offer generation system 108 may automatically associate this identifying information with the new user and session identifiers generated by the payment instrument service 102 and for the user 116 and the ongoing online session between the user 116 and the payment instrument service 102. Similarly, if the payment instrument service 102 generated a new session identifier for the new ongoing session between the user 116 and the payment instrument service 102, the offer generation system 108 may automatically associate the user's present interactions with the payment instrument service 102 with this session identifier through the database, cache, or other repository.

In an embodiment, the offer generation system 108 queries a user data connectivity platform 110 to obtain any user interaction data associated with the user 116 and corresponding to any external online interactions by the user 116 with other online assets (e.g., websites not associated with the payment instrument service 102, applications not associated with the payment instrument service 102, electronic mail services, social media platforms, etc.). The user data connectivity platform 110 may be implemented by a third-party entity that is external to the payment instrument service 102. For instance, the user data connectivity platform 110 may serve as a data broker that maintains data associated with different users and from different online platforms. For example, the user data connectivity platform 110 may persist or otherwise store data corresponding to user interactions on other websites (e.g., social media platforms, electronic mail service websites, news organization websites, other online marketplaces, brand websites, etc.). This user interaction data may be obtained through cookies stored on the user's browser application and associated with the different online assets that the user may interact with.

The user data connectivity platform 110 may generate, for each user, a unique identifier that may be used to deterministically associate the user with any user interaction data across these different online platforms and assets and corresponding to the user. This unique identifier may differ from the unique user and session identifiers generated by the payment instrument service 102. However, the unique identifier generated by the user data connectivity platform 110 may be associated with different user information that may be known to the payment instrument service 102 (e.g., personal identifiable information (PII), name, physical address, network address, telephone number(s), etc.). In an embodiment, the offer generation system 108 implements a translation layer through which the offer generation system 108 can query the user data connectivity platform 110 for any available user interaction data using any available user information that may be known to both the payment instrument service 102 and the user data connectivity platform 110. For example, if the request submitted through the dynamic offers API 104 includes a unique user identifier corresponding to the user 116, the offer generation system 108 may use this unique user identifier to obtain any available PII or other user information that may be known to both the payment instrument service 102 and the data connectivity platform 110. Using this known user information, the offer generation system 108 may query the user data connectivity platform 110 to obtain any available user interaction data associated with the user 116. In some instances, if the user 116 is accessing the payment instrument service 102 for the first time (i.e., null values are provided for the unique user identifier and session identifier), the offer generation system 108 may utilize any information gleaned through the API call from the user 116 to query the data connectivity platform 110. For example, through the API call, the offer generation system 108 may determine the IP address or other network address of the user 116, an estimated location of the user 116 (such as through IP geolocation, etc.), and the like. The offer generation system 108 may use this gleaned information in its query to the user data connectivity platform 110 to obtain any available user interaction data associated with the user 116.

In an embodiment, in addition to obtaining any available user interaction data associated with the user 116 from the user data connectivity platform 110, the offer generation system 108 queries an offer repository 112 implemented by the payment instrument service 102 to identify the different offers that are available for presentation through the website or native application. The offer repository 112 may be implemented by the payment instrument service 102 to allow different brands or other entities to provide different offers that may be presented to users accessing the payment instrument service 102. As noted above, these offers may include offers related to different payment instruments and financing options (from the payment instrument service 102, different brands, and other entities) that may be made available to users. Further, these offers may further include offers related to different goods and/or services provided by different brands and other entities. For each offer, the offer repository 112 may maintain any assets (e.g., executable code, images, videos, text, etc.) that may be used to implement the offer through the websites and/or native application provided by the payment instrument service 102. Further, for each offer, the offer repository 112 may store metadata corresponding to the offer. This metadata may specify one or more characteristics of the offer. These one or more characteristics may include, for example, the title of the offer, the brand associated with the offer, the type of offer, the category associated with the offer, any expiration dates or time ranges during which the offer is made available, and the like.

In an embodiment, the offer repository 112 further stores, for each offer, any rules defined by the payment instrument service 102 and/or the corresponding brand/other entity for determining the methods in which the offer may be presented to users. For example, a rule may indicate the number of times that an offer is required to be presented within a period of time to users through a website or native application implemented by the payment instrument service 102. As another illustrative example, a rule may indicate whether the offer is to be prioritized according to its expiration date (e.g., the offer is to be presented at a greater frequency as the expiration date draws nearer, etc.). In another illustrative example, a rule may indicate that an offer may only be presented on particular websites/native application interfaces implemented by the payment instrument service 102. Thus, rules implemented for a particular offer may define the criteria or requirements for presentation of the offer to users.

In some instances, the offer repository 112 may further maintain a set of global rules that may be applicable for all offers made available through the offer repository 112. For instance, the payment instrument service 102 may define a global rule whereby offers generated by the payment instrument service 102 are to be prioritized for certain offer categories and/or types. For example, the payment instrument service 102 may define a global rule whereby offers related to different payment instruments and financing options provided by the payment instrument service 102 may be prioritized over other similar offers from brands or other entities. The global rule may further define the frequency in which such prioritization is to be applied such that offers from brands or other entities are not consistently ignored in favor of the offers provided by the payment instrument service 102. In some instances, a global rule may define any prioritization schemas that may be applied by the offer generation system 108 for determining which offers may be presented to users. A prioritization schema, for example, may indicate that the offer generation system 108 is to prioritize offers that are set to expire within a particular period of time regardless of whether offers are provided by the payment instrument service 102 or by other brands/ entities. A prioritization schema, in some instances, may define different weights for each prioritization type (e.g., expiration, payment instrument service versus brand/entity, volume, etc.) such that these weights, along with any other applicable rules, may be applied by the offer generation system 108 for selection of the offers that are to be presented through the website or native application interface.

In an embodiment, the offer generation system 108 implements a machine learning algorithm or artificial intelligence that is dynamically trained to process obtained user interaction data (interactions associated with the payment instrument service 102, interactions identified by the user data connectivity platform 110, etc.), the available offers from the offer repository 112, and any applicable rules to select which offers may be presented to the user 116 through the particular website or native application interface the user 116 is accessing. The machine learning algorithm or artificial intelligence, in some instances, may be dynamically trained using supervised learning techniques. For example, a dataset of sample user interaction data, sample selected offers from a set of available offers, and corresponding feedback (e.g., sample interactions with the selected offers, etc.) may be selected for training of the machine learning algorithm or artificial intelligence. The machine learning algorithm or artificial intelligence may be evaluated to determine, based on the input user interaction data supplied to the machine learning algorithm or artificial intelligence from the dataset, whether the machine learning algorithm or artificial intelligence is generating accurate (e.g., desirable) offer selections from available offers for presentation to users based on the parameters of the user interaction data (e.g., interactions with the payment instrument service 102, interactions with external websites and platforms, etc.). The machine learning algorithm or artificial intelligence may further be dynamically trained by soliciting feedback with regard to the any offers selected from the set of available offers and presented based on the input user interaction data. For instance, an administrator of the payment instrument service 102 may review user interaction data for a particular user and the corresponding offers selected from the set of available offers and presented to the user to determine whether the machine learning algorithm or artificial intelligence has provided relevant offers to the user. Annotations made by this administrator to the selected offers (e.g., the output of the machine learning algorithm or artificial intelligence) addressing any inaccuracies may be used to update the dataset for further training of the machine learning algorithm or artificial intelligence.

In some embodiments, the machine learning algorithm or artificial intelligence is trained to process any available user characteristics garnered through the dynamic offers API 104 in the absence of user interaction data to select which offers may be presented to the user 116 through the particular website or native application interface the user 116 is accessing. In such instances where the user interaction data is not available for a user (e.g., a user is accessing the payment instrument service 102 for the first time, etc.), the machine learning algorithm or artificial intelligence may implement a clustering or classification algorithm that may be trained using unsupervised training techniques. For instance, a dataset of user characteristics (e.g., network addresses, location data, computing device configurations, etc.) and available offers may be analyzed using the clustering or classification algorithm to classify different users and corresponding offers according to a set of different classifications (e.g., offer type preferences, offer category preferences, brand preferences, etc.). For instance, the clustering or classification algorithm may be dynamically trained in real-time by classifying different users and available offers according to one or more vectors of similarity between the sample user characteristics and other clusters of users corresponding to different offer preferences (e.g., offer type preferences, offer category preferences, brand preferences, etc.). Thus, in some embodiments, the offer generation system 108 may perform such clustering and obtain partial matches among other clusters of users to identify a particular cluster, and, from this cluster, determine which offers are to be presented to users. Example clustering algorithms that may be trained using this dataset may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like.

In an embodiment, the offer generation system 108 in real-time determines whether the user 116 is a new user (e.g., the user identifier provided through the API call to the dynamic offers API is null) or an existing user (e.g., a user identifier is obtained from a cookie or application storage implemented on the user's computing device). Additionally, the offer generation system 108 may retrieve from the offer repository 112 data corresponding to the offers that are available for presentation to users and any applicable rules that may influence which offers may be selected for presentation to these users. If the offer generation system 108 determines that the user 116 is a new user for which user interaction data is unavailable, the offer generation system 108 may process any available user characteristics associated with the user 116 through the clustering or classification algorithm to identify a particular cluster and, from this cluster, identify any available offers that are associated with this cluster. The machine learning algorithm or artificial intelligence may further evaluate these available offers according to any applicable rules to identify which offers may be presented to the user 116. For example, if an applicable rule indicates that offers corresponding to a particular brand are to be prioritized over offers associated with other brands, the machine learning algorithm or artificial intelligence may process the initial selection of offers according to this rule to ensure that at least one offer associated with the brand is selected for presentation to the user 116.

If the offer generation system 108 determines that the user 116 is an existing user for which user interaction data is available, the offer generation system 108 may process the user interaction data from the user data connectivity platform 110 and any user interaction data maintained by the payment instrument service 102 (e.g., data corresponding to user interactions with websites, native application pages or interfaces, etc.), as well as the set of available offers and any applicable rules from the offer repository 112, through the machine learning algorithm or artificial intelligence to identify a set of offers that may be presented to the user 116 through the website or native application.

In an embodiment, the offer generation system 108 provides any offer selections to an offer delivery system 114 for presentation to the user 116 through the website or native application. The offer delivery system 114 may be implemented on a computer system or other system (e.g., server, virtual machine instance, etc.) associated with the payment instrument service 102. Alternatively, the offer delivery system 114 may be implemented as an application or other executable process executed on one or more computer systems associated with the payment instrument service 102. The offer selections provided to the offer delivery system 114 may include identifiers or other metadata associated with the offers selected by the offer generation system 108 for presentation to the user 116. This may enable the offer delivery system 114 to query the offer repository 112 for any content associated with the selected offers (e.g., HTML code, Cascading Style Sheets (CSS), JavaScript code, applets, images, videos, text, VisionOS code, Open XR code, mixed-reality OS code, etc.) that may be used to render the offers through the websites and/or native application provided by the payment instrument service 102.

Once the offer delivery system 114 has obtained the requisite assets corresponding to the selected offers, the offer delivery system 114 may transmit these assets to the user's computing device for rendering of the selected offers through the browser application or native application implemented on the user's computing device. These assets may include executable instructions that, when executed by the browser application or native application, may cause the browser application or native application to render these offers according to the pre-defined offer locations on the website or native application landing page, respectively. For instance, if the website or native application landing page includes a set of inline frames through which offers may be presented to users, the offer delivery system 114 may provide executable instructions that may cause the browser application or native application, respectively, to render the selected offers within these inline frames.

In an embodiment, the payment instrument service 102 monitors, in real-time, any user interactions with the selected offers to obtain any feedback that can be used to dynamically re-train the machine learning algorithm or artificial intelligence implemented by the offer generation system 108 for selecting offers presentable to different users. For instance, if the user 116 selects a particular offer from those presented through the website or native application landing page, the payment instrument service 102 may use this selection as an indication that the user 116 has responded positively to the particular offer. As another illustrative example, if the user 116 selects an option to dismiss a presented offer (e.g., the user 116 is not interested in the presented offer, the presented offer is repetitive, the user 116 has already taken advantage of the offer, etc.), the payment instrument service 102 may use this action as an indication that the user 116 has responded negatively to the particular offer. These interactions with the presented offers may be annotated and used to update the dataset used to dynamically train the machine learning algorithm or artificial intelligence implemented by the offer generation system 108 to select different offers for presentation to different users.

It should be noted that, in an embodiment, the payment instrument service 102 performs this real-time monitoring of user interactions with any presented offers for different users simultaneously and continuously as these different users interact with the offers selected for these different users. This simultaneous and continuous monitoring of interactions associated with different users may allow for dynamic updating of the dataset used to train the machine learning algorithm or artificial intelligence implemented by the offer generation system 108. Consequently, the machine learning algorithm or artificial intelligence implemented by the offer generation system 108 may be continuously updated in real-time to improve the accuracy of the machine learning algorithm or artificial intelligence in selecting different offers according to each user's unique characteristics and interaction data.

In an embodiment, in addition to monitoring, in real-time, any user interactions with the selected offers, the payment instrument service 102 further records any user interactions with the website or native application in association with the user identifier corresponding to the user 116 and the session identifier corresponding to the present website or native application session. For instance, if the user 116, through the website or native application, selects an offer to apply for a new payment instrument provided by the payment instrument service 102 on behalf of a particular brand, and the user 116 returns to the website or the original native application landing page without having completed their application, the payment instrument service 102 may record the user's progress through the application, as well as their initial selection of the offer, in association with the user identifier and the session identifier associated with the user 116. This updated user interaction data may be processed through the machine learning algorithm or artificial intelligence implemented by the offer generation system 108, which may result in selection of the offer previously selected by the user 116, which may serve as a reminder to the user 116 to continue their application for the new payment instrument. Further, based on the user's prior interaction with the offer and the application for the new payment instrument, the machine learning algorithm or artificial intelligence may dynamically identifier a new set of offers that may be of interest to the user 116 or otherwise relevant to the user's interactions with the payment instrument service 102.

In an embodiment, if the payment instrument service 102 generates a new user identifier and session identifier for the user 116 (e.g., the user 116 is accessing the payment instrument service 102 for the first time, etc.), the payment instrument service 102, through the dynamic offers API 104, generates a cookie or other application data storable in application storage that encodes the newly generated user identifier and session identifier. The payment instrument service 102 may associate the newly generated user identifier and session identifier with any user interactions performed through the website or native application landing page provided by the payment instrument service 102. Further, in some instances, the payment instrument service 102, through the offer generation system 108, may interact with the user data connectivity platform 110 to associate this user interaction data with any external user interaction data associated with the user 116 and maintained by the user data connectivity platform 110. This may facilitate future identification of additional user interaction data that may be processed by the offer generation system 108 (through the machine learning algorithm or artificial intelligence) for the selection of different offers that may be of interest to the user 116 and presentable through the website or native application landing page accessed by the user 116.

When the user 116 terminates their existing session with the payment instrument service 102, the payment instrument service 102 may automatically expire the session identifier such that any user interaction data associated with the particular session is automatically disassociated from the session identifier. However, this user interaction data may remain associated with the user identifier in the form of historical data that may inform the user's historical preferences and interests. If the user 116 initiates a new session with the payment instrument service 102, the API call from the user 116 through the dynamic offers API 104 to obtain a new set of offers that may be presented to the user 116 may include the user identifier and expired session identifier from the cookie or application storage. The dynamic offers API 104 may automatically determine that the expired session identifier is associated with a terminated session and, accordingly, may replace this value for the expired session identifier with a null value. This null value may serve as an indication that the user 116 has initiated a new session with the payment instrument service 102. Accordingly, the payment instrument service 102 may generate a new session identifier corresponding to the new online session with the payment instrument service 102. The payment instrument service 102, through the dynamic offers API 104, may persist this new session identifier within the cookie or application storage on the user's computing device. Thus, any new user interaction data obtained through the user's interactions with the payment instrument service 102 may be associated with the user identifier and the new session identifier for the duration of this new online session with the payment instrument service 102.

The delineation of user interaction data according to the user identifier and the session identifier may provide additional context that may be used to determine which offers may be selected for the user 116 during an online session with the payment instrument service 102. For example, the user interaction data associated with the user identifier may correspond to all historical user interactions with the payment instrument service 102 over the previous and current online sessions. Alternatively, the user interaction data associated with the session identifier may correspond to the contemporaneous user interactions with the payment instrument service 102 during the present online session. In an embodiment, the machine learning algorithm or artificial intelligence implemented by the offer generation system 108 may automatically weigh this user interaction data such that the user interaction data associated with the session identifier is given greater weight when determining which offers may be presented to the user 116. Returning to an earlier example, whereby the user 116 may have initiated an application for a new payment instrument associated with a particular brand during a present online session, the machine learning algorithm or artificial intelligence may prioritize the offer to apply for this payment instrument ahead of other available offers as it may be desirable for the user 116 to continue their application for the new payment instrument. As another illustrative example, if the user 116, during an ongoing online session with the payment instrument service 102, interacts with one or more landing pages implemented by the payment instrument service 102 on behalf of a particular brand (e.g., an account management page for payment instruments associated with the brand, an online marketplace associated with the brand, etc.), the user interactions through these one or more landing pages during the ongoing online session may be weighed more heavily by the machine learning algorithm or artificial intelligence such that the machine learning algorithm or artificial intelligence may be more likely to select one or more offers associated with the particular brand for presentation to the user 116. FIG. 1 may be similar to FIG. 1 in U.S. Provisional Application No. 63/558,430, filed Feb. 27, 2024, the entire contents of which are incorporated herein by reference for all purposes.

Figure 2:
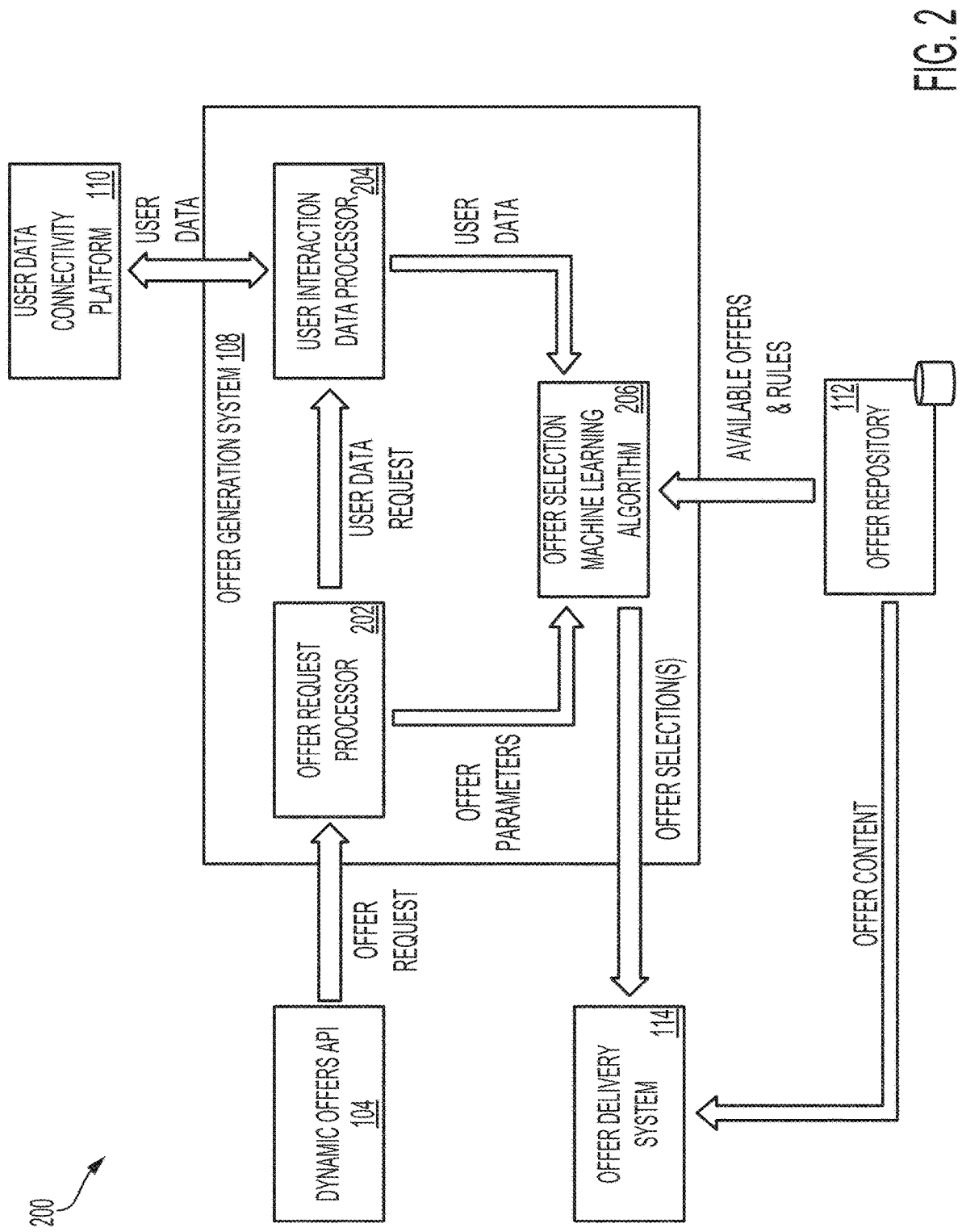
FIG. 2 shows an illustrative example of an environment in which an offer generation system dynamically processes user interaction data, available offers, and any applicable rules corresponding to the presentation of the available offers to select a set of offers presentable to a user through a website or application of a mixed-reality device provided by the payment instrument service in accordance with at least one embodiment.

FIG. 2 shows an illustrative example of an environment 200 in which an offer generation system 108 dynamically processes user interaction data, available offers, and any applicable rules corresponding to the presentation of the available offers to select a set of offers presentable to a user through a website or landing page provided by the payment instrument service in accordance with at least one embodiment. In the environment 200, the offer generation system 108, through an offer request processor 202, may receive a request from the dynamic offers API 104 for a set of offers that may be presented to a particular user accessing a website or native application landing page associated with the payment instrument service. The offer request processor 202 may be implemented on a computer system (e.g., mixed-reality device) or other system (e.g., server, virtual machine instance, etc.) associated with the offer generation system 108. Alternatively, the offer request processor 202 may be implemented as an application or other executable process executed on one or more computer systems associated with the offer generation system 108.

The request provided by the dynamic offers API 104, as noted above, may include a set of offer parameters. These offer parameters may include the types of offers made available by the payment instrument service through the particular website or native application landing page (e.g., financing offers, discounts, deals, etc.), the offer categories (e.g., décor, automotive, apparel, electronics, health and fitness, home furnishings, etc.), the brands or other entities associated with the payment instrument service, and the like. The offer parameters may further include an indication of whether the payment instrument service provides its own set of offers according to any of the defined offer types and/or categories. The offer parameters may further indicate information corresponding to the configuration of the website or native application landing page being accessed. For example, the request may indicate the number of offers that may be presented through the website or native application landing page. Further, the request may indicate the characteristics of the website or native application landing page being accessed. For example, the request may indicate if the website or native application landing page is associated with a particular brand. As another illustrative example, the request may indicate if the website or native application landing page is associated with an online marketplace and, if so, the particular category or type selected (if any) for filtering the offers presentable through the website or native application.

The request provided by the dynamic offers API 104 may further include values corresponding to the user identifier and session identifier associated with the user. As noted above, when the user accesses the payment instrument service for the first time, the API call to the dynamic offers API 104 may include null values corresponding to the user identifier and session identifier as the user has not previously interacted with the payment instrument service. Alternatively, if the user has previously interacted with the payment instrument service, the API call to the dynamic offers API 104 may include a value for the user identifier and, if the request is made during an ongoing online session with the payment instrument service, a value for the session identifier. In an embodiment, if the request includes null values for the user and session identifiers, the offer request processor 202 dynamically generates a new user identifier and session identifier for the user. These new identifiers may be provided to the dynamic offers API 104, which may persist these identifiers in a cookie (if access is performed through a browser application) or application storage (if access is performed through a native application provided by the payment instrument service).

In an embodiment, if the user is accessing the payment instrument service for the first time, the offer request processor 202 may obtain, from the dynamic offers API 104 and through the API call submitted by the user, any information that may be used to uniquely identify the user for the present session. For example, through the API call, the offer request processor 202 may determine the IP address or other network address of the user, an estimated location of the user (such as through IP geolocation, etc.), biometric information (e.g., facial recognition) from the mixed-reality headset, and the like. The offer request processor 202 may associate this information obtained through the API call with the new unique user identifier generated for the user and persisted through the cookie or application storage stored on the user's computing device. If the API call is submitted without a session identifier (i.e., the value corresponding to the session identifier is null), the offer request processor may generate a new session identifier and persist this session identifier in the existing cookie or application storage implemented on the user's mixed-reality device.

In response to the API call transmitted through the dynamic offers API 104, the offer request processor 202 may transmit a request to a user interaction data processor 204 implemented by the offer generation system 108 to obtain any external user interaction data corresponding to the user. The user interaction data processor 204 may be implemented on a computer system or other system (e.g., server, virtual machine instance, etc.) associated with the offer generation system 108. Alternatively, the user interaction data processor 204 may be implemented as an application or other executable process executed on one or more computer systems associated with the offer generation system 108. In an embodiment, the user interaction data processor 204, in response to the request from the offer request processor 202, may transmit an API call or other request to an external user data connectivity platform 110 to retrieve any external user interaction data that may be used to determine which offers may be presented to the user. The user interaction data processor 204, in an embodiment, implements a translation layer through which the offer user interaction data processor 204 can query the user data connectivity platform 110 for any available user interaction data using any available user information that may be known to both the payment instrument service and the user data connectivity platform 110. For example, user data request from the offer request processor 202 includes the unique user identifier associated with the user, the user interaction data processor 204 may use this unique user identifier to obtain any available PII or other user information that may be known to both the payment instrument service and the data connectivity platform 110. The user interaction data processor 204 may use this available information as part of its query to the user data connectivity platform 110 to obtain any available external user interaction data associated with the user. If the user is accessing the payment instrument service for the first time (i.e., null values are provided for the unique user identifier and session identifier), the user interaction data processor 204 may use any information obtained through the API call from the user to query the data connectivity platform 110.

As noted above, the user data connectivity platform 110 may serve as a data broker that maintains data associated with different users and from different online platforms. For example, the user data connectivity platform 110 may persist or otherwise store data corresponding to user interactions on other websites. This user interaction data may be obtained through cookies stored on the user's browser application and associated with the different online assets that the user may interact with. For each user, the user data connectivity platform 110 may generate a unique identifier that may be used to deterministically associate the user with any user interaction data across these different online platforms and assets and corresponding to the user. This unique identifier may differ from the unique user and session identifiers generated by the offer request processor 202. Through the aforementioned translation layer, the user interaction data processor 204 may transmit to the user data connectivity platform 110, any available PII or other user information associated with the user and maintained by the payment instrument service. This information may be known to both the payment instrument service and the user data connectivity platform 110. Using this known user information, the user data connectivity platform 110 may identify the unique identifier associated with the user (as generated and maintained by the user data connectivity platform 110) and use this unique identifier to retrieve the external user interaction data for the user.

In response to obtaining any available external user interaction data associated with the user, the user interaction data processor 204 may transmit this external user interaction data, as well as any available user interaction data maintained by the payment instrument service (i.e., any user interaction data associated with an existing user identifier and session identifier) and associated with the user, to an offer selection machine learning algorithm 206. The offer selection machine learning algorithm 206, in an embodiment, is a machine learning algorithm or artificial intelligence that is dynamically trained to select a set of offers that may be presented to different users based on these users' interactions with the payment instrument service and any other external entities (e.g., external websites, social media platforms, electronic mail services, etc.). The offer selection machine learning algorithm 206, in an embodiment, includes a machine learning algorithm that is dynamically trained using supervised learning techniques. For instance, a dataset of sample user interaction data (e.g., historical user interaction data, hypothetical user interaction data, etc.), sample selected offers from a set of available offers, and corresponding feedback (e.g., sample interactions with the selected offers, etc.) may be selected for training of the offer selection machine learning algorithm 206.

As the offer selection machine learning algorithm 206 generates new outputs corresponding to offers that may be presented to sample users based on the sample user interaction data and available offers, the offer selection machine learning algorithm 206 may be evaluated to determine whether the offer selection machine learning algorithm 206 is making offer selections from the available offers that may be appealing to these sample users. The offer selection machine learning algorithm 206 may further be dynamically trained by soliciting feedback with regard to the offers selected from the set of available offers and presented based on the input user interaction data. For instance, an administrator of the payment instrument service may review user interaction data for a particular user and the corresponding offers selected from the set of available offers and presented to the user to determine whether the offer selection machine learning algorithm 206 has provided relevant offers to the user. Annotations made by this administrator to the selected offers (e.g., the output of the offer selection machine learning algorithm 206) addressing any inaccuracies may be used to update the dataset for further training of the offer selection machine learning algorithm 206.

As noted above, in some instances, the offer selection machine learning algorithm 206 may include a clustering or classification algorithm that is trained to select a set of offers for presentation to a user that is accessing the payment instrument service for the first time. The clustering or classification algorithm implemented through the offer selection machine learning algorithm 206 may process any available user characteristics associated with a first-time user and garnered through the dynamic offers API 104 to identify an initial set of offers that may be presented to the first-time user through the website or native application landing page associated with the payment instrument service. The clustering or classification algorithm may be trained using unsupervised training techniques. As noted above, a dataset of user characteristics (e.g., network addresses, location data, computing device configurations, etc.) and available offers may be analyzed using the clustering or classification algorithm to classify different users and corresponding offers according to a set of different classifications (e.g., offer type preferences, offer category preferences, brand preferences, etc.). This training may be performed by classifying different users and available offers according to one or more vectors of similarity between the sample user characteristics and other clusters of users corresponding to different offer preferences (e.g., offer type preferences, offer category preferences, brand preferences, etc.). Thus, in some embodiments, the offer selection machine learning algorithm 208 may perform such clustering and obtain partial matches among other clusters of users to identify a particular cluster. From this cluster, the clustering or classification algorithm may determine which offers are to be presented to users.

In an embodiment, in response to obtaining the user interaction data and/or user characteristics associated with a user, the offer selection machine learning algorithm 206 may automatically determine whether the user is a first-time user of the payment instrument service or an existing user for which user interaction data is available. Based on this determination, the offer selection machine learning algorithm 206 may automatically determine whether to utilize the aforementioned clustering/classification algorithm or the machine learning algorithm trained using supervised training techniques. For instance, if the user is a first-time user of the payment instrument service, the offer selection machine learning algorithm 206 may process the obtained user characteristics through the clustering or classification algorithm. Alternatively, if user interaction data associated with the user is provided in the request from the user interaction data processor 204, the offer selection machine learning algorithm 206 may process this user interaction data through the machine learning algorithm trained using the aforementioned supervised training techniques.

The offer selection machine learning algorithm 206, in addition to selection of the particular algorithm to be used for selection of a set of offers for presentation to a user, may query an offer repository 112 to identify which offers are available for presentation, as well as any rules that may be used to refine any initial offer selections to obtain a final set of offers that may be presented to the user. As noted above, the offer repository 112 stores, for each available offer, any rules defined by the payment instrument service and/or the corresponding brand/other entity for determining the methods in which the offer may be presented to users. For instance, a rule may indicate the number of times that an offer is required to be presented within a period of time to users through the website or native application landing page. As another illustrative example, a rule may indicate whether the offer is to be prioritized according to its expiration date (e.g., the offer is to be presented at a greater frequency as the expiration date draws nearer, etc.). In another illustrative example, a rule may indicate that an offer may only be presented on particular websites/native application landing pages.

The offer repository 112 may further maintain a set of global rules that may be applicable to the available offers stored in the offer repository 112. Returning to an earlier illustrative example, the payment instrument service may define a global rule whereby offers associated with goods and/or services provided by the payment instrument service are to be prioritized for certain offer categories and/or types. For instance, the payment instrument service may define a global rule whereby offers related to different payment instruments and financing options provided by the payment instrument service may be prioritized over other similar offers from brands or other entities. The global rule may further define the frequency in which such prioritization is to be applied such that offers from brands or other entities are not consistently disregarded in favor of the offers provided by the payment instrument service. In some instances, a global rule may define any prioritization schemas that may be automatically applied by the offer selection machine learning algorithm 206 for determining which offers may be presented to users. As noted above, a prioritization schema may indicate that the offer selection machine learning algorithm 206 is to prioritize offers that are set to expire within a particular period of time regardless of whether offers are provided by the payment instrument service or by other brands/entities. A prioritization schema, in some instances, may define different weights for each prioritization type (e.g., expiration, payment instrument service versus brand/entity, volume, etc.) such that these weights, along with any other applicable rules, may be applied by the offer selection machine learning algorithm 206 for selection of the offers that are to be presented through the website or native application landing page.

In an embodiment, the offer selection machine learning algorithm 206 processes the available user interaction data, user characteristics, available offers, and any applicable rules to select a set of offers that are to be presented to the user through the website or native application landing page. Additionally, the offer selection machine learning algorithm 206 may process any characteristics of the website or native application landing page to determine the number of offers that may be presented or any other configuration information that may be used to further refine the selection of offers. For example, if the particular website or native application landing page is configured to allow for the presentation of four featured offers, the offer selection machine learning algorithm 206 may process any initial selection of offers for presentation to the user to identify a set of four offers that may be presented through the website or native application landing page. As another illustrative example, if the website or native application landing page includes a set of inline frames through which offers may be presented to users, the offer selection machine learning algorithm 206 may select offers that are configured to be presented within the set of inline frames (e.g., the dimensions of the selected offers correspond to the dimensions of the inline frames, etc.).

In an embodiment, the offer selection machine learning algorithm 206 delineates any provided user interaction data according to the user identifier and the session identifier. As noted above, the user interaction data associated with the user identifier may correspond to all historical user interactions with the payment instrument service over the previous and current online sessions. Alternatively, the user interaction data associated with the session identifier may correspond to the contemporaneous user interactions with the payment instrument service during the present online session. The offer selection machine learning algorithm 206, in some instances, may be dynamically trained to differentiate and weigh the user interaction data associated with the session identifier and the complete historical user interaction data associated with the user identifier. Through this weighting of the user interaction data, the offer selection machine learning algorithm 206 may automatically give greater weight to the user interaction data associated with the session identifier when selecting the offers that may be presented to the user. Returning to an earlier example, whereby the user may have initiated an application for a new payment instrument associated with a particular brand during a present online session, the offer selection machine learning algorithm 206 may prioritize the offer to apply for this payment instrument ahead of other available offers as it may be desirable for the user to continue their application for the new payment instrument. As another illustrative example, if the user, during an ongoing online session, interacts with one or more landing pages implemented by the payment instrument service on behalf of a particular brand (e.g., an account management page for payment instruments associated with the brand, an online marketplace associated with the brand, etc.), the user interactions through these one or more landing pages during the ongoing online session may be weighed more heavily by the offer selection machine learning algorithm 206 such that the offer selection machine learning algorithm 206 may be more likely to select one or more offers associated with the particular brand for presentation to the user.

The offer selections generated by the offer selection machine learning algorithm 206 may be provided to the offer delivery system 114 for presentation of the corresponding offers to the user. The offer selections may include a set of identifiers or other metadata that may be used to retrieve any assets or other content usable to generate and present the selected offers through the website or native application landing page. The offer delivery system 114 may use the provided set of identifiers or other metadata to query the offer repository 112 for any content associated with the selected offers (e.g., HTML code, CSS, JavaScript code, applets, images, videos, text, etc.) that may be used to render the offers through the websites and/or native application provided by the payment instrument service. Once the offer delivery system 114 has obtained the requisite assets corresponding to the selected offers, the offer delivery system 114 may transmit these assets to the user's computing device for rendering of the selected offers through the browser application or native application implemented on the user's computing device. These assets may include executable instructions that, when executed by the browser application or native application, may cause the browser application or native application to render these offers according to the pre-defined offer locations on the website or native application landing page, respectively.

In an embodiment, the offer generation system 108 automatically monitors, in real-time, any user interactions with the selected offers to obtain user feedback with regard to these selected offers. This user feedback may be used to dynamically, and in real-time or near real-time, re-train or otherwise update the offer selection machine learning algorithm 206. Returning to an earlier example, if the user selects a particular offer from those presented through the website or native application landing page, the offer generation system 108 may use this selection as an indication that the user has responded positively to the particular offer. Accordingly, the offer generation system 108 may annotate this particular offer to indicate that the user responded positively to the offer and may update the dataset to include this annotation. Processing of the updated dataset may result in reinforcement of the offer selection machine learning algorithm 206 such that, for similar users and user interaction data, the likelihood of this offer being selected may be maintained or increased. Alternatively, if the user selects an option to dismiss a selected offer (e.g., the user is not interested in the selected offer, the selected offer is repetitive, the user has already taken advantage of the selected offer, etc.), the offer generation system 108 may use this action as an indication that the user has responded negatively to the selected offer. The offer generation system 108 may annotate this particular offer to indicate that the user responded negatively to the offer and may update the dataset to include this annotation. Processing of the updated dataset may result in re-training of the offer selection machine learning algorithm 206 such that, for similar users and user interaction data, the likelihood of this offer being selected may be reduced.

Monitoring user interactions may include analyzing facial expressions of the user. Cameras on a mixed-reality device facing the user may capture or record expressions of the eyes, mouth, or other facial features. A facial expression module may be able to determine when the user has a positive reaction. For example, a facial expression module may be able to determine when the user smiles or frowns. The facial expression module may use a facial expression machine learning model. The facial expression machine learning model may be trained with a training dataset with user data and/or other user data. The training data set may include images of the particular user and labels indicating the facial expression of the particular user. In some embodiments, the training data set may include image of the particular user and labels indicating the outcome of presenting the selected offer (e.g., user selects, ignores, or declines offer). The facial expression machine learning model may optimize parameters of the model such that an output of the model matches the label when the corresponding image(s) are input into the model. A user may choose to opt in or opt out of facial expression analysis.

In some embodiments, monitoring user interactions may include monitoring hand gestures of the user. For example, a "thumbs up" may indicate that a certain offering that is in the focus of the mixed-reality device may be placed in a wish list or shopping cart. As another example, a "thumbs down" may indicate that a certain offering should be removed from a wish list or shopping cart, or that the user does not wish to see suggestions similar to the offering. As an example, a "hand stop" (five fingers extended from palm) may prompt a sensitive photo option that for example blocks a product image from the offers API. As another example, a "hands-in-heart shape" over the products for a quick add to a wish list, which is described later with FIG. 16.

As noted above, the real-time monitoring of user interactions with selected offers may be performed for different users accessing the website or native application landing page simultaneously and continuously as these different users interact with the different offers selected for them. This simultaneous and continuous monitoring of interactions with the selected offers presented to different users may allow for dynamic updating of the dataset used to train the offer selection machine learning algorithm 206. Thus, the offer selection machine learning algorithm 206 may be dynamically updated in real-time as different users interact with the different offers selected by the offer selection machine learning algorithm 206 for these different users. This may allow for continuous improvement in the accuracy of the offer selection machine learning algorithm 206 in selecting different offers according to each user's unique characteristics and interaction data.

Figure 3:
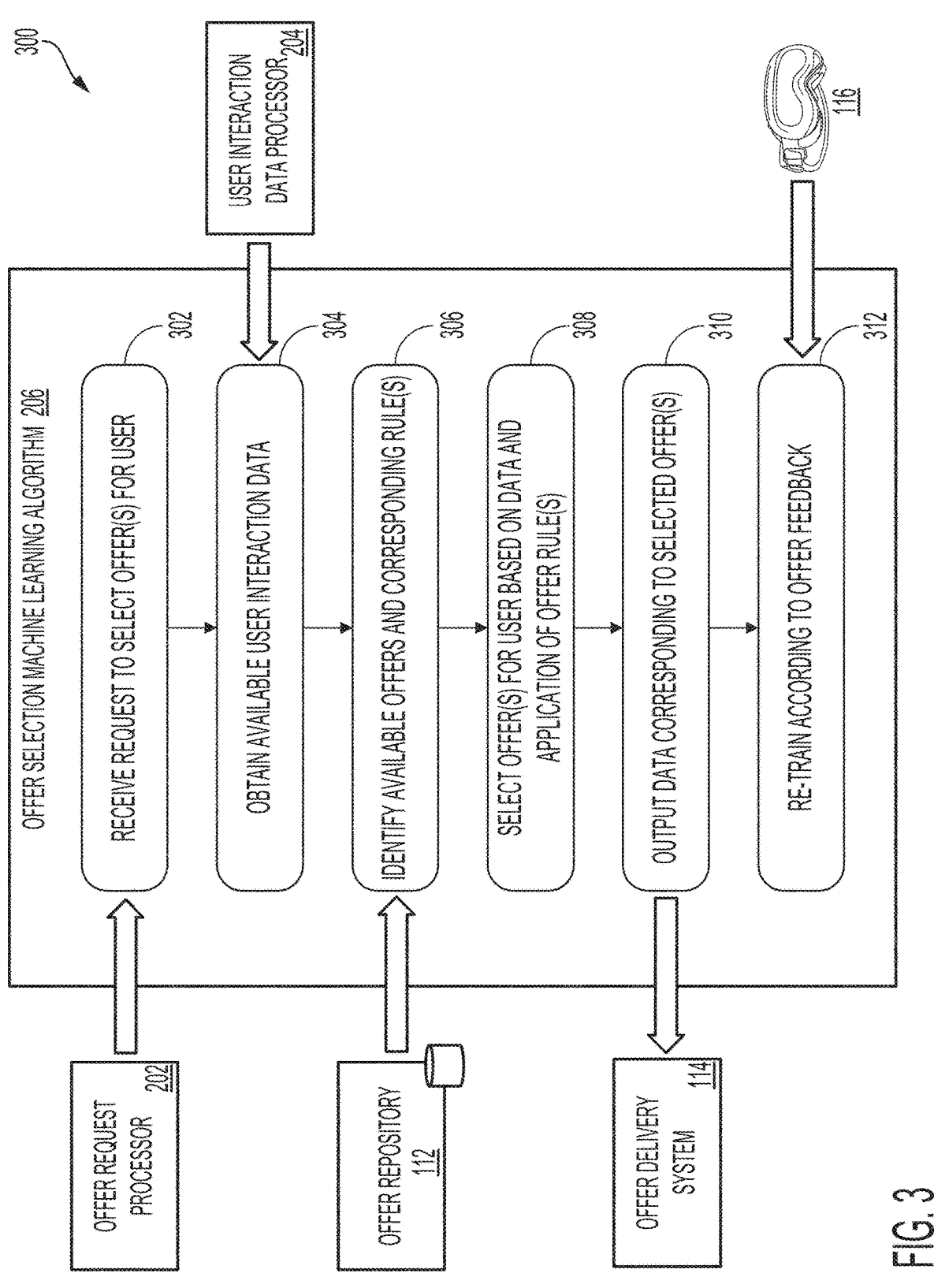
FIG. 3 shows an illustrative example of an environment in which an offer selection machine learning algorithm is dynamically trained to process available user interaction data, available offers, and corresponding rules to provide a selection of offers presentable to a user in accordance with at least one embodiment.

FIG. 3 shows an illustrative example of an environment 300 in which an offer selection machine learning algorithm 206 is dynamically trained to process available user interaction data, available offers, and corresponding rules to provide a selection of offers presentable to a user 116 in accordance with at least one embodiment. In the environment 300, the offer selection machine learning algorithm 206, at step 302, may receive a request from the offer request processor 202 to select a set of offers that may be presented to a user 116 through a website or native application landing page associated with a payment instrument service. As noted above, the request from the offer request processor 202 may include a set of user characteristics associated with the user 116 to whom a set of offers are being selected. The set of user characteristics may include the network address associated with the user's computing device, any available location data associated with the user 116 (e.g., location data obtained through IP geolocation, location data obtained through Global Positioning System (GPS) peripheral devices, etc.), mixed-reality device configurations (e.g., operating system, memory, storage, etc.), biometric information (e.g., facial recognition) from the mixed-reality headset, and the like. In some instances, if the user 116 has previously interacted with the payment instrument service, the user 116 may maintain, within a cookie or application storage, a user identifier and a session identifier that may be used to identify any historical user interaction data over time and for a current session (if the current session is active). Accordingly, the request from the offer request processor 202 may include the user identifier and the session identifier, if available. As noted above, if the user 116 is accessing the payment instrument service for the first time, the user 116 may not be associated with a user identifier or session identifier. Thus, these identifiers may not be provided if the user 116 is accessing the payment instrument service for the first time.

At step 304, the offer selection machine learning algorithm 206 may obtain, from the user interaction data processor 204, any available user interaction data associated with the user 116. For instance, if the request from the offer request processor 202 includes a session identifier and/or a user identifier associated with the user 116, the offer selection machine learning algorithm 206 may automatically provide the session identifier and/or the user identifier to the user interaction data processor 204 to obtain the available user interaction data. Additionally, or alternatively, the offer selection machine learning algorithm 206 may provide the set of user characteristics provided by the offer request processor 202 to the user interaction data processor 204. In response to receiving the session identifier, the user identifier, and/or the set of user characteristics, the user interaction data processor 204 may query the user data connectivity platform, as described above, to obtain any external user interaction data corresponding to user interactions with other websites not associated with the payment instrument service, applications not associated with the payment instrument service, electronic mail services, social media platforms, and the like. Further, using the session identifier and/or the user identifier (if provided by the offer selection machine learning algorithm 206), the user interaction data processor 204 may obtain any user interaction data corresponding to the user's interactions with the payment instrument service. This user interaction data may be delineated according to when the user interaction data was collected. For instance, the user interaction data processor 204 may distinguish user interaction data collected during a present session with the payment instrument service from other historical user interaction data collected during prior sessions with the payment instrument service. The user interaction data processor 204 may provide the user interaction data associated with the user 116 to the offer selection machine learning algorithm 206 for processing.

It should be noted that, in some instances, the user interaction data processor 204 may automatically provide the user interaction data associated with the user 116 without requiring prompting from the offer selection machine learning algorithm 206. As noted above, the offer request processor 202 may automatically provide the user identifier and the session identifier (if provided through the dynamic offers API) to the user interaction data processor 204. The user interaction data processor 204 may use these identifiers to retrieve any available user interaction data (such as from the user data connectivity platform and from the payment instrument service itself) and provide this user interaction data automatically to the offer selection machine learning algorithm 206 for processing.

At step 306, the offer selection machine learning algorithm 206 may identify, from the offer repository 112, any offers that are available for presentation to users through the website or native application landing page being accessed. Further, from the offer repository 112, the offer selection machine learning algorithm 206 may obtain any rules that may be applicable towards the selection of a set of offers from the available offers maintained in the offer repository 112. As noted above, the offer repository 112 may store offer-specific rules defined by the payment instrument service and/or the corresponding brand/other entity for determining the methods in which the offer may be presented to users. For example, offer-specific rules may indicate the number of times that particular offers are required to be presented within a period of time to users through a website or native application implemented by the payment instrument service. As another illustrative example, offer-specific rules may indicate whether the corresponding offers are to be prioritized according to their expiration date. In another illustrative example, an offer-specific rule may indicate that an offer may only be presented on particular websites/native application landing pages. The offer repository 112 may further maintain a set of global offer rules that may be applicable to all offers made available through the offer repository 112.

At step 308, the offer selection machine learning algorithm 206 may automatically select a set of offers that are to be presented to the user 116 through the website or native application landing page based on the obtained user interaction data, the available offers, and any applicable rules. As noted above, the offer selection machine learning algorithm 206 may determine whether to utilize a clustering/classification algorithm or a machine learning algorithm trained using supervised techniques based on whether the user 116 is accessing the payment instrument service for the first time. For instance, if the user 116 is a first-time user of the payment instrument service, the offer selection machine learning algorithm 206 may process the obtained user characteristics through the clustering or classification algorithm. Alternatively, if user interaction data associated with the user 116 is provided by the user interaction data processor 204, the offer selection machine learning algorithm 206 may process this user interaction data through the machine learning algorithm trained using the aforementioned supervised training techniques. The resulting initial output may include an initial set of offers that may be presentable to the user 116 through the website or native application landing page. In an embodiment, the offer selection machine learning algorithm 206 evaluates this initial set of offers according to any applicable rules (e.g., offer-specific rules and global offer rules) to further refine the initial set of offers. This refinement of the initial set of offers may result in a finalized set of offers that may be presented to the user 116 through the website or native application landing page.

At step 310, the offer selection machine learning algorithm 206 may output data corresponding to this finalized set of offers selected by the offer selection machine learning algorithm 206 to the offer delivery system 114 for presentation of these offers to the user 116. As noted above, the offer selection machine learning algorithm 206 may provide a set of identifiers or other metadata associated with the offers selected by the offer selection machine learning algorithm 206 for presentation to the user 116. The offer delivery system 114 may use this set of identifier or other metadata in a query to the offer repository 112 to obtain any content associated with the selected offers (e.g., HTML code, CSS, JavaScript code, applets, images, videos, text, mixed-reality OS code, etc.) that may be used to render the selected offers through the website or native application landing page being accessed by the user 116.

At step 312, the offer selection machine learning algorithm 206 is re-trained or otherwise updated according to any user feedback corresponding to the selected offers presented to the user 116 through the website or native application landing page. As noted above, the offer generation system (which implements the offer selection machine learning algorithm 206) may automatically monitor, in real-time, any user interactions with the selected offers to obtain user feedback with regard to these selected offers. Returning to an earlier example, if the user selects a particular offer from those presented through the website or native application landing page, the offer generation system may use this selection as an indication that the user has responded positively to the particular offer. Accordingly, the offer generation system may annotate the pairing of the user interaction data and the selected offer to indicate that the user responded positively to the offer. This annotated data point may be added to the dataset such that when the offer selection machine learning algorithm 206 processes the updated dataset, the offer selection machine learning algorithm 206 may be reinforced such that, for similar users and user interaction data, the likelihood of this offer being selected may be maintained or increased. Alternatively, if the user selects an option to dismiss a selected offer (e.g., the user is not interested in the selected offer, the selected offer is repetitive, the user has already taken advantage of the selected offer, etc.), the offer generation system may use this action as an indication that the user has responded negatively to the selected offer. The offer generation system may annotate the pairing of the user interaction data and the selected offer to indicate that the user responded negatively to the offer. The offer generation system may add this annotated data point to the dataset such that when the offer selection machine learning algorithm 206 processed the updated dataset, the offer selection machine learning algorithm 206 is re-trained to reduce the likelihood of the offer being selected for similar users and user interaction data.

It should be noted that the steps 302-312 may be automatically performed by the offer selection machine learning algorithm 206 for different users concurrently. For instance, the offer selection machine learning algorithm 206 may automatically process incoming requests from the offer request processor 202 as these requests are received. These requests may correspond to different users and to different websites and/or native application landing pages associated with these different users. Thus, the offer selection machine learning algorithm 206 may dynamically, and in real-time, provider offer selections for different users based on their user characteristics and/or user interaction data. Further, as noted above, the real-time monitoring of user interactions with selected offers may be performed for different users accessing different websites or native application landing pages provided by the payment instrument service simultaneously and continuously as these different users interact with the different offers selected for them. This simultaneous and continuous monitoring of interactions with the selected offers presented to different users may allow for dynamic updating of the dataset used to train the offer selection machine learning algorithm 206.

Figure 4:
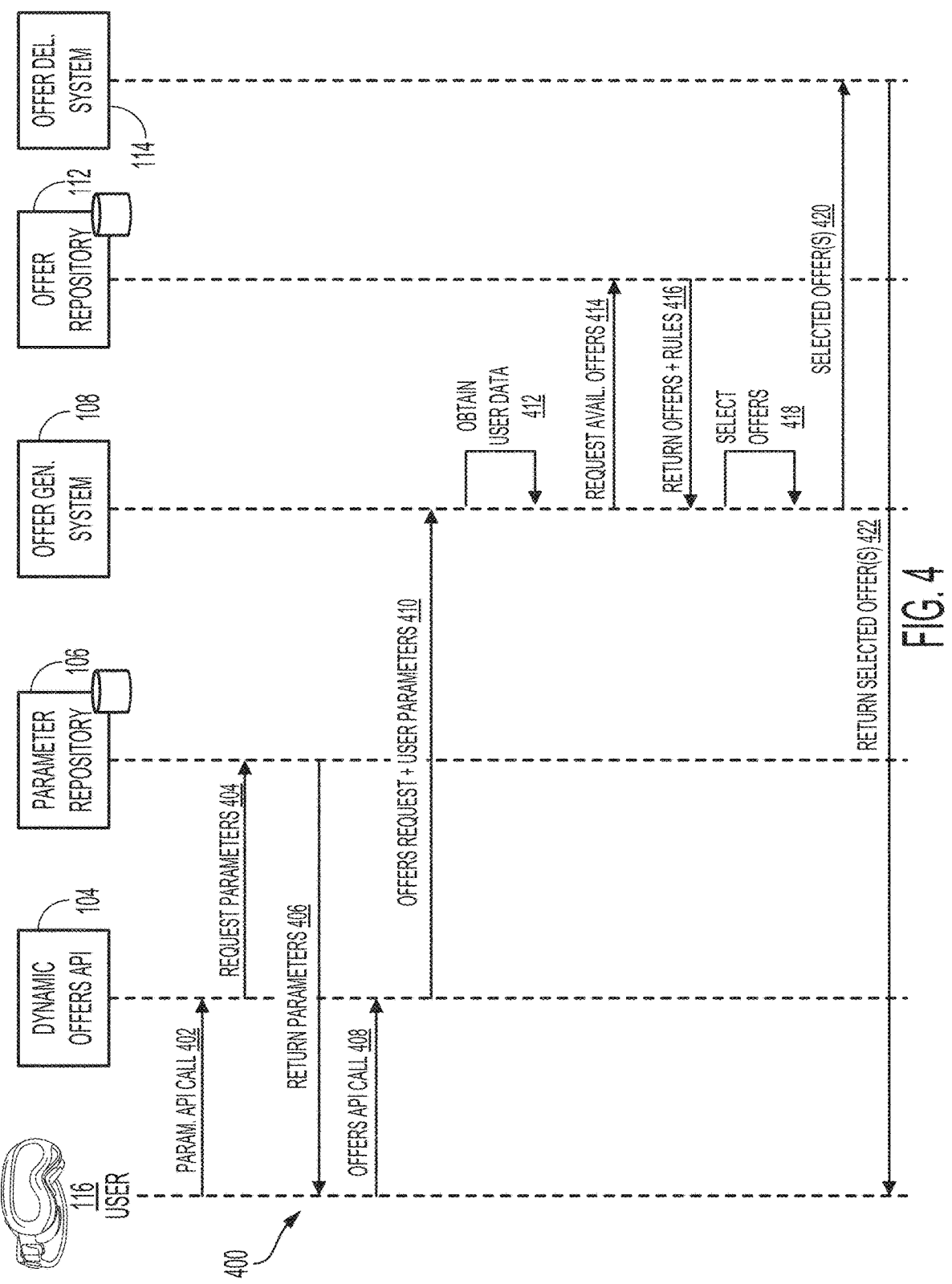
FIG. 4 shows an illustrative example of a process diagram through which a set of offers are selected for presentation to a user through a website or application of a mixed-reality device implemented by the payment instrument service and according to user interaction data and applicable rules in accordance with at least one embodiment.

FIG. 4 shows an illustrative example of a process diagram 400 through which a set of offers are selected for presentation to a user 116 through a website implemented by the payment instrument service and according to user interaction data and applicable rules in accordance with at least one embodiment. At step 402 of the process diagram 400, a user 116 (through a browser application or native application provided by the payment instrument service and executed on a mixed-reality device) may transmit an offers parameter API call through the dynamic offers API 104. The offers parameter API call may include information corresponding to the website or native application landing page being accessed by the user 116 through the browser application or native application, respectively. For instance, the offers parameter API call may include the network address associated with the website or native application landing page being accessed. Additionally, or alternatively, the offers parameter API call may include configuration information associated with the website or native application landing page being accessed (e.g., Document Object Model (DOM), website or native application landing page documents, etc.) and that may be used to discern elements (e.g., inline frames, etc.) through which offers may be presented.

At step 404, the dynamic offers API may transmit a request to the parameter repository 106 to obtain a set of offer parameters for the particular website or native application landing page being accessed. As noted above, the parameter repository 106 may store the available offer parameters used by the payment instrument service to categorize and organize the different offers made available by different brands and other entities for presentation through the website or other native application landing page associated with the payment instrument service. For example, the available offer parameters may include the types of offers made available (e.g., financing offers, discounts, deals, etc.), the offer categories (e.g., décor, automotive, apparel, electronics, health and fitness, home furnishings, etc.), the brands or other entities associated with the payment instrument service, and the like. The available offer parameters may further include an indication of whether the payment instrument service provides its own set of offers according to any of the defined offer types and/or categories. The available offer parameters may be defined by the payment instrument service according to the configuration of the website and any other landing pages or subsites through which different offers may be presented. Returning to an earlier illustrative example, the initial landing page (e.g., homepage) provided by the payment instrument service may allow for the presentation of a featured set of offers without indication of the type or category of offers being presented. Thus, the parameter repository 106 may indicate, at step 406 and for this initial landing page, that the offer parameters include the brands or other entities associated with the payment instrument service for which offers may be presented. Further, the offer parameters may further include an indication as to whether offers associated with the payment instrument service are available for presentation through the initial landing page. As another illustrative example, if the user 116 navigates to the online marketplace provided by the payment instrument service, and through which different offers may be presented according to different offer types, categories, and brands, the parameter repository 106 may indicate, at step 406 and for the landing page associated with the online marketplace, the various parameters corresponding to these different offer types, offer categories, and brands associated with the available offers presentable through the online marketplace.

At step 408, the user 116 (through their browser application or the native application executed on their mixed-reality device) may transmit an offers API call to the dynamic offers API 104 to obtain a set of offers that may be presented to the user 116 through the website or native application landing page. The offers API call from the user 116 may include identifying information associated with the user 116, as well as identifying information corresponding to an ongoing online session with the payment service provider. For instance, if the user 116 has previously accessed the payment instrument service, the user 116 (either in a cookie or application storage) may maintain a user identifier and session identifier associated with the user and corresponding to the user's interactions with the payment instrument service. The user identifier may be dynamically generated by the offer generation system 108 when the user 116 accesses the payment instrument service for the first time. Further, when the user 116 initiates a new online session with the payment instrument service, the offer generation system 108 may generate a new session identifier corresponding to this new online session. As described in greater detail herein, as the user interacts with the websites or native application landing pages associated with the payment instrument service, the offer generation system 108 may automatically record these user interactions in the form of user interaction data. The offer generation system 108 may dynamically, and in real-time or near real-time, associate this user interaction data with the user identifier and the session identifier. The user interaction data that is associated with the session identifier may be contemporaneous to the particular online session for which the session identifier was generated. Alternatively, the user identifier may be associated with all historical user interaction data corresponding to the user's interactions with the different websites and/or native application landing pages associated with the payment instrument service.

If the user 116 is accessing the payment instrument service for the first time, the offers API call from the user 116 through the dynamic offers API 104 may be devoid of a user identifier and a session identifier, as the user has not previously interacted with the payment instrument service. Alternatively, if the user 116 has previously interacted with the payment instrument service but is otherwise initiating a new online session with the payment instrument service, the offers API call from the user 116 may include the user identifier stored in the cookie or application storage. However, the offers API call in this instance may be devoid of a session identifier, as the user 116 is initiating a new online session with the payment instrument service. In some instances, if the user 116 is resuming an online session with the payment instrument service, the offers API call may include both the user identifier and the session identifier from the cookie or application storage.

The offers API call from the user 116 may further include the offers parameters obtained from the parameter repository, as well as any user characteristics or parameters that may be used to obtain external user interaction data from a user data connectivity platform, as described in greater detail herein. For example, the offers API call from the user 116 may include the IP address or other network address associated with the user's mixed-reality device. Further, the offers API call may include identifying information associated with the user 116 (e.g., name, electronic mail address, physical address, etc.). If the user 116 is accessing the payment instrument service for the first time, the offer generation system 108, as described in greater detail herein, may generate a new user identifier and session identifier that may be associated with the user 116. The offer generation system 108 may further associate this identifying information with the newly generated user identifier.

At step 410, the dynamic offers API 104 may transmit a request to the offer generation system 108 to select a set of offers that may be presented to the user 116 through the website or native application landing page being accessed. The request may include the aforementioned offer parameters for the particular website or native application landing page, as well as the user characteristics or parameters provided by the user 116. If the user 116 has previously interacted with the payment instrument service, the offers request may further include the user identifier and the session identifier (if the request is submitted during an ongoing online session) associated with the user 116. If the user 116 is accessing the payment instrument service for the first time, the offer generation system 108 may dynamically generate new user and session identifiers for the user 116 and, through the dynamic offers API 104, persist the new user and session identifiers in a browser cookie or in application storage. Similarly, if the offers request includes a user identifier but is devoid of a session identifier (i.e., the user 116 is initiating a new online session with the payment instrument service), the offer generation system 108 may dynamically generate a new session identifier the user 116 and, through the dynamic offers API 104, persist the new session identifier in the existing browser cookie or application storage.

At step 412, the offer generation system 108 may obtain any available user interaction data associated with the user 116. As noted above, the payment instrument service may maintain user interaction data corresponding to user interactions with the myriad websites and/or native application landing pages implemented by the payment instrument service. This user interaction data may be associated with different user and session identifiers corresponding to different users of the payment instrument service. In an embodiment, if the offers request includes a session identifier and/or a user identifier associated with the user 116, the offer generation system queries a repository or database maintained by the payment instrument service to obtain any user interaction data that may be associated with the session identifier and/or the user identifier. As noted above, the user interaction data associated with a session identifier may be contemporaneous to the particular online session for which the session identifier was generated. Alternatively, the user identifier may be associated with all historical user interaction data corresponding to a user's interactions with the different websites and/or native application landing pages associated with the payment instrument service. If the offers request does not include both the user identifier and the session identifier, the offer generation system 108 may automatically determine that the payment instrument service does not currently maintain any user interaction data associated with the user 116.

In addition to identifying any available user interaction data corresponding to the user 116 and maintained by the payment instrument service, the offer generation system 108 may query a user data connectivity platform or other third-party data broker to obtain any external user interaction data associated with the user 116 and corresponding to any external online interactions by the user 116 with other online assets (e.g., websites not associated with the payment instrument service 102, applications not associated with the payment instrument service 102, electronic mail services, messaging services, social media platforms, etc.). The user data connectivity platform or other third-party data broker may persist or otherwise store data corresponding to user interactions on other websites (e.g., social media platforms, electronic mail service websites, messaging services, news organization websites, other online marketplaces, brand websites, etc.). This user interaction data may be obtained through cookies or application storage implemented on the user's computing device and associated with the different online assets that the user may interact with.

As noted above, the user data connectivity platform or other third-party data broker may generate, for each user, a unique identifier that may be used to deterministically associate the user 116 with any user interaction data across these different online platforms and assets and corresponding to the user 116. This unique identifier generated by the user data connectivity platform or other third-party data broker may be associated with different user information that may be known to the payment instrument service (e.g., personal identifiable information (PII), name, physical address, network address, telephone number(s), etc.). The offer generation system 108 may implement a translation layer through which the offer generation system 108 can query the user data connectivity platform or other third-party data broker for any available user interaction data using any available user information that may be known to both the payment instrument service and the user data connectivity platform or other third-party data broker. For instance, if the request submitted through the dynamic offers API 104 includes a unique user identifier corresponding to the user 116, the offer generation system 108 may use this unique user identifier to obtain any available PII or other user information that may be known to both the payment instrument service and the user data connectivity platform or other third-party data broker. Using this known user information, the offer generation system 108 may query the user data connectivity platform or other third-party data broker to obtain any available user interaction data associated with the user 116. If the user 116 is accessing the payment instrument service for the first time, the offer generation system 108 may use the user characteristics or parameters provided in the request to query the user data connectivity platform or other third-party data broker.

At step 414, the offer generation system 108 may query the offer repository 112 to identify the offers that have been made available by different brands and by the payment instrument service and that may be presented to users through the websites and native application landing pages implemented by the payment instrument service. The offers stored in the offer repository 112 may include offers, submitted by different brands and the payment instrument service, related to different payment instruments and financing options that may be made available to users. Further, these offers may further include offers related to different goods and/or services provided by different brands and the payment instrument service. For each offer, the offer repository 112 may maintain any assets (e.g., executable code, images, videos, text, etc.) that may be used to implement the offer through the websites and/or native application landing pages provided by the payment instrument service. Further, for each offer, the offer repository 112 may store metadata corresponding to the offer. This metadata may specify one or more characteristics of the offer (e.g., the title of the offer, the brand associated with the offer, the type of offer, the category associated with the offer, any expiration dates or time ranges during which the offer is made available, etc.).

As noted above, the offer repository 112 may further store offer-specific rules defined by the payment instrument service and/or the corresponding brand/other entity for use in determining the methods in which the offer may be presented to users. For example, offer-specific rules may indicate the number of times that particular offers are required to be presented within a period of time to users through a website or native application implemented by the payment instrument service. As another illustrative example, offer-specific rules may indicate whether the corresponding offers are to be prioritized according to their expiration date. In another illustrative example, an offer-specific rule may indicate that an offer may only be presented on particular websites/native application landing pages. The offer repository 112 may further maintain a set of global offer rules that may be applicable to all offers made available through the offer repository 112. Based on the offer parameters provided by the offer generation system 108 in its query to the offer repository 112, the offer repository 112, at step 416, may return any available offers and corresponding rules associated with these offer parameters.

At step 418, the offer generation system 108 may dynamically process the obtained offers and rules, as well as the available user interaction data (internal to the payment instrument service and as obtained from the user data connectivity platform/third-party data broker) and/or user parameters, to select a set of offers that may be presented to the user 116 through the website or native application landing page being accessed by the user 116. As noted above, the offer generation system 108 may implement an offer selection machine learning algorithm that is dynamically trained in real-time to process available user interaction data and/or user parameters, as well as the set of available offers corresponding to the defined offer parameters and any applicable rules, to identify different offers that may be presented to users. The offer selection machine learning algorithm implemented by the offer generation system 108 may automatically differentiate new users (e.g., users that are not associated with both a user identifier and a session identifier) from existing users that have previously interacted with the payment instrument service (e.g., users that are associated with a session identifier and/or a user identifier). If the offer selection machine learning algorithm determines that the user 116 is a new user for which user interaction data is unavailable, the offer selection machine learning algorithm may process any available user characteristics associated with the user 116 through a clustering or classification algorithm to identify a particular cluster and, from this cluster, identify any available offers that are associated with this cluster. These available offers may be evaluated according to any applicable rules and the provided offer parameters to identify which offers may be presented to the user 116.

If the offer selection machine learning algorithm determines that the user 116 is an existing user for which user interaction data is available, the offer generation system 108 may process the user interaction data from the user data connectivity platform or other third-party data broker and any user interaction data maintained by the payment instrument service (e.g., data corresponding to user interactions with websites, native application landing pages or interfaces, etc.), as well as the set of available offers, the offer parameters, and any applicable rules from the offer repository 112, through the offer selection machine learning algorithm to identify a set of offers that may be presented to the user 116 through the website or native application landing page.

At step 420, the offer generation system 108 may provide, to the offer delivery system 114, a set of identifiers or metadata corresponding to the offers selected for presentation to the user 116 through the website or native application landing page. In response to receiving this set of identifiers or metadata corresponding to the selected offers, the offer delivery system 114 may query the offer repository 112 to obtain any content or other assets associated with the selected offers (e.g., HTML code, CSS, JavaScript code, applets, images, videos, text, mixed-reality OS code, etc.) that may be used to render the offers through the website and/or native application landing page being accessed by the user 116. Once the offer delivery system 114 has obtained the requisite content or other assets corresponding to the selected offers, the offer delivery system 114, at step 422, may transmit this content or other assets to the user's computing device for rendering of the selected offers through the browser application or native application implemented on the user's computing device. The content or other assets may include executable instructions that, when executed by the browser application or native application, may cause the browser application or native application to render these offers according to the pre-defined offer locations on the website or native application landing page, respectively.

Figure 5:
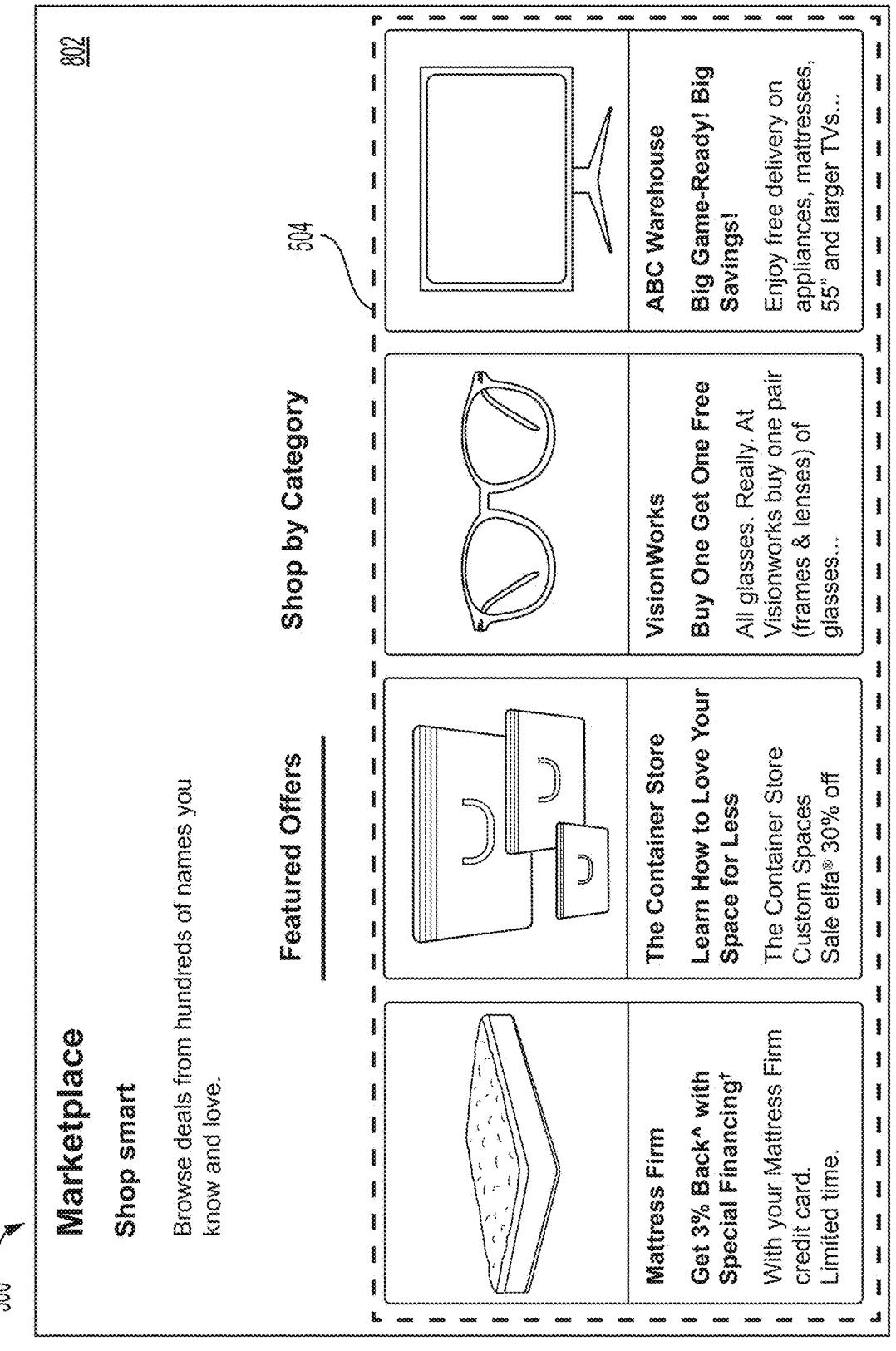
FIG. 5 shows an illustrative example of an environment through which a set of offers selected based on user interaction data is presented through a landing page associated with a payment instrument service in accordance with at least one embodiment.

FIG. 5 shows an illustrative example of an environment 500 through which a set of offers 504 selected based on user interaction data is presented through a landing page 502 associated with a payment instrument service in accordance with at least one embodiment. In the environment 500, a user may access a landing page 502 associated with the payment instrument service through a browser application or a native application provided by the payment instrument service. The landing page 502, as illustrated in FIG. 5, may include a section through which a set of featured offers may be presented to the user. Further, this particular section of the landing page 502 may be configured to allow for the presentation of four offers that may be selected by an offer generation system of the payment instrument service based on any available user interaction data associated with the user accessing the landing page 502 and/or any user characteristics or parameters associated with the user and obtained when the user accesses the landing page 502. Landing page 502 may be superimposed over images or view of the real world.

In an embodiment, when the user accesses the landing page 502, the browser application or native application implemented on the user's computing device may transmit an offers API call through a dynamic offers API implemented by the payment instrument service to obtain a set of assets or other content that may be used to present a set of selected offers 504 through the particular section of the landing page 502 reserved for the presentation of a set of featured offers. As noted above, if the user is interacting with the payment instrument service for the first time (i.e., the user is accessing the landing page 502 for the first time), the offers API call may be devoid of a user identifier and of a session identifier (e.g., null values are provided for both the user and session identifiers). Alternatively, if the user is accessing the landing page 502 to resume an ongoing online session with the payment instrument service, the offers API call may include, from a browser cookie or application storage, the user identifier associated with the user and the session identifier corresponding to the ongoing online session. These identifiers may be generated by the offer generation system implemented by the payment instrument service, which may persist the identifiers in a browser cookie or application storage. If the user has previously interacted with the payment instrument service but is initiating a new online session with the payment instrument service through the landing page 502, the offers API call to the dynamic offers API may include the user identifier associated with the user and a null value corresponding to the session identifier.

As noted above, the user, through the browser application or native application, may transmit an offers parameter API call through the dynamic offers API. The offers parameter API call may include information corresponding to the landing page 502. For instance, the offers parameter API call may include the network address associated with the landing page 502. Additionally, or alternatively, the offers parameter API call may include configuration information associated with the landing page 502 (e.g., DOM, landing page documents, etc.) and that may be used to discern elements (e.g., inline frames, etc.) through which offers 504 may be presented. In response to the offers parameter API call, the dynamic offers API may transmit a request to a parameter repository maintained by the payment instrument service to obtain a set of offer parameters for the landing page 502. As noted above, the parameter repository may store the available offer parameters used by the payment instrument service to categorize and organize the different offers made available by different brands and other entities for presentation through different websites or other native application landing pages. The available offer parameters may be defined by the payment instrument service according to the configuration of the websites and any other landing pages or subsites through which different offers may be presented.

As noted above, the landing page 502 provided by the payment instrument service may allow for the presentation of a featured set of offers without indication of the type or category of offers being presented. Thus, the parameter repository may indicate that the offer parameters include the brands or other entities associated with the payment instrument service for which offers may be presented. Further, the offer parameters may further include an indication as to whether offers associated with the payment instrument service are available for presentation through the landing page 502. These identified offer parameters may be returned to the user in response to the offers parameter API call. The user may include the provided offer parameters to the dynamic offers API through the offers API call.

In an embodiment, the offers generation system, using any provided identifiers (e.g., session identifier and/or user identifier) and any user characteristics/parameters associated with the user (network address associated with the user's computing device, any available location data associated with the user, computing device configurations, etc.), may obtain any available user interaction data associated with the user. If the user has previously accessed the payment instrument service, the offers generation system may use the provided session identifier and/or user identifier to identify any user interaction data corresponding to the user's interactions with the payment instrument service. For instance, if the user has provided, through the offers API call, a session identifier and/or user identifier corresponding to the user, the offer generation system may query a repository or database maintained by the payment instrument service to obtain any user interaction data that may be associated with the session identifier and/or the user identifier. As noted above, the user interaction data associated with a session identifier may be contemporaneous to the particular online session for which the session identifier was generated. The user identifier may be associated with all historical user interaction data corresponding to a user's interactions with the different websites and/or native application landing pages associated with the payment instrument service. If the offers request does not include both the user identifier and the session identifier, the offer generation system may automatically determine that the payment instrument service does not currently maintain any user interaction data associated with the user. In addition to obtaining any available user interaction data corresponding to the user's interactions with the payment instrument service, the offer generation system may query a user data connectivity platform or other third-party data broker to obtain any external user interaction data corresponding to user online interactions with other online assets (e.g., websites not associated with the payment instrument service, applications not associated with the payment instrument service, electronic mail services, social media platforms, etc.), as described above.

As noted above, the offer generation system may process the available user interaction data (both internal and external to the payment instrument service), the provided user parameters, and the offer parameters for the landing page 502 through an offer selection machine learning algorithm that is dynamically trained to select a set of offers that may be presented to users. The offer selection machine learning algorithm may automatically evaluate a set of available offers according to the provided user data (e.g., user interaction data and user parameters), the offer parameters for the landing page 502, and any applicable rules to select a set of offers for the user. As illustrated in FIG. 5, the landing page 502 may be configured to accommodate four distinct offers 504 through a section reserved for the presentation of these offers. Accordingly, the offer selection machine learning algorithm may dynamically select a set of four offers 504 that may be presented to the user through the landing page 502. As an illustrative example, if the offer selection machine learning algorithm determines, based on the provided user interaction data, that the user is currently shopping for furniture and appliances for a new home, the offer selection machine learning algorithm may be more likely to select a set of offers associated with furniture and appliance brands subject to any applicable rules. As another illustrative example, if the offer selection machine learning algorithm determines, based on an applicable rule, that offers associated with a particular brand must be presented a set number of times within a pre-defined period to different users, and this requirement has not been satisfied, the offer selection machine learning algorithm may prioritize these offers when selecting the set of offers that are to be presented through the landing page 502.

In an embodiment, once the offer selection machine learning algorithm has dynamically selected a set of offers 504 for presentation to the user through the landing page 502, the offer selection machine learning algorithm provides a set of identifiers or other metadata associated with the selected set of offers 504 to an offer delivery system of the payment instrument service. The offer delivery system may use these identifiers or metadata to obtain any assets or other content usable to render the selected set of offers 504 through the landing page 502. Accordingly, when the browser application or native application receives these assets or other content, the browser application or native application may dynamically use the assets or other content to render the set of offers 504 on the landing page 502. This process may be performed in real-time or near real-time such that the set of offers 504 are presented to the user nearly instantaneously when accessing the landing page 502.

In an embodiment, as the user interacts with the set of offers 504 presented on the landing page 502, the payment instrument service may monitor, in real-time, these interactions to obtain any feedback that can be used to dynamically re-train or otherwise update offer selection machine learning algorithm. For instance, if the user selects a particular offer from the set of offers 504 presented through the landing page 502, the payment instrument service may use this selection as an indication that the user has responded positively to the particular offer. As another illustrative example, if the user selects an option to dismiss a presented offer (e.g., the user is not interested in the presented offer, the presented offer is repetitive, the user has already taken advantage of the offer, etc.), the payment instrument service may use this action as an indication that the user has responded negatively to the particular offer. These interactions with the presented offers 504 may be annotated and used to update the dataset used to dynamically train the offer selection machine learning algorithm. Thus, as the user navigates the landing page 502 and any other websites/landing pages associated with the payment instrument service, the user's interactions with presented offers may be used to further customize and tailor different offers that may be presented to the user through the landing page 502 and any other websites/landing pages during the present online session and any future online sessions with the payment instrument service.

Figure 6:
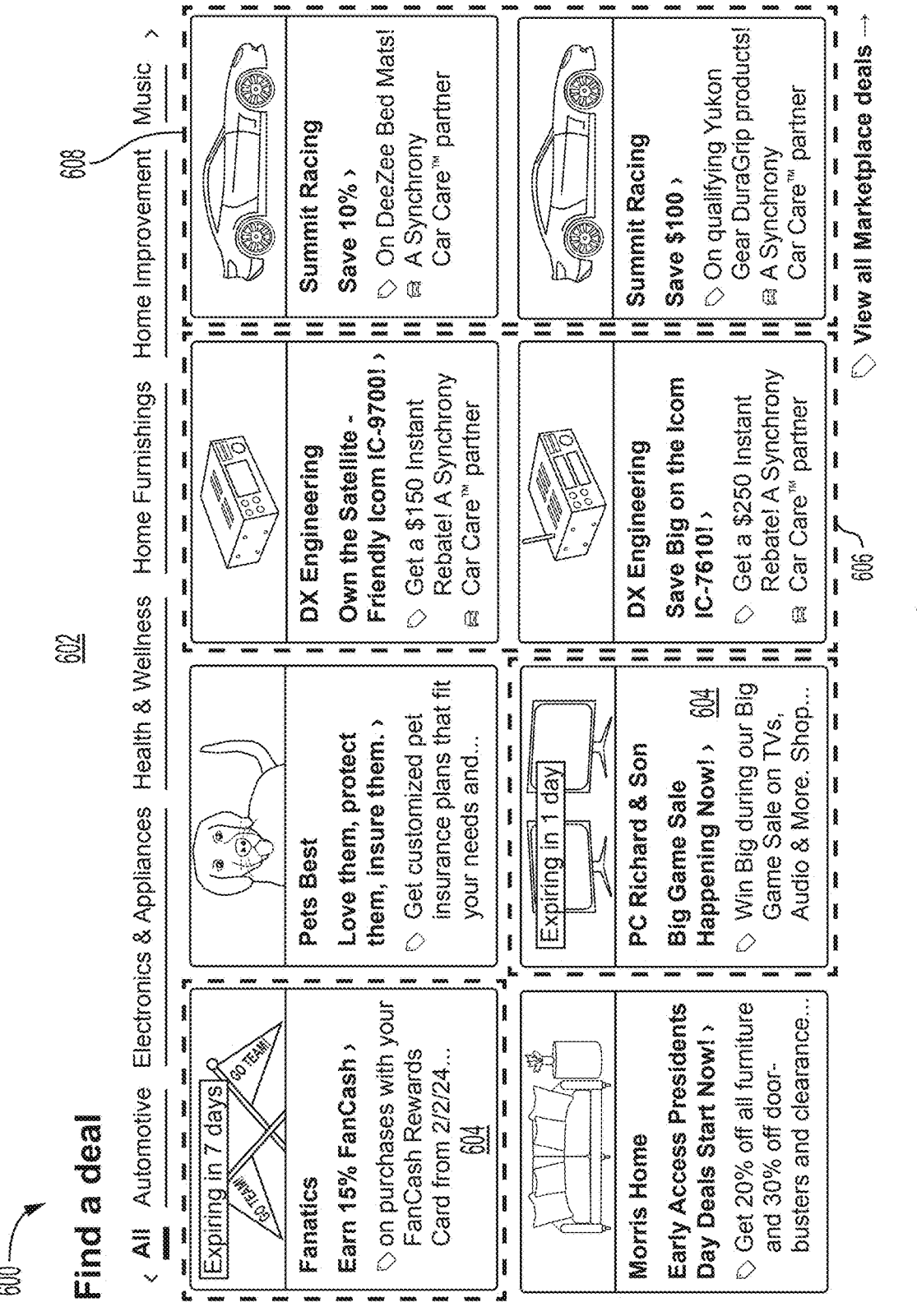
FIG. 6 shows an illustrative example of an environment through which a set of offers selected based on user interaction data is categorized and presented according to a set of applicable rules in accordance with at least one embodiment.

FIG. 6 shows an illustrative example of an environment 600 through which a set of offers selected based on user interaction data is categorized and presented according to a set of applicable rules in accordance with at least one embodiment. In the environment 600, the user may access a landing page 602 through which different deals (e.g., offers) may be presented to the user. The user may be accessing the landing page 602 during an ongoing online session with the payment instrument service. For instance, the user may navigate to the landing page 602 from the initial landing page 502 described above in connection with FIG. 5. Alternatively, the user may be accessing the landing page 602 using a URI or other network address corresponding to the landing page 602 and through a browser application or native application provided by the payment instrument service.

Similar to the process described above in connection with FIG. 5, when the user accesses the landing page 602, the browser application or native application implemented on the user's computing device may transmit an offers parameter API call through the dynamic offers API to obtain a set of offer parameters for the landing page 602. The set of offer parameters for the landing page 602 may include an indication that the offers to be presented through the landing page 602 are to correspond to the "deal" type or category. Further, the set of offer parameters for the landing page 602 may include an indication that up to a certain number (e.g., eight) of offers may be presented simultaneously through the landing page 602 within a designated area of the landing page 602. These identified offer parameters may be returned to the user in response to the offers parameter API call. The user may include the provided offer parameters to the dynamic offers API through the offers API call.

As noted above, if the user is interacting with the payment instrument service for the first time (i.e., the user is accessing the landing page 602 for the first time), the offers API call may be devoid of a user identifier and of a session identifier (e.g., null values are provided for both the user and session identifiers). Alternatively, if the user is accessing the landing page 602 to resume an ongoing online session with the payment instrument service, the offers API call may include, from a browser cookie or application storage, the user identifier associated with the user and the session identifier corresponding to the ongoing online session. For instance, if the user is accessing the landing page 602 through an initial landing page (such as the landing page 502 described above in connection with FIG. 5), the browser application or native application implemented on the user's computing device may persist (in a cookie or application storage, respectively) a user identifier corresponding to the user and a session identifier corresponding to the present online session with the payment instrument service. The session identifier may be associated with user interaction data corresponding to the user's interactions during the present online session. For example, if the user is accessing the landing page 602 from the aforementioned initial landing page, the session identifier may be associated with any user interaction data corresponding to the user's interactions with the initial landing page.

As noted above, the offers generation system, using any provided identifiers (e.g., session identifier and/or user identifier) and any user characteristics/parameters associated with the user (network address associated with the user's computing device, any available location data associated with the user, computing device configurations, etc.), may obtain any available user interaction data associated with the user. For instance, if the user is accessing the landing page 602 through an initial landing page associated with the payment instrument service, the offers generation system may use the provided session identifier and user identifier to identify the user interaction data corresponding to the user's historical interactions with the payment instrument service and any user interaction data corresponding to the user's interactions with the initial landing page. If the offers request does not include both the user identifier and the session identifier, the offer generation system may automatically determine that the payment instrument service does not currently maintain any user interaction data associated with the user, as described above. In addition to obtaining any available user interaction data corresponding to the user's interactions with the payment instrument service, the offer generation system may query a user data connectivity platform or other third-party data broker to obtain any external user interaction data corresponding to user online interactions with other online assets.

The offer generation system may process the available user interaction data (both internal and external to the payment instrument service), the provided user parameters, and the offer parameters for the landing page 602 through the offer selection machine learning algorithm that is dynamically trained to select a set of offers that may be presented to users. The offer selection machine learning algorithm may automatically evaluate a set of available offers according to the provided user data (e.g., user inter-action data and user parameters), the offer parameters for the landing page 602, and any applicable rules to select a set of offers for the user. As illustrated in FIG. 6, the landing page 602 may be configured to accommodate eight distinct offers through a section reserved for the presentation of these offers. Accordingly, the offer selection machine learning algorithm may dynamically select a set of eight offers that may be presented to the user through the landing page 602.

In the illustrative example of FIG. 6, the offer selection machine learning algorithm has determined, based on the provided user interaction data, that the user is likely a sports fan that is interested in automotive racing and engineering. The user interaction data may include information regarding the user currently being at a racetrack to watch a race. The information may be geolocation data and/or image data (e.g., of a racetrack or racecar) captured by a camera of a mixed-reality device. Further, the offer selection machine learning algorithm has determined, based on the provided user interaction data, that the user may be shopping for one or more appliances ahead of a big sporting event (e.g., TVs, sound systems, etc.). Accordingly, the offer selection system may select a set of offers 604 corresponding to the user's interest in sports, a set of offers 606 corresponding to the user's interest in engineering and technology, and a set of offers 608 corresponding to the user's interest in automotive racing. Additionally, the offer selection machine learning algorithm may select these offers according to the set of applicable rules defined by the payment instrument service and/or by the brands associated with these offers. Returning to the illustrative example of FIG. 6, the offer selection machine learning algorithm may select the specific set of offers 604 according to an applicable rule whereby offers set to expire within one week are to be prioritized over other similar offers. As another illustrative example, the offer selection machine learning algorithm may select the set of offers 606 and 608 for a particular set of brands based on applicable rules associated with these particular brands. For instance, referring the set of offers 606, if DX Engineering has defined a rule whereby its offers are to be contractually presented a pre-defined number of times to users that are interested in engineering products, the offer selection machine learning algorithm may determine whether this requirement has been satisfied and, if not, prioritize these offers 606 over other engineering-related offers.

Once the offer selection machine learning algorithm has dynamically selected a set of offers for presentation to the user through the landing page 602, the offer selection machine learning algorithm provides a set of identifiers or other metadata associated with the selected set of offers to the offer delivery system of the payment instrument service. The offer delivery system may use these identifiers or metadata to obtain any assets or other content usable to render the selected set of offers through the landing page 602 according to any configuration requirements defined by the offer selection machine learning algorithm. For instance, offers that are set to expire soon (e.g., offers 604) may be presented ahead of any other offers on the landing page 602. Further, offers associated with a particular brand may be grouped together within the landing page 602 (e.g., set of offers 606, set of offers 608). Accordingly, when the browser application or native application receives these assets or other content, the browser application or native application may dynamically use the assets or other content to render the set of offers on the landing page 602 according to these configuration requirements. This process may be performed in real-time or near real-time such that the set of offers are presented to the user nearly instantaneously when accessing the landing page 602.

As the user interacts with the set of offers 604-608 presented on the landing page 602, the payment instrument service may monitor, in real-time, these interactions to obtain any feedback that can be used to dynamically re-train or otherwise update offer selection machine learning algo-rithm. For instance, if the user selects a particular offer from the set of offers 604-608 presented through the landing page 602, the payment instrument service may use this selection as an indication that the user has responded positively to the particular offer. As another illustrative example, if the user selects an option to dismiss a presented offer (e.g., the user is not interested in the presented offer, the presented offer is repetitive, the user has already taken advantage of the offer, etc.), the payment instrument service may use this action as an indication that the user has responded negatively to the particular offer. These interactions with the presented offers 604-608 may be annotated and used to update the dataset used to dynamically train the offer selection machine learn-ing algorithm. Thus, as the user navigates the landing page 602 and any other websites/landing pages associated with the payment instrument service, the user's interactions with presented offers may be used to further customize and tailor different offers that may be presented to the user through the landing page 602 and any other websites/landing pages during the present online session and any future online sessions with the payment instrument service.

Figure 7:
FIG. 7 shows an illustrative example of a process for identifying a set of offer parameters and submitting a request to generate a set of offers presentable to a user in response to an API call in accordance with at least one embodiment.

FIG. 7 shows an illustrative example of a process 700 for identifying a set of offer parameters and submitting a request to generate a set of offers presentable to a user in response to an API call in accordance with at least one embodiment. The process 700 may be performed by a dynamic offers API, which may process incoming API calls to obtain a set of offers that may be displayed to a user through a website or native application landing page being accessed by the user through their browser application or a native application provided by the payment instrument service, respectively.

At step 702, the dynamic offers API may receive an API call from a user to obtain a set of offers that may be presented to the user through a website or native application landing page being accessed by the user. As noted above, the API call from the user may include identifying information associated with the user, as well as identifying information corresponding to an ongoing online session with the pay-ment service provider. For instance, if the user has previ-ously accessed the payment instrument service, the user (either in a cookie or application storage) may maintain a user identifier and session identifier associated with the user and corresponding to the user's interactions with the pay-ment instrument service. If the user is accessing the payment instrument service for the first time, the offers API call from the user may be devoid of a user identifier and a session identifier, as the user has not previously interacted with the payment instrument service. Alternatively, if the user has previously interacted with the payment instrument service but is otherwise initiating a new online session with the payment instrument service, the offers API call from the user may include the user identifier stored in the cookie or application storage. However, the offers API call in this instance may be devoid of a session identifier, as the user is initiating a new online session with the payment instrument service. In some instances, if the user is resuming an online session with the payment instrument service, the offers API call may include both the user identifier and the session identifier from the cookie or application storage.

At step 704, the dynamic offers API may evaluate the API call to determine whether the API call is associated with a new user (i.e., a user accessing the payment instrument service for the first time). As noted above, the API call from the user may include values corresponding to a user identifier and a session identifier that may be associated with the user and may correspond to user interactions with the payment instrument service. If the user is accessing the payment instrument service for the first time, the values corresponding to the user identifier and the session identifier may be null, as no identifiers may have been previously generated for the user by the payment instrument service. Accordingly, if the dynamic offers API determines that the values corresponding to the user identifier and the session identifier are null, the dynamic offers API may determine that the user is a new user accessing the payment instrument service for the first time.

If the dynamic offers API determines that the user is accessing the payment instrument service for the first time, the dynamic offers API, at step 706 and through an offer generation system implemented by the payment instrument service, may generate a new cookie or application storage that may be used to persist a new user identifier and session identifier for the user. The dynamic offers API may further persist the new user identifier and session identifier in the browser cookie if the user is accessing a website provided by the payment instrument service through a browser application executed on their computing device. Alternatively, if the user is accessing a native application landing page implemented by the payment instrument service through a native application implemented on the user's computing device, the dynamic offers API may persist the newly generated user identifier and session identifier in application storage corresponding to the native application executed on the user's computing device and provided by the payment instrument service.

If the dynamic offers API determines, based on its evaluation of the API call, that the user is not a first-time user of the payment instrument service (e.g., the value for the user identifier is not null), the dynamic offers API, at step 708, may determine whether the user is initiating a new session with the payment instrument service. As noted above, the API call to the dynamic offers API may include a set of fields corresponding to a user identifier associated with the user and a session identifier associated with an ongoing online session with the payment instrument service. If the user has previously accessed the payment instrument service but is initiating a new session with the payment instrument service, the API call transmitted by the user may include a user identifier associated with the user and may indicate a null value for the session identifier. Thus, to determine whether the API call corresponds to a new session with the payment instrument service, the dynamic offers API may determine whether the value for the session identifier is null.

If the dynamic offers API determines that the user is initiating a new session with the payment instrument service, the dynamic offers API, at step 710 and through the offers generation system, may generate a new session identifier associated with this new session and may persist this new session identifier in the browser cookie if the user is accessing a website provided by the payment instrument service through a browser application executed on their computing device. Alternatively, if the user is accessing a native application landing page implemented by the payment instrument service through a native application implemented on the user's computing device, the dynamic offers API may persist the newly generated session identifier in the application storage corresponding to the native application executed on the user's computing device and provided by the payment instrument service.

At step 712, the dynamic offers API may identify a set of offer parameters for presentation of different offers on the website or native application landing page being accessed by the user. For instance, the dynamic offers API may transmit a request to a parameter repository maintained by the payment instrument service to obtain a set of offer parameters for the particular website or native application landing page being accessed. As noted above, the parameter repository may store the available offer parameters used by the payment instrument service to categorize and organize the different offers made available by different brands and other entities for presentation through the website or other native application landing page. The available offer parameters may include the types of offers made available (e.g., financing offers, discounts, deals, etc.), the offer categories (e.g., décor, automotive, apparel, electronics, health and fitness, home furnishings, etc.), the brands or other entities associated with the payment instrument service, and the like. The available offer parameters may further include an indication of whether the payment instrument service provides its own set of offers according to any of the defined offer types and/or categories.

The available offer parameters may be defined by the payment instrument service according to the configuration of the website and any other landing pages or subsites through which different offers may be presented. For example, a website or other landing page implemented by the payment instrument service may allow for the presentation of a featured set of offers without indication of the type or category of offers being presented. Thus, the offer parameters for this website or other landing page may include the brands or other entities associated with the payment instrument service for which offers may be presented. Further, the offer parameters may further include an indication as to whether offers associated with the payment instrument service are available for presentation through this website or other landing page. As another illustrative example, if the user navigates to the online marketplace provided by the payment instrument service, and through which different offers may be presented according to different offer types, categories, and brands, the offer parameters may correspond to these different offer types, offer categories, and brands associated with the available offers presentable through the online marketplace.

At step 714, the dynamic offers API may transmit a request to the offer generation system to generate a set of offers in response to the user's API call. As noted above, the request may include the aforementioned offer parameters for the particular website or native application landing page, as well as the user characteristics or parameters provided by the user. If the user has previously interacted with the payment instrument service, the offers request may further include the user identifier and the session identifier (if the request is submitted during an ongoing online session) associated with the user. As noted above, if the user is accessing the payment instrument service for the first time, the offer generation system may dynamically generate new user and session identifiers for the user and, through the dynamic offers API, persist the new user and session identifiers in a browser cookie or in application storage. Similarly, if the offers request includes a user identifier but is devoid of a session identifier (i.e., the user is initiating a new online session with the payment instrument service), the offer generation system may dynamically generate a new session identifier the user and, through the dynamic offers API, persist the new session identifier in the existing browser cookie or application storage. However, in generating the set of offers that may be presented to the user, the offer generation system may utilize the original values for the session and user identifiers provided in the API call.

FIG. 8 shows an illustrative example of a process 800 for selecting a set of offers based on user interaction data corresponding to user interactions on a website associated with a payment instrument service and on external websites in accordance with at least one embodiment. The process 800 may be performed by the aforementioned offer generation system. As noted above, the offer generation system may implement and dynamically train an offer selection machine learning algorithm that can process any available user interaction data associated with a user, the offer parameters corresponding to the website or native application landing page being accessed, and any applicable offer rules to select a set of offers that may be presented to the user through the website or native application landing page. Thus, certain operations of the process 800 may be performed automatically by the offer selection machine learning algorithm based on these provided inputs.

At step 802, the offer generation system may receive a request to generate a new set of offers that may be presented to a user through a website or native application landing page being accessed by the user. As noted above, this request may be received from a dynamic offers API and may include values corresponding to a user identifier associated with the user and a session identifier corresponding to an ongoing session with the payment instrument service. As noted above, if the user is accessing the payment instrument service for the first time, the user and session identifiers associated with the user may be null. Alternatively, if the user is resuming an online session with the payment instrument service (e.g., accessing a new website or landing page through another website or landing page implemented by the payment instrument service, etc.), the request may include unique values for the user identifier and the session identifier. If the user has previously accessed the payment instrument service but is otherwise initiating a new online session with the payment instrument service, the session identifier may be null. The request may further include the set of offer parameters applicable to the website or native application landing page being accessed, as well as other characteristics or parameters associated with the user (e.g., the network address associated with the user's mixed-reality device, any available location data associated with the user, computing device configurations, etc.).

At step 804, the offer generation system may evaluate the request to determine whether the user is accessing the payment instrument service for the first time (e.g., the user is a new user to the payment instrument service). For instance, the offer generation system may evaluate the value corresponding to the user identifier provided in the request to determine whether this value is null. If the value corresponding to the user identifier is null, the offer generation system may determine that the user is a new user to the payment instrument service. Accordingly, at step 806, the offer generation system may determine any available user characteristics that may be used to identify any user interaction data from external sources and associated with the user. For instance, if the request includes a set of user characteristics or parameters, as described above, the offer generation system may extract this set of user characteristics or parameters from the request. In some examples, if the request is devoid of any user characteristics or parameters, the offer generation system may evaluate the request itself to identify any user characteristics or parameters. For example, through the API call, the offer generation system may determine the IP address or other network address of the user, an estimated location of the user (such as through IP geolocation, etc.), and the like.

If the offer generation system determines that the user has previously accessed the payment instrument service (e.g., the value corresponding to the user identifier is not null), the offer generation system may determine, at step 808, whether the user is initiating a new online session with the payment instrument service. As noted above, the API call to the dynamic offers API may include a set of fields corresponding to a user identifier associated with the user and a session identifier associated with an ongoing online session with the payment instrument service. If the user has previously accessed the payment instrument service but is initiating a new session with the payment instrument service, the API call transmitted by the user may include a user identifier associated with the user and may indicate a null value for the session identifier. Thus, to determine whether the request corresponds to a new session with the payment instrument service, the offer generation system may determine whether the value for the session identifier provided through the offers API call is null.

If the offer generation system determines that a session identifier has been provided in the request (i.e., the value corresponding to the session identifier is not a null value), the offer generation system, at step 810, may obtain any user interaction data corresponding to the current online session with the payment instrument service. As noted above, the user interaction data maintained by the payment instrument service for each user may be delineated according to when the user interaction data was collected. For instance, the offer generation system may distinguish user interaction data collected during a current, ongoing session with the payment instrument service from other historical user interaction data collected during prior sessions with the payment instrument service. Thus, if the request to generate new offers for the user includes a session identifier, the offer generation system may use this session identifier to identify any user interaction data that is specific to the ongoing online session between the user and the payment instrument service. Additionally, or alternatively, the offer generation system, at step 812, may further obtain any user interaction data corresponding to the user's previous or historical online sessions with the payment instrument service. This historical user interaction data may be obtained by the offer generation system using the provided user identifier.

At step 814, regardless of whether the user is accessing the payment instrument service for the first time (e.g., null values are provided for the user and session identifiers) or has previously accessed the payment instrument service (e.g., the session identifier and/or user identifier are provided in the request), the offer generation system may obtain any available user interaction data corresponding to the user's interactions with any external assets (e.g., websites not associated with the payment instrument service, applications not associated with the payment instrument service, electronic mail services, social media platforms, etc.). As noted above, the offer generation system may query a user data connectivity platform or other third-party data broker to obtain any external user interaction data associated with the user and corresponding to any external online interactions by the user with these external assets. This user interaction data may be obtained through cookies or application storage implemented on the user's computing device and associated with the different online assets that the user may interact with. The user data connectivity platform or other third-party data broker may generate, for each user, a unique identifier that may be used to deterministically associate the user with any user interaction data across these different online platforms and assets. This unique identifier generated by the user data connectivity platform or other third-party data broker may be associated with different user information that may be known to the payment instrument service (e.g., PII, name, physical address, network address, telephone number(s), etc.). The offer generation system may implement a translation layer through which the offer generation system can query the user data connectivity platform or other third-party data broker for any available user interaction data using any available user information that may be known to both the payment instrument service and the user data connectivity platform or other third-party data broker. Using this known user information, the offer generation system may query the user data connectivity platform or other third-party data broker to obtain any available user interaction data associated with the user. If the user is accessing the payment instrument service for the first time, the offer generation system 108 may use the user characteristics or parameters provided in the request to query the user data connectivity platform or other third-party data broker.

At step 816, the offer generation system, through an offer selection machine learning algorithm (such as the offer selection machine learning algorithm 206 described above in connection with FIGS. 2-3), may process the obtained user interaction data, available offers, and any offer parameters corresponding to the website or native application landing page being accessed to identify an initial set of offers that may be presented to the user through the website or native application landing page. As noted above, the offer selection machine learning algorithm is dynamically trained in real-time to process available user interaction data and/or user parameters, as well as the set of available offers corresponding to the defined offer parameters and any applicable rules, to identify different offers that may be presented to users. The offer selection machine learning algorithm may process the user interaction data from the user data connectivity platform or other third-party data broker and any user interaction data maintained by the payment instrument service (e.g., data corresponding to user interactions with websites, native application landing pages or interfaces implemented by the payment instrument service, etc.), as well as the set of available offers and the offer parameters to identify the initial set of offers that may be presented to the user through the website or native application landing page.

At step 818, the offer generation system may determine whether there are any applicable rules that may be used to refine the initial set of offers to select a final set of offers that may be presented to the user through the website or native application landing page. For instance, the offer generation system may obtain any rules that may be applicable towards the selection of a set of offers from the available offers maintained by the payment instrument service. As noted above, the payment instrument service, through an offer repository, may store offer-specific rules defined by the payment instrument service and/or the corresponding brand/ other entity for determining the methods in which corresponding offers may be presented to users. For example, offer-specific rules may indicate the number of times that particular offers are required to be presented within a period of time to users through a website or native application implemented by the payment instrument service. As another illustrative example, offer-specific rules may indicate whether the corresponding offers are to be prioritized according to their expiration date. In another illustrative example, an offer-specific rule may indicate that an offer may only be presented on particular websites/native application landing pages. The offer repository may further maintain a set of global offer rules that may be applicable to all offers made available through the offer repository.

If the offer generation system determines that there are a set of rules that are applicable to the initial set of offers selected by the offer selection machine learning algorithm, the offer generation system, at step 820, may process these rules through the offer selection machine learning algorithm to cause the offer selection machine learning algorithm to select the final set of offers according to these applicable rules. Alternatively, if the offer generation system determines that there are no applicable rules, the offer generation system, at step 822, may use the initial set of offers selected by the offer selection machine learning algorithm for presentation to the user.

At step 824, the offer generation system may present these selected offers to the user through the website or native application landing page being accessed. For instance, as noted above, the offer generation system may provide, to an offer delivery system implemented by the payment instrument service, a set of identifiers or metadata corresponding to the offers selected for presentation to the user through the website or native application landing page. In response to receiving this set of identifiers or metadata corresponding to the selected offers, the offer delivery system may obtain any content or other assets associated with the selected offers (e.g., HTML code, CSS, JavaScript code, applets, images, videos, text, mixed-reality OS, etc.) that may be used to render the offers through the website and/or native application landing page being accessed by the user. Once the offer delivery system has obtained the requisite content or other assets corresponding to the selected offers, the offer delivery system may transmit this content or other assets to the user's computing device for rendering of the selected offers through the browser application or native application implemented on the user's computing device. The content or other assets may include executable instructions that, when executed by the browser application or native application, may cause the browser application or native application to render these offers according to the pre-defined offer locations on the website or native application landing page, respectively.

Figure 9:
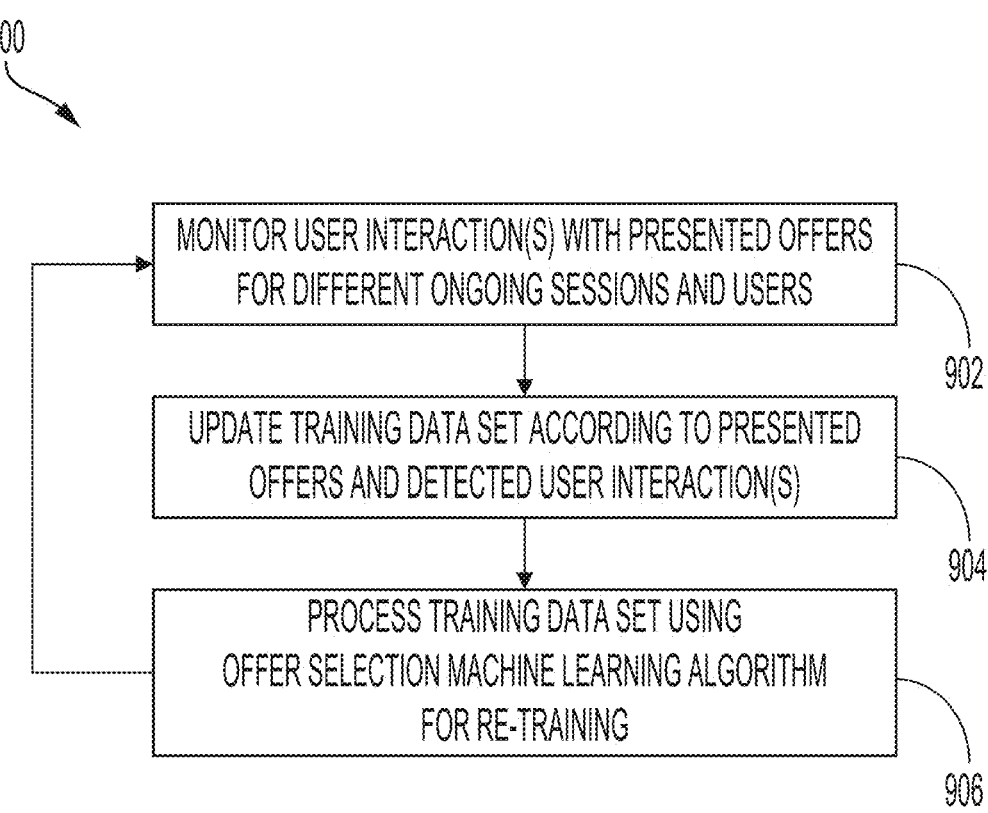
FIG. 9 shows an illustrative example of a process for monitoring user interactions with a presented set of offers to obtain feedback for updating an offer selection machine learning algorithm in accordance with at least one embodiment.

FIG. 9 shows an illustrative example of a process 900 for monitoring user interactions with a presented set of offers to obtain feedback for updating an offer selection machine learning algorithm in accordance with at least one embodiment. The process 900 may be performed by the aforementioned offer generation system, which may continuously monitor user interactions with the myriad websites and/or native application landing pages implemented by the payment instrument service to detect any user interactions with presented offers.

At step 902, the offer generation system may monitor, in real-time, any user interactions with different offers presented through different websites and/or native application landing pages implemented by the payment instrument service and corresponding to different users. As noted above, the offer generation system may monitor, in real-time, any user interactions with the selected offers to obtain any feedback that can be used to dynamically re-train the offer selection machine learning algorithm implemented by the offer generation system for selecting offers presentable to different users. For instance, if a user selects a particular offer from those presented through a website or native application landing page, the offer generation system may use this selection as an indication that the user has responded positively to the particular offer. As another illustrative example, if the user selects an option to dismiss a presented offer (e.g., the user is not interested in the presented offer, the presented offer is repetitive, the user has already taken advantage of the offer, etc.), the offer generation system may use this action as an indication that the user has responded negatively to the particular offer. These interactions with the presented offers may be annotated by the offer generation system. It should be noted that this monitoring of user interactions with the presented offers may be performed continuously and simultaneously for different websites and/or native application landing pages as different users interact with these different websites and/or native application landing pages and the myriad offers presented therein. Further, as the offers presented to these different users may be unique to each user based on their available user interaction data, the annotations corresponding to these interactions may indicate which user is associated with each interaction, which offer(s) were presented to each user through the corresponding website/native application landing page, and the response of the user to these offer(s). Since many users may be simultaneously accessing the payment instrument service through different websites and native application landing pages at the same time, this monitoring and annotation of user interactions is performed in real-time or near real-time and could not be performed through the human mind.

At step 904, the offer generation system dynamically, and in real-time or near real-time, updates the training dataset according to the offers presented to these different users and the corresponding user interactions with these offers. For instance, the offer generation system may generate, using the aforementioned annotations, new data points that may be added to the dataset to expand the breadth of the dataset. Since the aforementioned annotations are generated in real-time as different users interact with different offers presented through the different websites/native application landing pages implemented by the payment instrument service, the updating of the dataset used to train the offer selection machine learning algorithm may also be performed in real-time.

At step 906, the offer generation system may process the updated training dataset through the offer selection machine learning algorithm to re-train the offer selection machine learning algorithm. Returning to an earlier example, if a user selects a particular offer from those presented through the website or native application landing page, the offer generation system may use this selection as an indication that the user has responded positively to the particular offer. Accordingly, the offer generation system may annotate this particular offer to indicate that the user responded positively to the offer and may update the dataset to include this annotation. Processing of the updated dataset may result in reinforcement of the offer selection machine learning algorithm such that, for similar users and user interaction data, the likelihood of this offer being selected may be maintained or increased. Alternatively, if the user selects an option to dismiss a selected offer (e.g., the user is not interested in the selected offer, the selected offer is repetitive, the user has already taken advantage of the selected offer, etc.), the offer generation system may use this action as an indication that the user has responded negatively to the selected offer. The offer generation system may annotate this particular offer to indicate that the user responded negatively to the offer and may update the dataset to include this annotation. Processing of the updated dataset may result in re-training of the offer selection machine learning algorithm such that, for similar users and user interaction data, the likelihood of this offer being selected may be reduced.

As noted above, the real-time monitoring of user interactions with selected offers may be performed for different users accessing the website or native application landing page simultaneously and continuously as these different users interact with the different offers selected for them. This simultaneous and continuous monitoring of interactions with the selected offers presented to different users may allow for dynamic updating of the dataset used to train the offer selection machine learning algorithm. Thus, the offer selection machine learning algorithm may be dynamically updated in real-time as different users interact with the different offers selected by the offer selection machine learning algorithm for these different users. This may allow for continuous improvement in the accuracy of the offer selection machine learning algorithm in selecting different offers according to each user's unique characteristics and interaction data.

Figure 10:
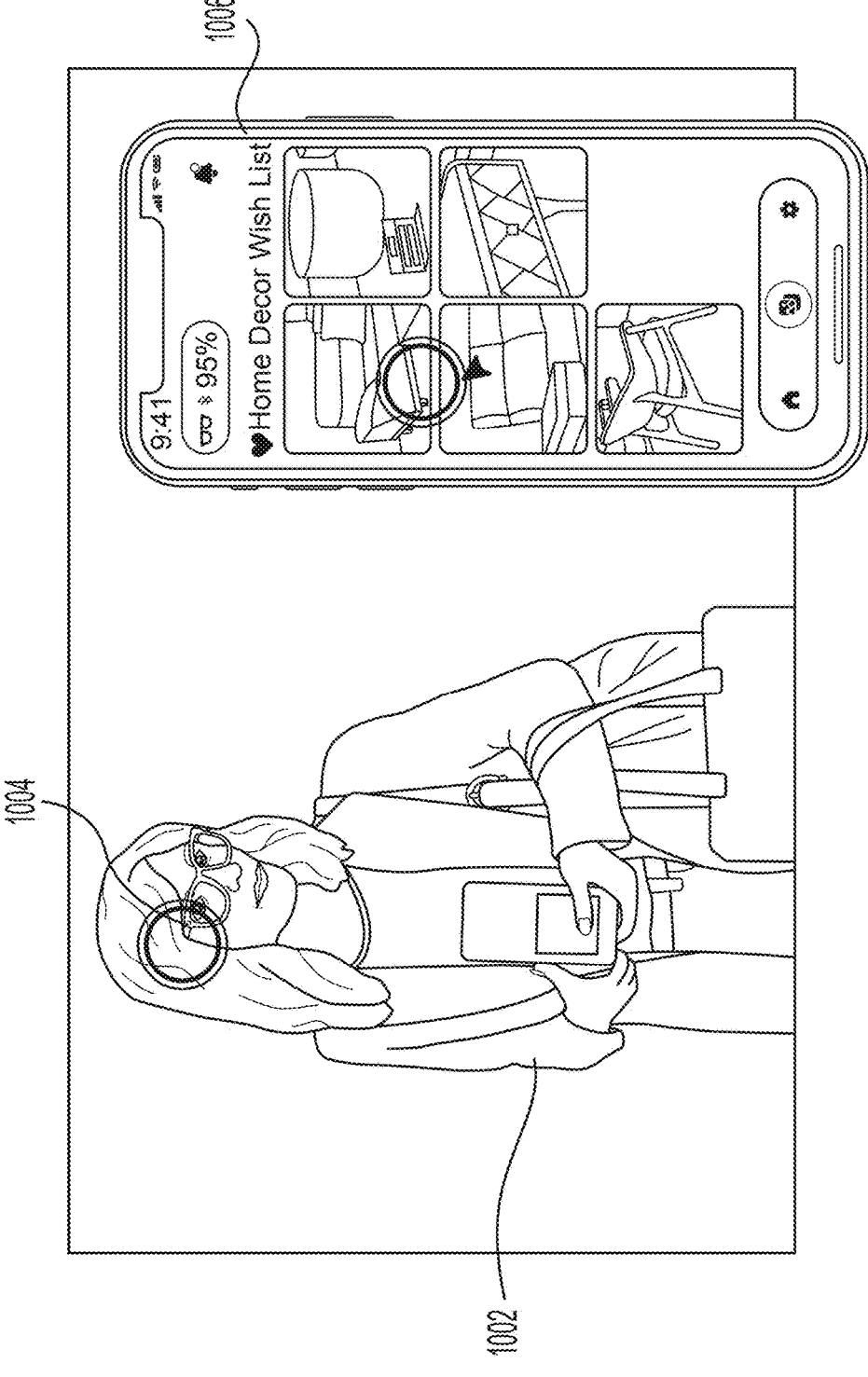
FIG. 10 shows an illustrative example of a customer creating a wish list using smart glasses according to embodiments of the present invention.

FIG. 10 shows a customer 1002 wearing smart glasses 1004 for creating a wish list. Smart glasses 1004 may have a camera that captures real-time images or video of the surroundings. The camera may have the same view as customer 1002. Customer 1002 may be at a merchant or service provider. Customer 1002 may notice a particular product of interest. In some embodiments, customer 1002 may be interested in a particular service featured on a sign or other display material. Customer 1002 may instruct smart glasses 1004 to capture the image of the product or service. The instruction may be by a voice command or a button or other input. The image may be saved in a wish list. The wish list may be a list of products or services that the customer may be interested in procuring or may want to research in more detail. The wish list may be displayed and edited on mobile phone 1006. As an example, a wish list may be categorized, e.g., a home décor wish list. The categories may be manually curated by customer 1002 or categorized through a machine learning model. The machine learning model may be a neural network trained on a data set with images and labels indicating a category.

The captured images may also include metadata that may provide the location of the image, the merchant identity, or the price of the product or service. The list of items in the wish list, along with the metadata, may be input into an offer selection machine learning model, including any described herein.

FIG. 10 shows two devices, smart glasses 1004 and mobile phone 1006, for capturing an image and then displaying the captured image and viewing a saved wish list. In embodiments, a mixed-reality headset can combine the functions of smart glasses 1004 and mobile phone 1006. The mixed-reality headset, using an outward-facing camera, can capture an image of a product. The wish list can be projected within the display of the mixed-reality headset. The wish list may be superimposed over the real-world view or an image of the real-world. A mixed-reality headset provides advantages over separate smart glasses 1004 and mobile phone 1006 by avoiding customer 1002 having to switch attention between two different devices. On the other hand, separate smart glasses 1004 and mobile phone 1006 may be a more convenient and discreet setup.

Figure 11:
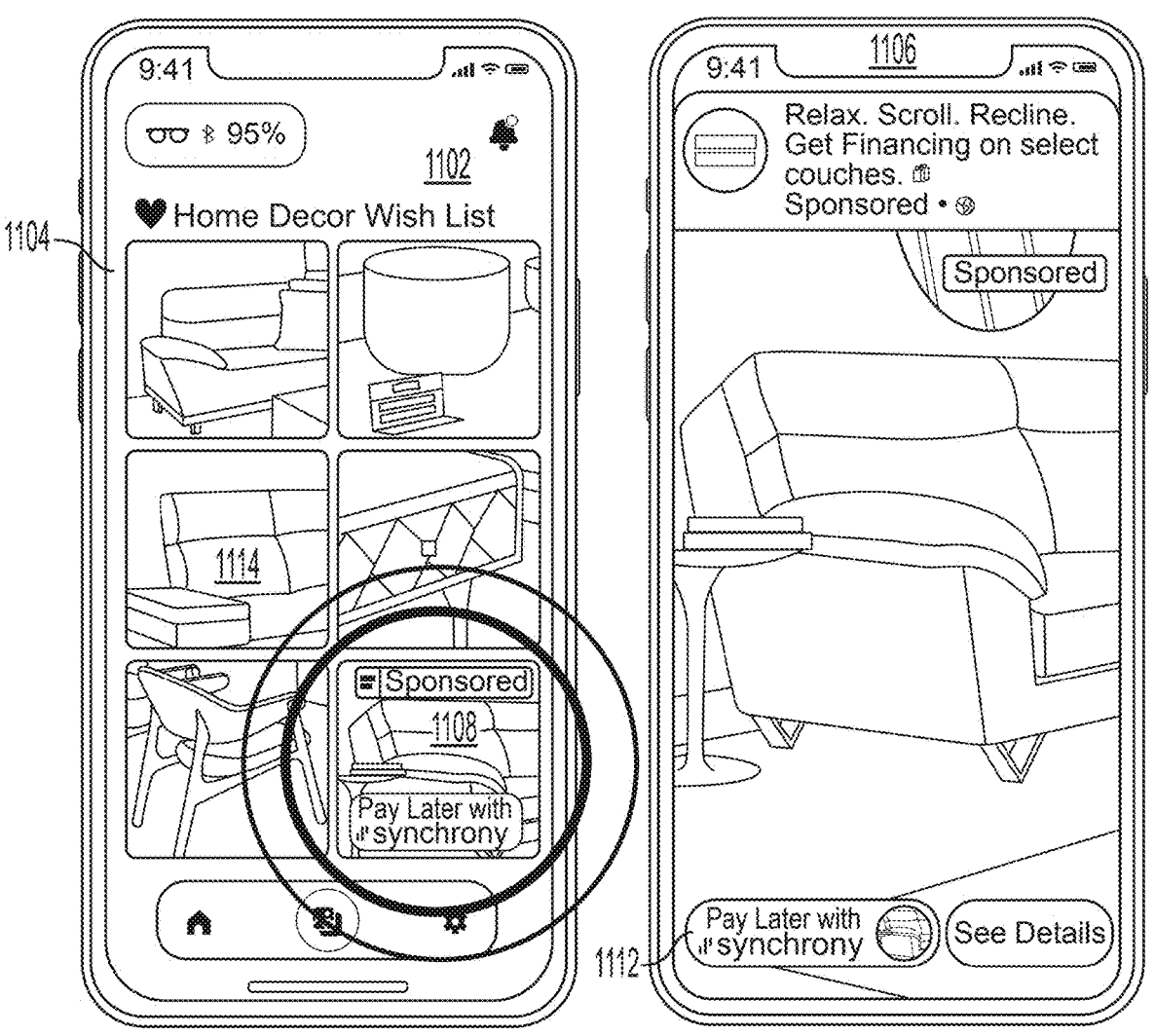
FIG. 11 shows a wish list for a user according to embodiments of the present invention.

FIG. 11 shows a wish list 1102 on mobile device 1104. Wish list 1102 may include the wish list of FIG. 10. An offer selection machine learning model may process wish list 1102 and select an offer or set of offers to present to the customer. The offer may be sponsored post 1106, which may be present as item 1108 in wish list 1102. Sponsored post 1106 and item 1108 may have indications showing that different financing options (e.g., pay later option 1110) are available and that the item is sponsored. A similar item 1114 may not show financing options or that the item is sponsored. In addition to wish list 1102, the offer selection machine learning model may use the location of the customer (e.g., as determined by a geolocation device in a mobile phone or mixed-reality headset), the merchant identity where the customer is located, or nearby merchant identities. In a mixed-reality headset, sponsored post 1106 may appear in the headset display. In some embodiments, sponsored post 1106 may be an offer for a product in the current location. Wayfinding (e.g., arrows, directions) may be displayed in the headset to direct the customer to products in the current location that are covered by the offer.

Figure 12:
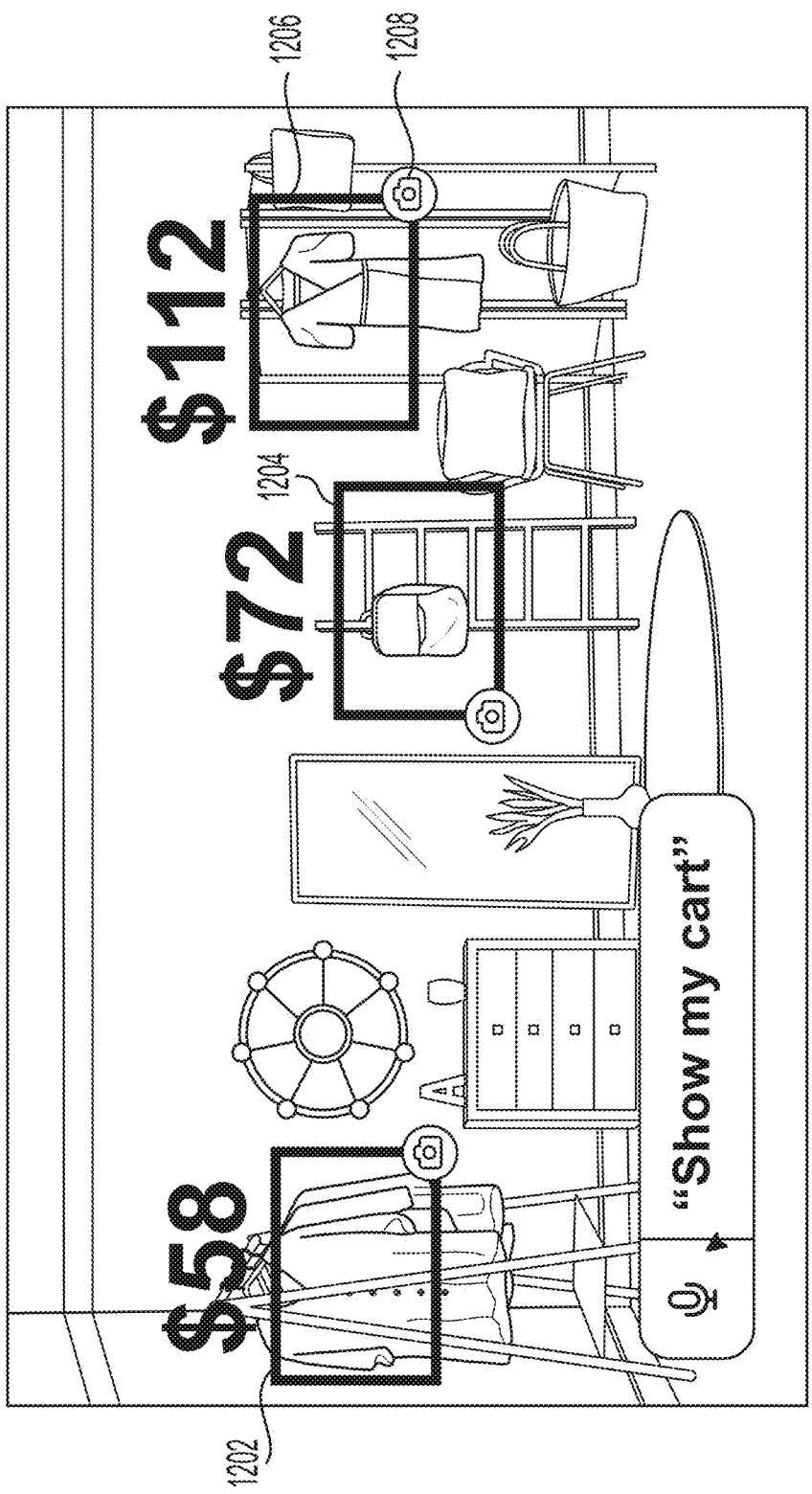
FIG. 12 shows a shopping cart calculator according to embodiments of the present invention.

FIG. 12 shows a shopping cart calculator. The shopping cart calculator may display the prices of all items that the user has indicated they want to purchase or procure. For example, the shopping cart may include blouse 1202 at $58, backpack 1204 at $72, and sun dress 1206 at $112. In embodiments, the items and their respective prices may be displayed in a list or table. In some embodiments, the items and their respective prices may be displayed superimposed over a real-world view, which may be an image or a live view. FIG. 12 shows the items and prices superimposed over a real-world view. The shopping cart may be displayed in the headset and/or on a mobile device (e.g., mobile phone or tablet). The shopping cart may also include an option 1208 to view a separate image of the item. The separate image of the item may have been captured by a camera while the user was examining the item and considering or deciding on its purchase.

The image may be captured after a specific instruction by the user or automatically captured in real-time by the mixed-reality device using a machine learning model. The image capture may happen continuously, with images stored in memory or cache. The machine learning model may identify the object from images using as input the images, user interaction data (e.g., scanning a code, or voice or other input to place item in shopping cart), and/or the shopping cart information. The machine learning model may be trained by a training data set including images captured from video, labels identifying the image or a portion thereof as the identified object, and/or any other input described herein.

FIG. 13 shows a visualization of the shopping cart. The shopping cart may show the items in the cart, their prices, and a total 1302 amount. The shopping cart may also display finance options. For example, FIG. 13 shows a monthly payment 1304 of $42 for six months. The monthly payment may be generated by accessing a financing database including terms of loans and other financing options. The terms may include the interest rate type (fixed or variable), interest rate, grace period, payment schedule, or late fee. In some embodiments, the terms show may be based on a credit rating or other score of the user. In some embodiments, the terms in the financing database may be adjusted based on feedback from users selecting or not selecting financing options. For example, if too many users (above a threshold amount or threshold percentage of users) select financing, then the interest rate may be adjusted upward. As another example, if too few users (below a threshold amount or threshold percentage of users) select financing, then the interest rate may be adjusted upward. The visualization may be displayed in the mixed reality headset and/or on a mobile device (e.g., phone or tablet). In some embodiments, the information regarding the shopping cart and/or the financing terms may be audibly conveyed through speakers of the mixed reality headset or smart glasses.

Figure 14:
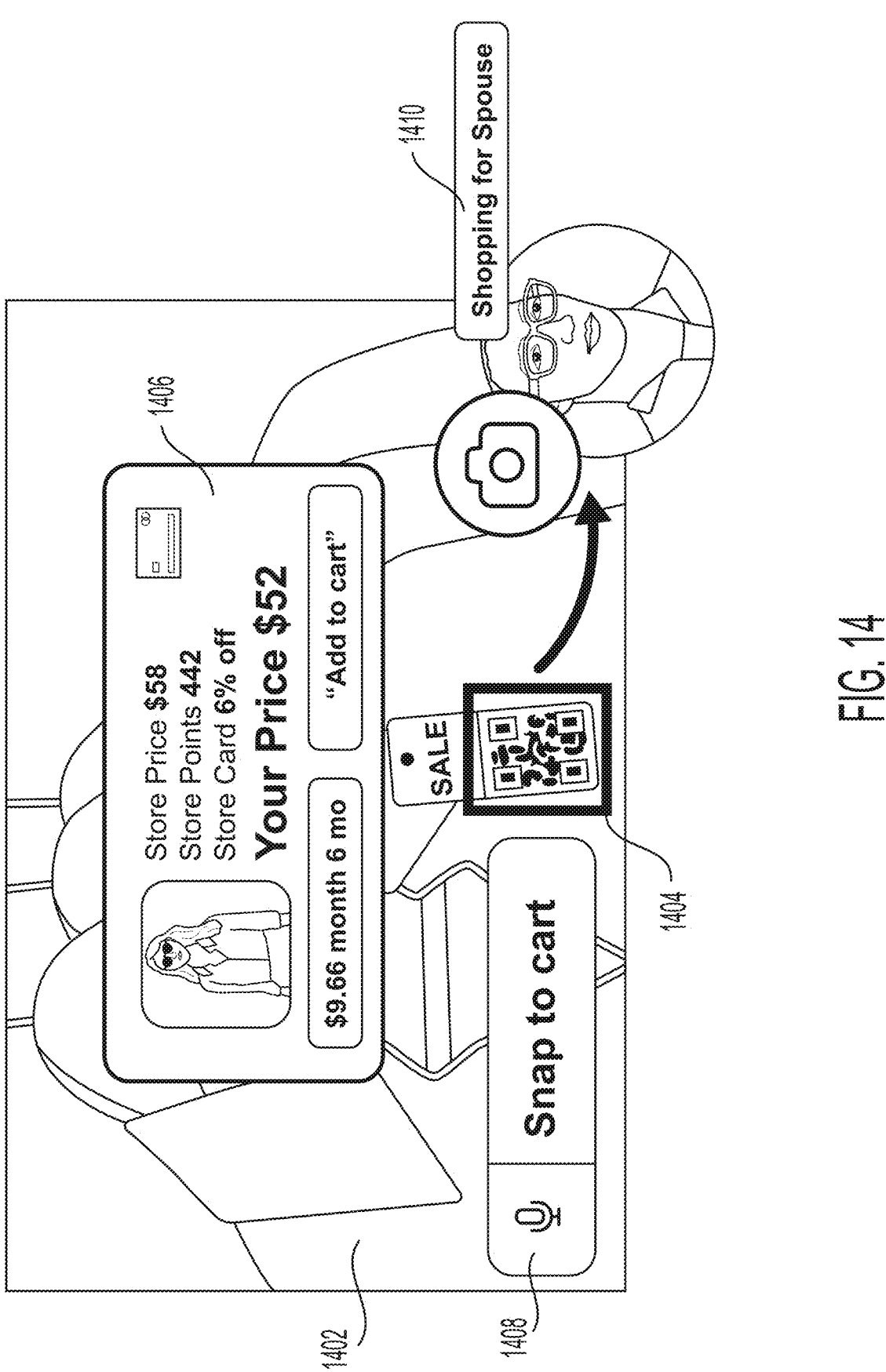
FIG. 14 shows a visualization of dynamic financing of an item according to embodiments of the present invention.

FIG. 14 shows a visualization of dynamic financing of an item. FIG. 14 shows a shirt 1402. Shirt 1402 may be tagged with a QR code 1404. The user may scan QR code 1404 using a camera of the mixed reality device, smart glasses, or a mobile device. The user may instruct the device to display the information in QR code 1404, which may include opening a link in QR code 1404. In some embodiments, the information in QR code 1404 may automatically be displayed when QR code 1404 is in a certain field of view of a camera. For example, the information in QR code 1404 may automatically be expanded when QR code 1404 resides in the middle of the field of view. The middle may include the center 10%, 20%, 30%, 40%, 50%, 60%, 70%, 80%, or 90% of the field of view. The QR code 1404 being in the center of the field of view may indicate that the user is focusing on QR code 1404.

QR code 1404 may provide information on the price of an item. In addition, QR code 1404 may provide payment options 1406. Payment options 1406 may include alternative and/or dynamic payment options. For example, payment options 1406 may include the store price of the shirt, which would be the price paid for by ordinary payment methods. Payment options 1406 may include payment using store points, which may be reward points accumulated through purchases at a particular merchant(s), using a particular credit card, or through promotions (e.g., signing up for a credit card). Payment options 1406 may also include a discount for paying with a store card, with the discount and/or the final price shown. Payment options 1406 may also include financing terms (e.g., monthly payment and term), similar to the description in FIG. 13. The user/customer may have the option 1408 to add the item to the shopping cart. The instruction may be through a voice command or other input. The user/customer may also have an option 1410 to tag items as intended for another individual (e.g., spouse).

Payment options 1406 may include querying a payment instrument service for information. For example, a query may be made to check how many store points the user possesses. As another example, a query may be made to check whether the user has a store card. These queries may be made on demand or may have been previously made and the information may be stored as part of a user profile.

Figure 15:
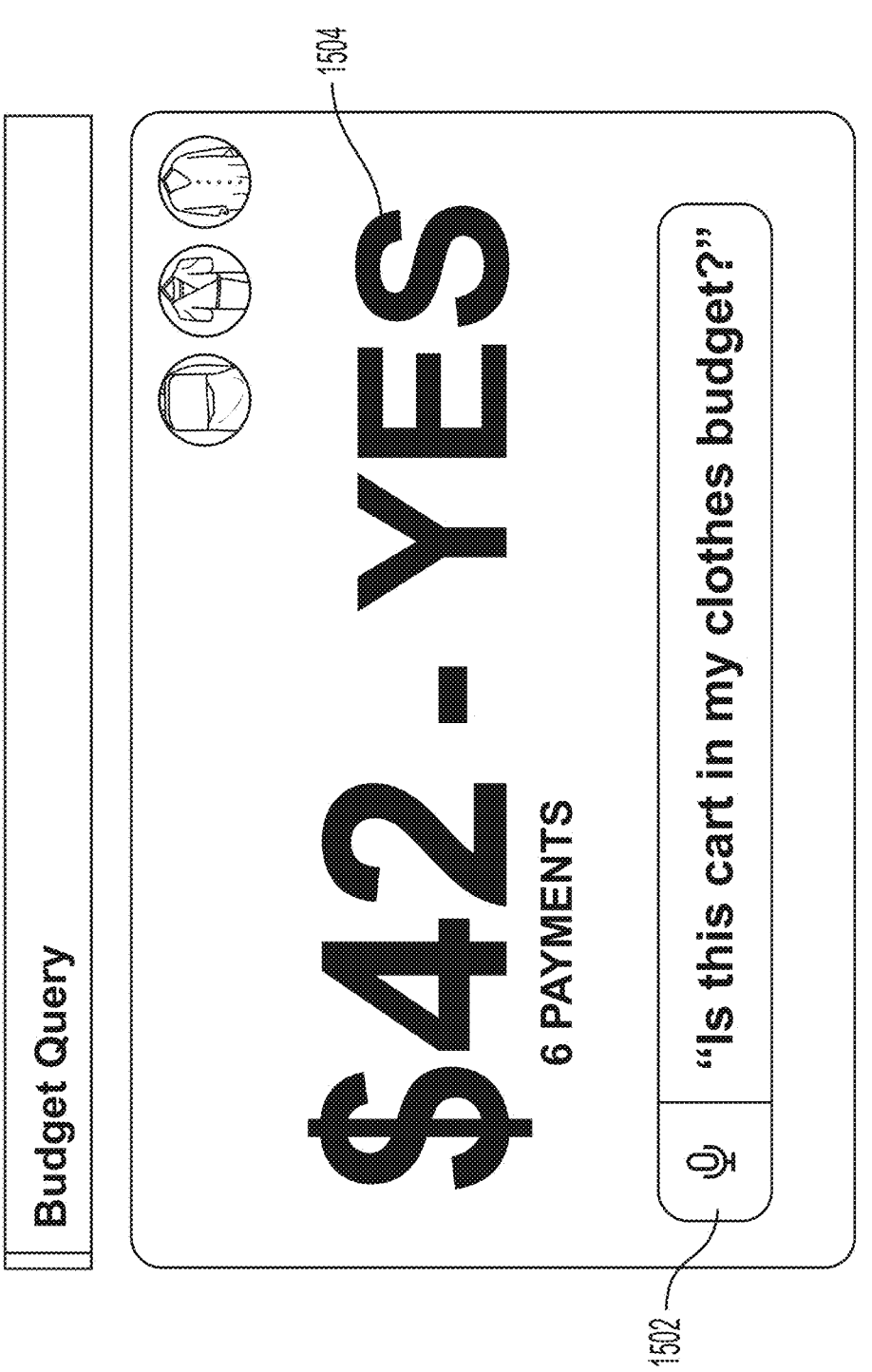
FIG. 15 shows a budget checking feature according to embodiments of the present invention.

FIG. 15 shows an option to check whether a payment option fits within a budget. The user may ask a question 1502 of whether the shopping cart fits within a budget. The budget may be specific to a type of product (e.g., a clothes budget). In embodiments, the threshold for the budget may be previously set by the user and stored in user profile. In embodiments, the threshold for the budget may be calculated based on past spending in the category. For example, the budget may be determined by the average monthly spending over the past year (or some fixed time period) and adjusted by a multiplier (e.g., 0.9, 1.0, 1.1) to determine a monthly budget. The selected payment option from payment option 1406 may then be compared to the monthly budget. If the selected payment option has a value below the budget, then a classification 1504 of the payment option being within the budget is outputted. If the payment option has a value above the budget, then a classification 1504 of the payment option being above the budget is outputted.

Figure 16:
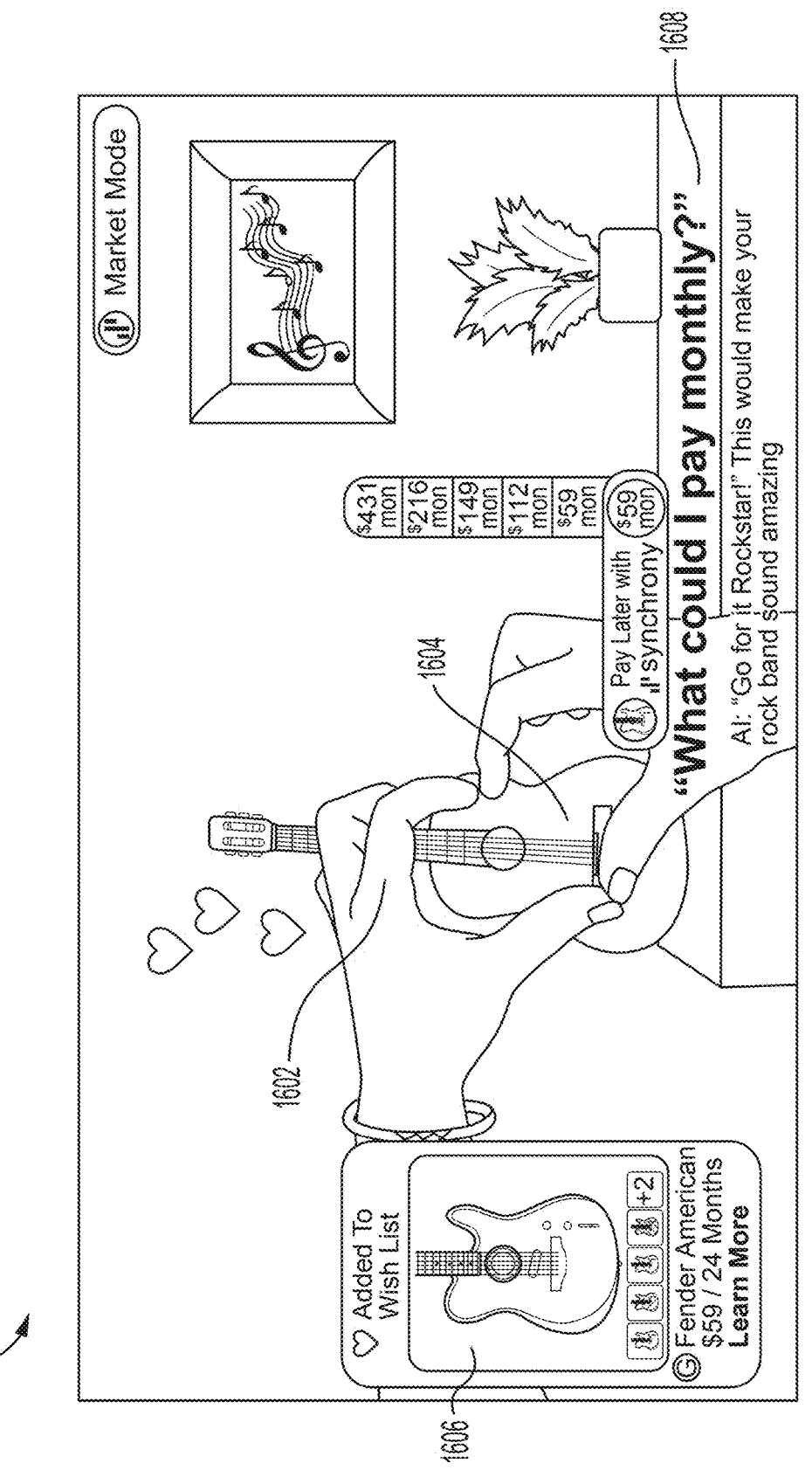
FIG. 16 shows an option for a mixed-reality device to analyze hand gestures according to embodiments of the present invention.

FIG. 16 shows an option for a mixed-reality device to analyze hand gestures. FIG. 16 shows an example view 1600 of a mixed-reality device of a user. The user may make a "hands-in-heart shape" gesture over product 1604. The mixed-reality device may perform image recognition on object 1604 and recognize object 1604 as a guitar. The user does not need to be in a store to perform the gesture. The "hands-in-heart shape" may indicate the guitar is a to be added to a wish list. Wish list 1606 may indicate that the guitar is added to the wish list. The mixed-reality device may find prices for the guitar in a store, which may be a partner store or the store in which the user is located. Wish list 1606 may indicate financing options in addition to or as an alternative to price. The user may ask whether the guitar may fit within a budget, as shown in query 1608. The mixed-reality device may compare the price or the financing payments to a threshold and determine that the user can afford the guitar. Additionally, the mixed-reality device may provide a tailored response (e.g., "Go for it, rockstar!" or "This would make your rock band sound amazing"), which may be generated by a machine learning model based on previous user interactions.

Figure 17A:
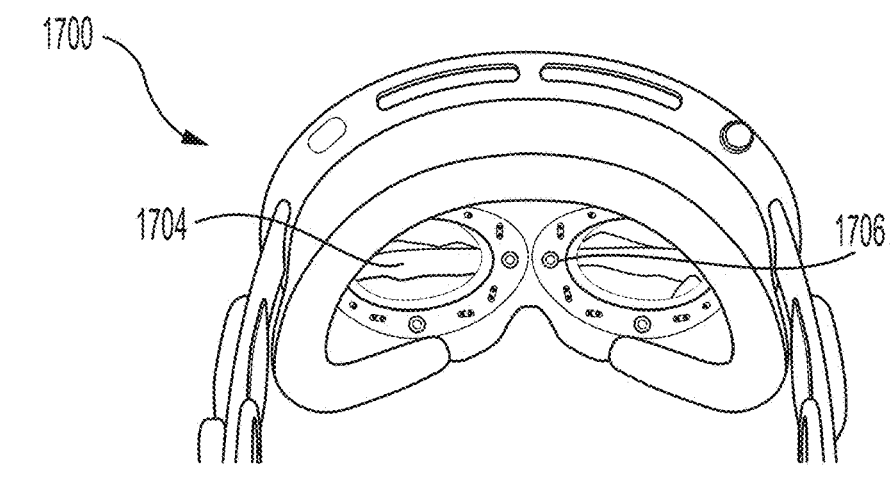
FIGS. 17A, 17B, and 17C show views of a mixed-reality headset according to embodiments of the present invention.
Figure 17B:
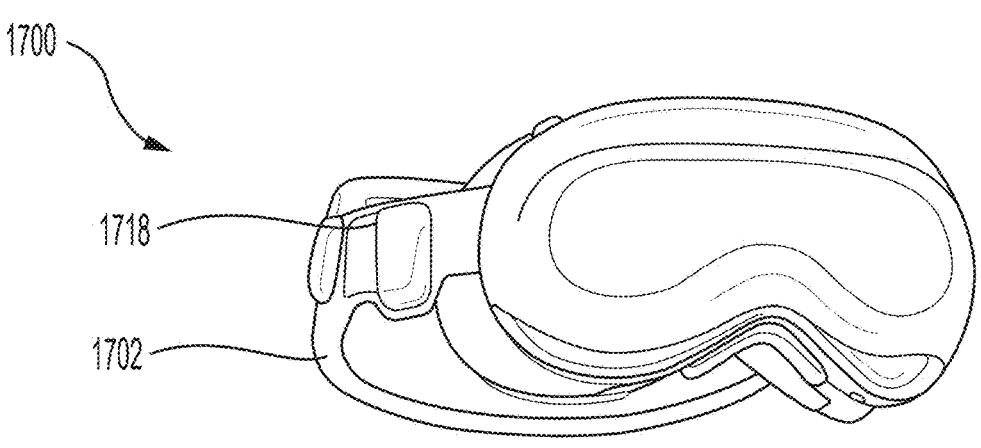
Figure 17C:
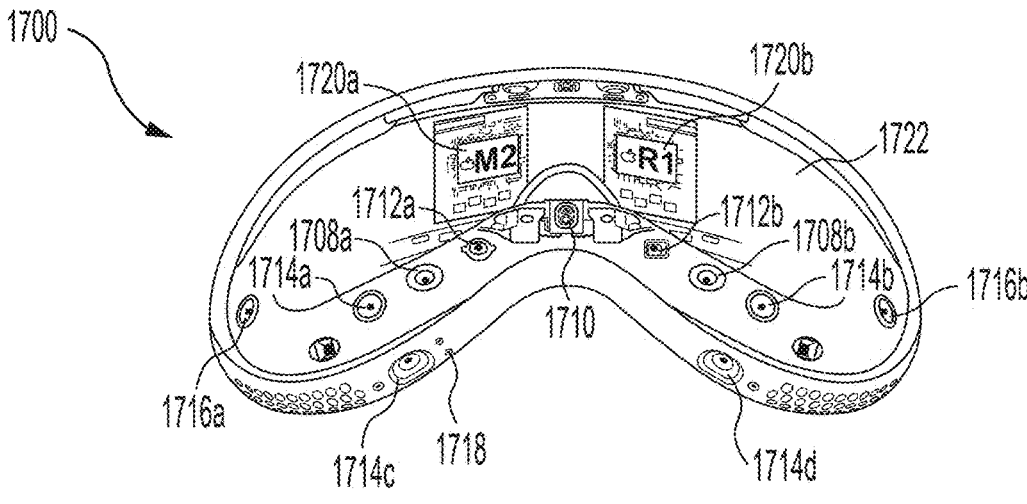

FIGS. 17A and 17B show different views of a mixed-reality headset 1700. FIG. 17A is a view from the user's perspective before wearing the headset. FIG. 17B is a view from outside the headset. FIG. 17C shows the different sensors and other components of the headset.

A mixed reality headset may be a wearable device configured to integrate augmented reality (AR) and virtual reality (VR) technologies, enabling a seamless and immersive user experience. The device may feature a lightweight, ergonomic frame constructed from durable composite materials, designed for comfort and structural integrity. Adjustable straps 1702 may be incorporated to ensure secure positioning on the user's head.

The headset includes a high-resolution display system 1704. Display system 1704 may include dual screens, each aligned for stereoscopic 3D viewing. Display system 1704 may include a micro-OLED, OLED, LED, LCD, or other suitable display systems. Display system 1704 may supports high refresh rates (e.g., 90 Hz to 120 Hz, 144 Hz to 240 Hz, above 360 Hz) to reduce latency, reducing motion sickness and enhancing visual fidelity. Custom lenses may be included to optimize clarity and mitigate visual distortions, while integrated eye-tracking sensors 1706 provide precise gaze detection, facilitating intuitive interaction within virtual environments. This eye-tracking system may enable the device to render higher detail in the user's focal area, conserving processing resources for peripheral visuals. Eye-tracking sensor 1706 may be an infrared camera.

The mixed reality headset further incorporates an array of outward-facing cameras and sensors, including LiDAR scanners, infrared (IR) cameras, and/or depth sensors. For example, headset 1700 may include forward facing cameras 1708*a* and 1708*b*. These cameras may capture images for the user to see. Headset 1700 may also include LiDAR scanner 1710, which may help determine ranges from objects in the environment. Headset 1700 may include IR cameras 1712*a* and 1712*b*, which may be used with LiDAR scanner 1710 for range detection and facial recognition. Headset 1700 may include downward cameras 1714*a*, 1714*b*, 1714*c*, and 1714*d*. These cameras may capture part of the image for display system 1704 and may be used to help track objects that are not in the field of view of the forward-facing cameras or scanners. Side cameras 1716*a* and 1716*b* may face the sides of the headset and may also serve a similar purpose as downward cameras 1714*a-d*. These components are configured for spatial mapping and real-world object tracking, allowing for accurate overlaying of digital content on physical surroundings. The sensor suite ensures precise environmental awareness and interaction responsiveness.

A hand-tracking system may be included, utilizing cameras (e.g., forward, downward, and side) and computer vision algorithms to interpret user hand gestures for controller-free input. This may facilitate natural user interaction and gesture-based navigation. The device also may include an integrated spatial audio system with strategically positioned speakers (e.g., speaker 1718) near the ears, employing beamforming technology to deliver 3D audio that complements the visual experience. Noise-canceling microphones may be embedded to enable voice command input and clear communication.

The processing unit of the mixed reality headset is a dedicated system may include one or processors (e.g., processor 1720*a* and 1720*b*) configured for AR/VR operations. The processors may support real-time rendering of complex graphics, machine learning processes for hand and eye tracking, and energy-efficient operation for extended use. This processing system may be integrated directly into the headset. The processor may be between display system 1704 and an outer display system 1722, which may display images for people in the user's environment to see. For example, outer display system 1722 may show images of the users eyes and face.

Connectivity features may include wireless options, such as Wi-Fi and Bluetooth, facilitating interaction with external devices. A port may be included for charging and potential data transfer. The system may allow for expansion through external accessories to enhance functionality. Power may be supplied via a rechargeable battery system either embedded in the headset or connected through a lightweight cable to an external battery pack. The power system may be designed for several hours of continuous operation, with power management features to optimize performance and thermal control.

The user interface may be designed to facilitate ease of use, employing a combination of voice commands, eye-tracking inputs, and hand gestures. The navigation system may enable users to interact with virtual objects through eye focus and simple gestures. Customization options may include adjustable interpupillary distance (IPD) settings and face cushions to fit different users, enhancing comfort and visual alignment. The modular design supports potential hardware upgrades.

Safety features may include an automatic environment detection system that alerts the user to nearby physical obstacles. A pass-through mode may allow users to switch rapidly between immersive virtual reality and a mixed-reality view of their physical surroundings, enhancing situational awareness and safety.

Figure 18:
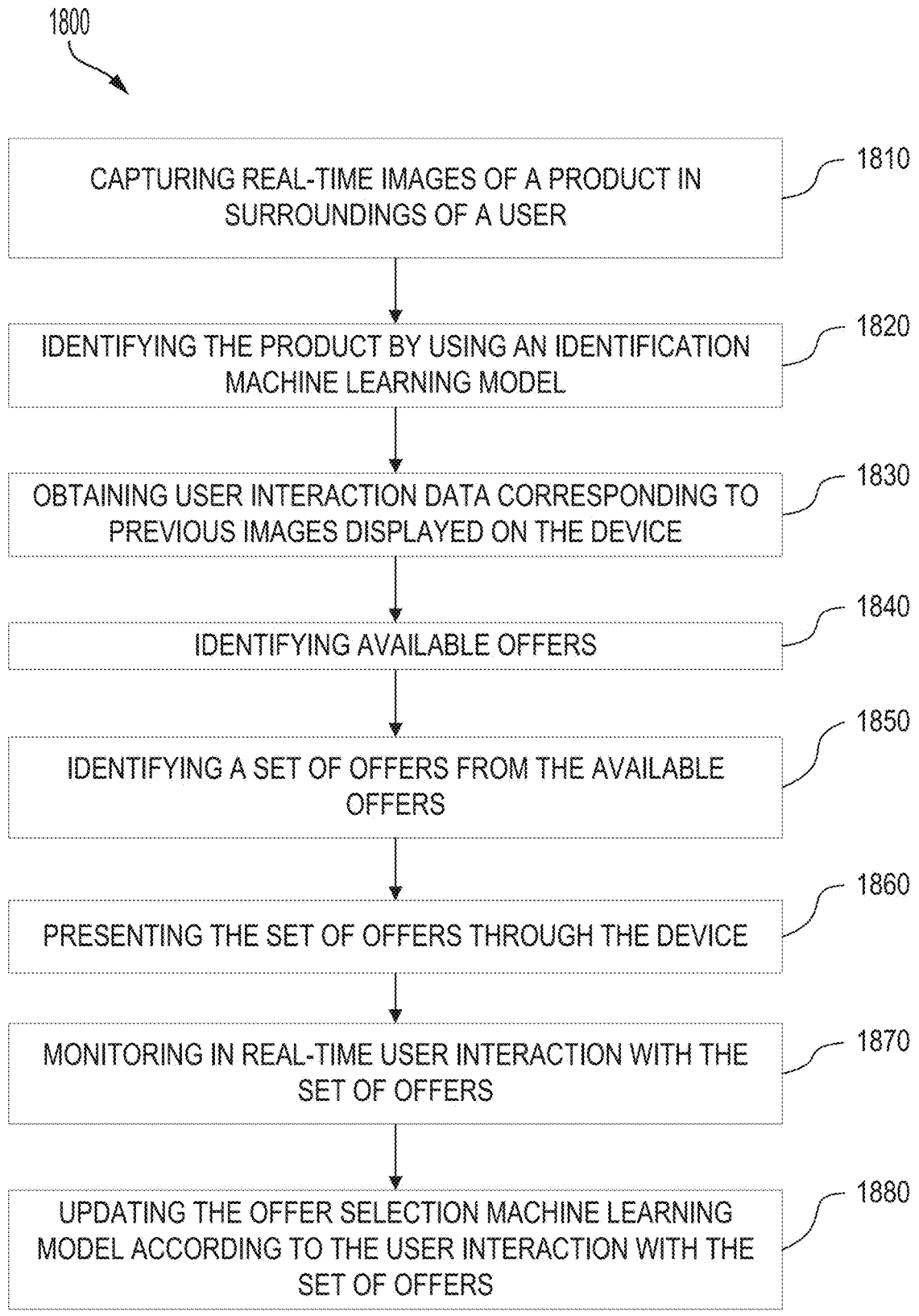
FIG. 18 shows a flowchart of a method for updating an offer selection machine learning model and for presenting offers to a user according to embodiments of the present invention.

FIG. 18 is a flowchart of an example method 1800 for updating an offer selection machine learning model to present offers to a user through a device. The device may be a mixed-reality device. The mixed-reality device may be an augmented reality headset, such as mixed-reality headset 1700, or any mixed-reality device described herein. In some embodiments, the mixed-reality device may be a mobile phone or tablet. In some embodiments, the mixed-reality device may be a combination of smart glasses (e.g., glasses with a camera, microphone, and/or speaker) and a mobile phone or tablet. The steps in method 1800 may be performed by different processors. For example, some steps may be performed by one or more processors located on the mixed-reality device, located on the mobile device, or located on a remote server. Such distribution of steps among different processors may improve computational efficiency and manage battery life on the mixed-reality device and/or mobile device.

At step 1810, method 1800 includes capturing real-time images of a product in surroundings of a user. Capturing may include using one or more outward-facing sensors on the device. The outward-facing sensors may be part of a camera (e.g., cameras 1708*a* and 1708*b*). Capturing may be performed automatically or may be initiated upon an instruction by the user. The images may be stored on a storage medium located in the device. In some embodiments, the outward-facing sensors may be the camera of a mobile phone facing away from the user. In some embodiments, a QR or other code associated with the product may be scanned, and the product may be identified using the code.

At step 1820, method 1800 includes identifying the product using an identification machine learning model. The identification machine learning model may be trained to output a product type or simply the identification of the outlines of a product from an image without necessarily naming the product type. The identification machine learning model may operate by utilizing a convolutional neural network (CNN) architecture, which is optimized for recognizing and classifying visual patterns in digital images. The model may be trained on a large dataset containing labeled images to learn the distinctive features associated with each category. During the training phase, the network extracts hierarchical features from input images using convolutional layers, pooling layers, and activation functions. These layers progressively identify edges, textures, shapes, and higher-level representations. The model adjusts its internal parameters through backpropagation to minimize the difference between its predictions and the actual labels in the dataset. Once trained, the model can accurately identify and classify new images by passing them through the network, where learned filters and weights analyze the input and produce a confidence score for each potential label. This approach enables efficient and accurate image recognition for object detection.

At step 1830, method 1800 includes obtaining user interaction data corresponding to previous images displayed on the device. The previous images displayed on the device may include images captured by the device. The previous images displayed on the device may include images corresponding to a set of products previously selected by the user. The user interaction data may be data indicating a level of interest in the previous images. For example, the user interaction data may be a particular wish list created by the user using previous images captured by the cameras or uploaded to the device. A user may create a wish list of other products (e.g., wish list 1102), a shopping cart, or some enumerated list.

In some embodiments, the user interaction data may include facial or audio expressions by the user captured by the device when the user is facing or in proximity to objects of the previous images. For example, the user interaction data may include facial expression data of the user captured using user-facing cameras of the device. Facial expression data may include a smile, a frown, pupil dilation, pupil contraction, eyelids opening, or eyelids closing. User interaction data may include auditory signals such as sighing, laughing, or an auditory tag uttered by the user (e.g., "like", "dislike", "want"). The user interaction data may include gestures, including hand gestures (e.g., FIG. 16).

At step 1840, method 1800 includes identifying available offers. Different entities may provide the available offers. In some embodiments, the available offers may be any offers stored in an offers database (e.g., offer repository 112) that may be active and not expired. In some embodiments, the available offers may include offers associated with the product, products in the wish list, products associated with previous images or associated with merchants providing any of these products.

At step 1850, method 1800 includes identifying a set of offers from the available offers. The set of offers may be identified by inputting the product, the user interaction data, and the available offers through an offer selection machine learning model trained to automatically select offers presentable to users through devices. In embodiments, the set of offers may be offers that are of a similar product category (e.g., furniture, clothing) as the product and/or products in the wish list or that are from a similar merchant type (e.g., housewares, department stores, sporting goods stores) as the merchant where the product is being sold or where the user is located.

An offer generation system, through an offer selection machine learning model or algorithm (such as the offer selection machine learning algorithm 206 described above in connection with FIGS. 2-3), may process the obtained user interaction data, available offers, and any offer parameters corresponding to the website or native application landing page being accessed to identify an initial set of offers that may be presented to the user through the website or native application landing page. As noted above, the offer selection machine learning algorithm is dynamically trained in real-time to process available user interaction data and/or user parameters, as well as the set of available offers corresponding to the defined offer parameters and any applicable rules, to identify different offers that may be presented to users. The offer selection machine learning algorithm may process the user interaction data from the user data connectivity platform or other third-party data broker and any user interaction data maintained by the payment instrument service (e.g., data corresponding to user interactions with websites, native application landing pages or interfaces implemented by the payment instrument service, etc.), as well as the set of available offers and the offer parameters to identify the initial set of offers that may be presented to the user through the website or native application landing page.

The offer selection machine learning model may be trained using a dataset of historical user interaction data and corresponding offers presented to different users. The dataset may include labels indicating whether the corresponding offers were accepted by the different users. For example, the training dataset may include similar interactions with different users, which may or may not include the particular user being presented the set of offers. These different users may have a device that captures an image and identifies a product in the image. The different users are then presented different offers based on the product and any interaction data (e.g., wish list, user profile, or other interaction). These offers may have outcomes of being accepted, declined, or saved for later. The offer selection machine learning model may be trained to determine the offers having a threshold likelihood of being accepted (or not declined) by the different users. The offer selection machine learning model may then identify these offers as the set of offers.

Identifying the set of offers may include identifying a set of rules corresponding to the available offers. The set of rules may define different requirements for presentation of different offers from the available offers. Identifying the set of offers may further include processing a set of rules with the user interaction data and the set of available offers through the offer selection machine learning model to identify the set of offers.

For instance, the offer generation system may obtain any rules that may be applicable towards the selection of a set of offers from the available offers maintained by the payment instrument service. As noted above, the payment instrument service, through an offer repository, may store offer-specific rules defined by the payment instrument service and/or the corresponding brand/other entity for determining the methods in which corresponding offers may be presented to users. For example, offer-specific rules may indicate the number of times that particular offers are required to be presented within a period of time to users through a website or native application implemented by the payment instrument service. As another illustrative example, offer-specific rules may indicate whether the corresponding offers are to be prioritized according to their expiration date. In another illustrative example, an offer-specific rule may indicate that an offer may only be presented on particular websites/native application landing pages. The offer repository may further maintain a set of global offer rules that may be applicable to all offers made available through the offer repository.

If the offer generation system determines that there are a set of rules that are applicable to the initial set of offers selected by the offer selection machine learning algorithm, the offer generation system may process these rules through the offer selection machine learning algorithm to cause the offer selection machine learning algorithm to select the final set of offers according to these applicable rules. Alternatively, if the offer generation system determines that there are no applicable rules, the offer generation system may use the initial set of offers selected by the offer selection machine learning algorithm for presentation to the user.

The set of offers may be categorized according to a set of offer parameters. The set of offers may be presented through the device according to the set of offer parameters. Offer parameters may include the types of offers made available (e.g., financing offers, discounts, deals, etc.), the offer categories (e.g., décor, automotive, apparel, electronics, health and fitness, home furnishings, etc.), the brands or other entities associated with the payment instrument service 102, and the like. Offer parameters may include any offer parameters described herein. For example, offer parameters may include any of the payment options with payment options 1406.

In response to any of steps 1820, 1830, 1840, and 1850, method 1800 may include generating a website or other landing page, either of which may be any such website or landing page described herein. The presentation of the set of offers may be in the generated website or landing page.

At step 1860, method 1800 may include presenting the set of offers through the device. In some embodiments, the set of offers may be displayed on a screen of the device (e.g., a mobile phone). In some embodiments, the set of offers may be audibly conveyed to the user through speakers. In some embodiments, the set of offers may be displayed on a mixed-reality headset. The set of offers may be displayed to be out of the main field of view of the user. For example, the set of offers may be displayed outside the middle 30, 40, 50, 60, 70, 80, 90, 100, 110, or 120 degrees of the field of view. The user may have to turn their head up, down, left, or right to see the set of offers. In some embodiments, an alert in the form of text or an icon may be displayed on the screen. The user may have to interact with the alert (clicking, pointing, or oral instruction) to expand to the set of offers. In some embodiments, the location of the alert or the set of offers within the display of a mixed-reality headset may be determined with a notification machine learning model. The notification machine learning model may be configured to present the alert or the set of offers in a location that has a threshold likelihood of interaction from the user. The notification machine learning model may be trained with a dataset including different locations of the alert or the set of offers and labels with the locations indicating whether the user interacted with the alert or the set of offers.

At step 1870, method 1800 may include monitoring in real-time user interaction with the set of offers. The real-time user interaction may include selecting an offer. Method 1800 may further include receiving the selection of an offer of the set of offers through the device. The real-time user interaction may be the user declining an offer of the set of offers.

In some embodiments, the real-time interaction may include features other than simply accepting or declining an offer. The user may decide to save an offer or ask for a reminder on an offer. Monitoring the real-time interaction may include determining the amount of time that a user spends considering an offer of the set of offers. A longer than expected time may indicate more interest from the user and an effective offer. In some embodiments, monitoring the real-time interaction may include monitoring facial expression data or auditory signals, as described herein. Certain facial expressions (e.g., smile, eyes widening) or auditory signals ("like") may be considered positive indications of the offer. Other facial expressions (e.g., frown, eyes narrowing) or auditory signals ("dislike") may be considered negative indications.

At step 1880, method 1800 may include updating the offer selection machine learning model according to the user interaction with the set of offers. Updating the offer selection machine learning model may include training the offer selection machine learning model using the offer and a label of the offer indicating a success of the offer. The success of the offer may be whether the offer was accepted or declined. In some embodiments, the success of the offer may include range of values indicating relative success. For example, accepted may be considered "1" while declined may be considered "0", but saving an offer for later may be considered "0.5". Facial expressions or auditory signals may also be within a range from declined to accepted. Facial expression interpretation may be processed by a facial expression machine learning model using images captured from different cameras facing the user or similar users.

In some embodiments, the user may provide feedback on the quality of the offers presented. For example, method 1800 may include providing a survey to the user to evaluate the quality of offers. The user may rank past offers provided. Method 1800 may include receiving this feedback and training the offer selection machine learning model with the feedback.

Method 1800 may include displaying, through the device, transaction terms for the product. Transaction terms may include the different payment options 1406. Transaction terms may include the type of payment (e.g., cash, credit, debit, store credit card, store rewards) and/or terms of financing (e.g., duration, periodic payment, interest rate, total price).

Method 1800 may include providing a total of a shopping cart of products (e.g., as explained with FIGS. 12 and 13). Method 1800 may also include determining if the product or a total price is within a user's budget. The determination may include comparing the price or a periodic payment price to a threshold set by the user or calculated based on the user's income and/or history of spending.

FIG. 19 is a block diagram illustrating using one or more machine learning models 1925 of a machine learning engine 1920 to analyze data to recognize a pattern 1980. Examples of the ML engine 1920 include the AI engine 155. The ML engine 1920 generates, trains, and uses the ML model(s) 1925 based on an initial training 1965 using training data 1910. The ML engine 1920 trains the ML model(s) 1925 to generate an analysis 1930 on input of sample data 1905 into the ML model(s) 1925. The sample data 1905 may include data that is extracted from the data stores (payment instrument service 102, parameter repository 106, offer repository 112, a system that performs the process 1900, and/or a computing system 1900). In some examples, the sample data 1905 may include data that is normalized, merged, and/or processed following extraction (e.g., by any of the systems listed above). In some examples, the sample data 1905 may include image data, user interaction data, and/or modifications (e.g., by any of the systems listed above). In some examples, the sample data 1905 may include some preliminary validation data and/or analysis data, such as summary data (e.g., by any of the systems listed above).

The analysis 1930 output by the ML model(s) 1925 can include at least one pattern 1980 identified as part of the analysis 1930 of the sample data 1905. The pattern 1980 can include any type of patterns, for instance including patterns associated with high (good) credit or confidence scores, patterns associated with low (poor) credit or confidence scores, patterns associated with fraud, patterns associated with trends, and/or patterns associated with deviations, mismatches, discrepancies, and/or disparities. In some examples, the analysis 1930 output by the ML model(s) 1925 can include various other elements of analyses described herein as output by the analysis system 910 or other systems listed above. For instance, the analysis 1930 output by the ML model(s) 1925 can include summaries, deviations, mismatches, discrepancies, disparities, trends, predictions based on trends, pivots, or combinations thereof. The analysis 1930 can include a confidence score or score, or an account score or score, as discussed herein. The analysis 1930 can be a determination as to the suitability of an offer or set of offers to a user. The suitability may be measured by a likelihood of the user accepting the offer or not declining the offer.

The training data 1910 that the ML engine 1920 uses to train the ML model(s) 1925 includes sample data (e.g., akin to the sample data 1905) as well as pre-generated assessment(s) corresponding to the sample data (e.g., akin to the analysis 1930 corresponding to the sample data 1905). Over the course of the initial training 1965, the ML model(s) 1925 develop hidden layers between input layers and output layers, and/or weights and/or connections between nodes of the various layers, that each relate to various aspects of the analysis 1930, such as any of the aspects described herein (e.g., related to various types of patterns that can be detected and characteristics of those types of patterns).

Identifying the analysis 1930 can correspond to identifying the set of offers using the offer selection machine learning model. Once the one or more ML models 1925 identify the analysis 1930, the analysis 1930 (e.g., the set of offers) can be output to a user (e.g., using a display or speaker).

In some examples, the ML engine 1920 can continue to train and/or update the ML model(s) 1925 over time, for instance based on validation 1975 using the analysis 1930 and the sample data 1905. In some examples, an analysis 1940 of the sample data 1905 (separate from the analysis 1930 generated by the ML model(s) 1925) may be provided to the ML engine 1920 use in performing the validation 1975. In some examples, the analysis 1940 may be generated by a different entity than the ML model(s) 1925, for instance a different set of ML model(s) (not pictured) or one or more trusted human analysts. If, during validation 1915, the ML engine 1920 determines that the analysis 1930 generated by the ML model(s) 1925 matches the analysis 1940, the ML engine 1920 can treat this as positive feedback, and can perform further training 1955 of the ML model(s) 1935 based on the analysis 1930, the sample data 1905, and/or the analysis 1940, for instance to strengthen and/or reinforce weights associated with generating the analysis 1930 in the ML model(s) 1925, and/or to weaken or remove other weights other than those associated with generating the analysis 1930, in the ML model(s) 1925. If, during validation 1915, the ML engine 1920 determines that the analysis 1930 generated by the ML model(s) 1925 differs from the analysis 1940, the ML engine 1920 can treat this as negative feedback, and can perform further training 1955 of the ML model(s) 1935 based on the analysis 1930, the sample data 1905, and/or the analysis 1940, for instance to weaken and/or remove weights associated with generating the analysis 1930 in the ML model(s) 1925, and/or to strengthen and/or reinforce other weights other than those associated with generating the analysis 1930 in the ML model(s) 1925.

In some examples, the ML engine 1920 receives feedback 1950 about the analysis 1930. The feedback can include a reaction by a user of a user device via a user interface, a reaction by a user determined based on sensor data from a user device, and/or decisions by a user and/or user device as whether or not to use the analysis 1930 for a further application. Positive feedback can be used to strengthen and/or reinforce weights associated with generating the analysis 1930 in the ML model(s) 1925, and/or to weaken or remove other weights other than those associated with generating the analysis 1930 in the ML model(s) 1925. Negative feedback can be used to weaken and/or remove weights associated with generating the analysis 1930 in the ML model(s) 1925, and/or to strengthen and/or reinforce other weights other than those associated with generating the analysis 1930 in the ML model(s) 1925.

A "machine learning model" (ML model) can refer to a software module configured to be run on one or more processors to provide a classification or numerical value of a property of one or more samples. An ML model can be generated using sample data (e.g., training data) to make predictions on test data. One example is an unsupervised learning model. Another example type of model is supervised learning that can be used with embodiments of the present disclosure. Example supervised learning models may include different approaches and algorithms including analytical learning, statistical models, artificial neural network, backpropagation, boosting (meta-algorithm), Bayesian statistics, case-based reasoning, decision tree learning, inductive logic programming, Gaussian process regression, genetic programming, group method of data handling, kernel estimators, learning automata, learning classifier systems, minimum message length (decision trees, decision graphs, etc.), multilinear subspace learning, naive Bayes classifier, maximum entropy classifier, conditional random field, nearest neighbor algorithm, probably approximately correct learning (PAC) learning, ripple down rules, a knowledge acquisition methodology, symbolic machine learning algorithms, subsymbolic machine learning algorithms, minimum complexity machines (MCM), random forests, ensembles of classifiers, ordinal classification, data pre-processing, handling imbalanced datasets, statistical relational learning, or Proaftn, a multicriteria classification algorithm. The model may include linear regression, logistic regression, deep recurrent neural network (e.g., long short term memory, LSTM), hidden Markov model (HMM), linear discriminant analysis (LDA), k-means clustering, density-based spatial clustering of applications with noise (DB-SCAN), random forest algorithm, support vector machine (SVM), or any model described herein. Supervised learning models can be trained in various ways using various cost/loss functions that define the error from the known label (e.g., least squares and absolute difference from known classification) and various optimization techniques, e.g., using backpropagation, steepest descent, conjugate gradient, and Newton and quasi-Newton techniques.

Figure 20:
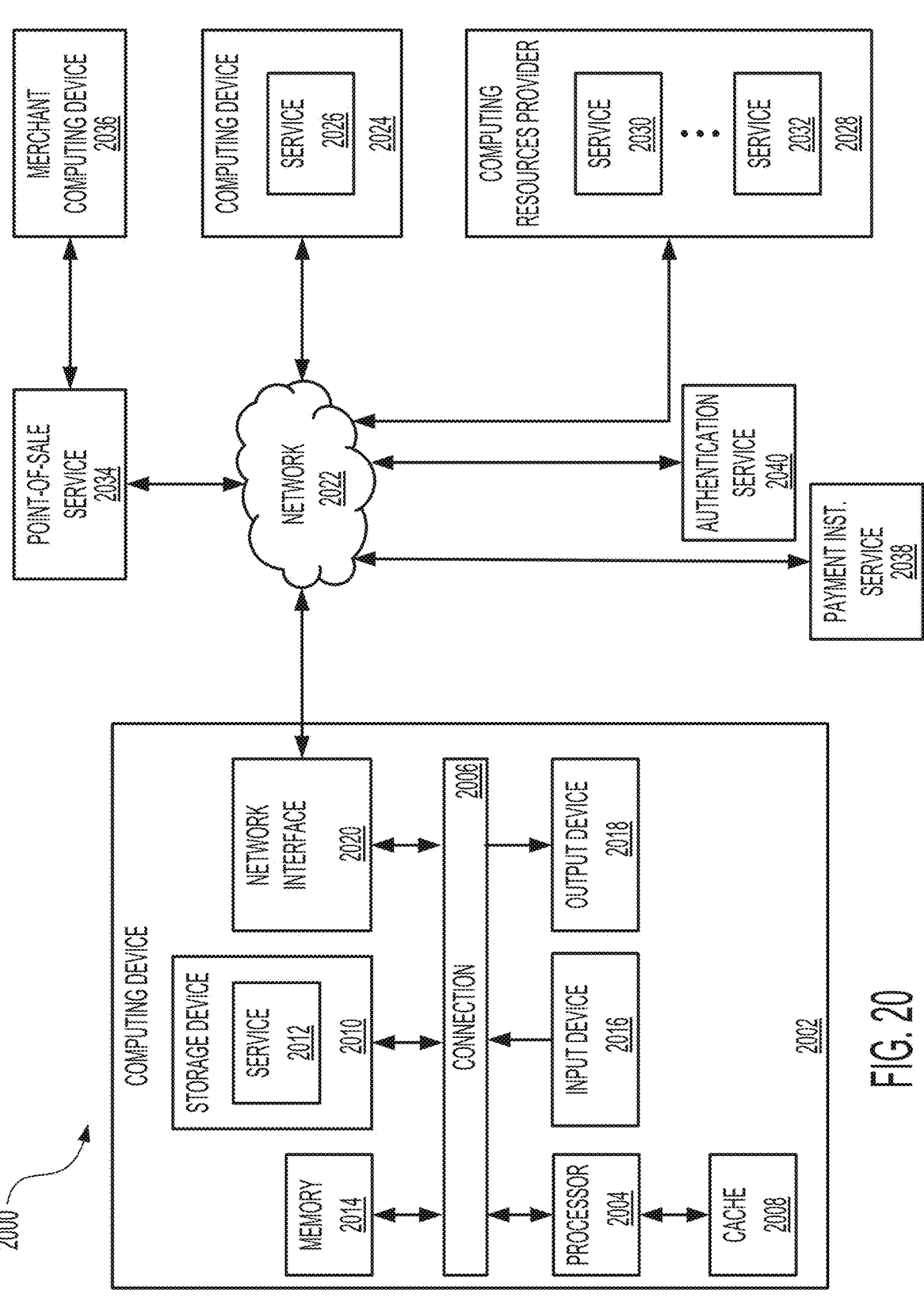
FIG. 20 shows a computing system architecture including various components in electrical communication with each other using a connection in accordance with various embodiments.

FIG. 20 illustrates a computing system architecture 2000, including various components in electrical communication with each other, in accordance with some embodiments. The example computing system architecture 2000 illustrated in FIG. 20 includes a computing device 2002, which has various components in electrical communication with each other using a connection 2006, such as a bus, in accordance with some implementations. Computing device 2002 may be a mixed-reality device, including any described herein. The example computing system architecture 2000 includes a processing unit 2004 that is in electrical communication with various system components, using the connection 2006, and including the system memory 2014. In some embodiments, the system memory 2014 includes read-only memory (ROM), random-access memory (RAM), and other such memory technologies including, but not limited to, those described herein. In some embodiments, the example computing system architecture 2000 includes a cache 2008 of high-speed memory connected directly with, in close proximity to, or integrated as part of the processor 2004. The system architecture 2000 can copy data from the memory 2014 and/or the storage device 2010 to the cache 2008 for quick access by the processor 2004. In this way, the cache 2008 can provide a performance boost that decreases or eliminates processor delays in the processor 2004 due to waiting for data. Using modules, methods and services such as those described herein, the processor 2004 can be configured to perform various actions. In some embodiments, the cache 2008 may include multiple types of cache including, for example, level one (L1) and level two (L2) cache. The memory 2014 may be referred to herein as system memory or computer system memory. The memory 2014 may include, at various times, elements of an operating system, one or more applications, data associated with the operating system or the one or more applications, or other such data associated with the computing device 2002.

Other system memory 2014 can be available for use as well. The memory 2014 can include multiple different types of memory with different performance characteristics. The processor 2004 can include any general purpose processor and one or more hardware or software services, such as service 2012 stored in storage device 2010, configured to control the processor 2004 as well as a special-purpose processor where software instructions are incorporated into the actual processor design. The processor 2004 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 2004 can be a microprocessor, a microcontroller, a digital signal processor ("DSP"), or a combination of these and/or other types of processors. In some embodiments, the processor 2004 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 2000, an input device 2016 can represent any number of input mechanisms, such as a microphone for speech, a touch-sensitive screen for gesture or graphical input, keyboard, mouse, motion input, pen, and other such input devices. An output device 2018 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 2000. In some embodiments, the input device 2016 and/or the output device 2018 can be coupled to the computing device 2002 using a remote connection device such as, for example, a communication interface such as the network interface 2020 described herein. In such embodiments, the communication interface can govern and manage the input and output received from the attached input device 2016 and/or output device 2018. As may be contemplated, there is no restriction on operating on any particular hardware arrangement and accordingly the basic features here may easily be substituted for other hardware, software, or firmware arrangements as they are developed.

In some embodiments, the storage device 2010 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described herein, the storage device 2010 can include hardware and/or software services such as service 2012 that can control or configure the processor 2004 to perform one or more functions including, but not limited to, the methods, processes, functions, systems, and services described herein in various embodiments. In some embodiments, the hardware or software services can be implemented as modules. As illustrated in example computing system architecture 2000, the storage device 2010 can be connected to other parts of the computing device 2002 using the system connection 2006. In an embodiment, a hardware service or hardware module such as service 2012, that performs a function can include a software component stored in a non-transitory computer-readable medium that, in connection with the necessary hardware components, such as the processor 2004, connection 2006, cache 2008, storage device 2010, memory 2014, input device 2016, output device 2018, and so forth, can carry out the functions such as those described herein.

The disclosed payment instrument service, the sub-systems and other processes of the payment instrument service, and the systems and methods for dynamically, and in real-time, selecting offers that may be presented to users according to any user interaction data associated with these users can be performed using a computing system such as the example computing system illustrated in FIG. 20, using one or more components of the example computing system architecture 2000. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and systems for dynamically, and in real-time, selecting offers that may be presented to users according to any user interaction data associated with these users described herein by, for example, executing code using a processor such as processor 2004 wherein the code is stored in memory such as memory 2014 as described herein. One or more of a user device, a provider server or system, a database system, or other such devices, services, or systems may include some or all of the components of the computing system such as the example computing system illustrated in FIG. 20, using one or more components of the example computing system architecture 2000 illustrated herein. As may be contemplated, variations on such systems can be considered as within the scope of the present disclosure.

This disclosure contemplates the computer system taking any suitable physical form. As example and not by way of limitation, the computer system can be a mixed-reality device, an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 2028. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The memory 2014 can be coupled to the processor 2004 by, for example, a connector such as connector 2006, or a bus. As used herein, a connector or bus such as connector 2006 is a communications system that transfers data between components within the computing device 2002 and may, in some embodiments, be used to transfer data between computing devices. The connector 2006 can be a data bus, a memory bus, a system bus, or other such data transfer mechanism.

The memory 2014 can include RAM including, but not limited to, dynamic RAM (DRAM), static RAM (SRAM), synchronous dynamic RAM (SDRAM), non-volatile random access memory (NVRAM), and other types of RAM.

The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 2014 can also include magnetic or optical data storage media including read-only (e.g., CD ROM and DVD ROM) or otherwise (e.g., CD or DVD). The memory can be local, remote, or distributed.

As described herein, the connector 2006 (or bus) can also couple the processor 2004 to the storage device 2010, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 2010. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 2006 can also couple the processor 2004 to a network interface device such as the network interface 2020. The interface can include one or more of a modem or other such network interfaces including, but not limited to those described herein. It will be appreciated that the network interface 2020 may be considered to be part of the computing device 2002 or may be separate from the computing device 2002. The network interface 2020 can include one or more of an analog modem, Integrated Services Digital Network (ISDN) modem, cable modem, token ring interface, satellite transmission interface, or other interfaces for coupling a computer system to other computer systems. In some embodiments, the network interface 2020 can include one or more input and/or output (I/O) devices. The I/O devices can include, by way of example but not limitation, input devices such as input device 2016 and/or output devices such as output device 2018. For example, the network interface 2020 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. The file management system can be stored in the non-volatile memory and/or drive unit and can cause the processor to execute the various acts required by the operating system to input and output data and to store data in the memory, including storing files on the non-volatile memory and/or drive unit.

In some embodiments, the computing device 2002 can be connected to one or more additional computing devices such as computing device 2024 via a network 2022 using a connection such as the network interface 2020. In such embodiments, the computing device 2024 may execute one or more services 2026 to perform one or more functions under the control of, or on behalf of, programs and/or services operating on computing device 2002. In some embodiments, a computing device such as computing device 2024 may include one or more of the types of components as described in connection with computing device 2002 including, but not limited to, a processor such as processor 2004, a connection such as connection 2006, a cache such as cache 2008, a storage device such as storage device 2010, memory such as memory 2014, an input device such as input device 2016, and an output device such as output device 2018. In such embodiments, the computing device 2024 can carry out the functions such as those described herein in connection with computing device 2002. In some embodiments, the computing device 2002 can be connected to a plurality of computing devices such as computing device 2024, each of which may also be connected to a plurality of computing devices such as computing device 2024. Such an embodiment may be referred to herein as a distributed computing environment.

The network 2022 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 2022 can be wired connections, wireless connections, or combinations thereof. Communications via the network 2022 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 2022, within the computing device 2002, within the computing device 2024, or within the computing resources provider 2028 can include information, which also may be referred to herein as content. The information may include text, graphics, audio, video, haptics, and/or any other information that can be provided to a user of the computing device such as the computing device 2002. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 2002 and presented to a user of the computing device 2002 using forms that are perceptible via sight, sound, smell, taste, touch, or other such mechanisms. In some embodiments, communications over the network 2022 can be received and/or processed by a computing device configured as a server. Such communications can be sent and received using PUP: Hypertext Preprocessor ("PUP"), Python™, Ruby, Perl® and variants, Java®, HTML, XML, or another such server-side processing language.

In some embodiments, the computing device 2002 and/or the computing device 2024 can be connected to a computing resources provider 2028 via the network 2022 using a network interface such as those described herein (e.g. network interface 2020). In such embodiments, one or more systems (e.g., service 2030 and service 2032) hosted within the computing resources provider 2028 (also referred to herein as within "a computing resources provider environment") may execute one or more services to perform one or more functions under the control of, or on behalf of, programs and/or services operating on computing device 2002 and/or computing device 2024. Systems such as service 2030 and service 2032 may include one or more computing devices such as those described herein to execute computer code to perform the one or more functions under the control of, or on behalf of, programs and/or services operating on computing device 2002 and/or computing device 2024.

For example, the computing resources provider 2028 may provide a service, operating on service 2030 to store data for the computing device 2002 when, for example, the amount of data that the computing device 2002 exceeds the capacity of storage device 2010. In another example, the computing resources provider 2028 may provide a service to first instantiate a virtual machine (VM) on service 2032, use that VM to access the data stored on service 2032, perform one or more operations on that data, and provide a result of those one or more operations to the computing device 2002. Such operations (e.g., data storage and VM instantiation) may be referred to herein as operating "in the cloud," "within a cloud computing environment," or "within a hosted virtual machine environment," and the computing resources provider 2028 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 2028 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, augmented reality (AR) systems, and mixed-reality (MR) devices. Various techniques to facilitate such services include, but are not limited to, virtual machines, virtual storage, database services, system schedulers (e.g., hypervisors), resource management systems, various types of short-term, mid-term, long-term, and archival storage devices, etc.

As may be contemplated, the systems such as service 2030 and service 2032 may implement versions of various services (e.g., the service 2012 or the service 2026) on behalf of, or under the control of, computing device 2002 and/or computing device 2024. Such implemented versions of various services may involve one or more virtualization techniques so that, for example, it may appear to a user of computing device 2002 that the service 2012 is executing on the computing device 2002 when the service is executing on, for example, service 2030. As may also be contemplated, the various services operating within the computing resources provider 2028 environment may be distributed among various systems within the environment as well as partially distributed onto computing device 2024 and/or computing device 2002.

In an embodiment, the computing device 2002 can be connected to one or more additional computing devices and/or services such as merchant computing device 2036 and/or a point-of-sale service 2034 via the network 2022 and using a connection such as the network interface 2020. In an embodiment, the point-of-sale service 2034 is separate from the merchant computing device 2036. In an embodiment, the point-of-sale service 2034 is executing on the merchant computing device 2036. In an embodiment, the point-of-sale service 2034 is executing as one or more services (e.g., the service 2030 and/or the service 2032) operating within the environment of the computing resources provider. As used herein, a point-of-sale service 2034 is a service used by one or more merchants to manage sales transactions for customers, to process payment transactions for customers (e.g., payment instrument transactions), to manage inventory for merchants, to identify customers based on, for example, customer loyalty programs, and other such tasks.

In an embodiment, a customer and/or a merchant uses the merchant computing device 2036 to interact with the point-of-sale service 2034. In an embodiment, the merchant computing device 2036 is a dedicated point-of-service (POS) terminal. In an embodiment, the merchant computing device 2036 is a cash register system. In an embodiment, the merchant computing device 2036 is an application or web service operating on a computing device such as the computing device 2002 described herein. In such an embodiment, the application or web service may be provided by a financial services system (e.g., a bank, a transaction processing system, an inventory management system, or some other such financial services system). In an embodiment, the merchant computing device 2036 includes an auxiliary device or system to execute tasks associated with the point-of-sale service 2034 (e.g., a payment instrument processing device attached to a smart phone or tablet). In an embodiment, the merchant computing device 2036 is a kiosk that is located at a merchant location (e.g., in a merchant's "brick and mortar" store), in a high traffic area (e.g., in a mall or in an airport concourse), or at some other such location. In such an embodiment, the kiosk may include additional branding elements to allow associating the kiosk with a vendor. In an embodiment, the merchant computing device 2036 is a virtual device (e.g., a virtual kiosk) such as the virtual devices described herein. Although not illustrated here, in an embodiment, the merchant computing device 2036 may be one of a plurality of devices that may be interconnected using a network such as the network 2022.

In an embodiment, the computing device 2002 can be connected to one or more additional computing devices and/or services such as a payment instrument service 2038 via the network 2022 and using a connection such as the network interface 2020. In an embodiment, the payment instrument service 2038 connects directly with the point-of-sale service 2034. In an embodiment, elements of the payment instrument service 2038 are executing on the merchant computing device 2036. In an embodiment, the payment instrument service 2038 is executing as one or more services (e.g., the service 2030 and/or the service 2032) operating within the environment of the computing resources provider. As used herein, a payment instrument service 2038 is a service used by various entities (e.g., merchants, financial institutions, and account holders) to manage payment instrument transactions (e.g., sales and payments), process payment, to issue payment instruments to account holders, and to perform other such actions.

In an embodiment, elements of the payment instrument service 2038 are running as an application or web service operating on a computing device such as the computing device 2002 described herein. In such an embodiment, the application or web service of the payment instrument service 2038 may be provided by a financial services system (e.g., a bank, a transaction processing system, an inventory management system, or some other such financial services system). In an embodiment, elements of the payment instrument service 2038 are running on an auxiliary device or system configured to execute tasks associated with the payment instrument service 2038 (e.g., uses a payment instrument processing device attached to a smart phone or tablet). In an embodiment, elements of the payment instrument service 2038 are running on virtual device such as those described herein. Although not illustrated here, in an embodiment, the payment instrument service 2038 may be running on one or more of a plurality of devices that may be interconnected using a network such as the network 2022.

In an embodiment, the computing device 2002 can be connected to one or more additional computing devices and/or services such as an authentication service 2040 via the network 2022 and using a connection such as the network interface 2020. In an embodiment, the authentication service 2040 is an element of the payment instrument service 2038. In an embodiment, the authentication service 2040 is separate from the payment instrument service 2038. In an embodiment, the authentication service 2040 connects directly with the point-of-sale service 2034. In an embodiment, elements of the authentication service 2040 are executing on the merchant computing device 2036. In an embodiment, the authentication service 2040 is executing as one or more services (e.g., the service 2030 and/or the service 2032) operating within the environment of the computing resources provider. As used herein, an authentication service 2040 is a service used by one or more merchants to authenticate transactions associated with payment instruments. An authentication service may be a third-party service that provides secure and verified authorization of the transactions.

In an embodiment, elements of the authentication service 2040 are running as an application or web service operating on a computing device such as the computing device 2002 described herein. In such an embodiment, the application or web service of the authentication service 2040 may be provided by a financial services system (e.g., a bank, a transaction processing system, an inventory management system, or some other such financial services system). In an embodiment, elements of the authentication service 2040 are running on an auxiliary device or system configured to execute tasks associated with the authentication service 2040 (e.g., provides authentication using payment instrument processing device attached to a smart phone or tablet). In an embodiment, elements of the authentication service 2040 are running on virtual device such as those described herein. Although not illustrated here, in an embodiment, the authentication service 2040 may be running on one or more of a plurality of devices that may be interconnected using a network such as the network 2022.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a keypad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 2002) include, but is not limited to, mixed-reality devices, smart glasses, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described herein. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram. Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, etc.), a wearable device, a mixed-reality device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 2002.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to" and "comprising"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set $\{A, B, C\}$, namely: $\{A\}$, $\{B\}$, $\{C\}$, $\{A, B\}$, $\{A, C\}$, $\{B, C\}$, or $\{A, B, C\}$) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described herein. The elements and acts of the various examples described herein can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described herein to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described herein may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use.

Various embodiments of the disclosure are discussed in detail. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

What is claimed is:

1. A computer-implemented method, the method comprising:

capturing real-time images of a product in surroundings of a user, wherein capturing includes using one or more outward-facing sensors on a device;

identifying the product by using an identification machine learning model;

obtaining user interaction data corresponding to previous images displayed on the device;

identifying available offers;

identifying a set of offers from the available offers, wherein the set of offers are identified by inputting the product, the user interaction data, and the available offers through an offer selection machine learning model trained to automatically select offers presentable to users through devices, and wherein the offer selection machine learning model is trained using a dataset of historical interaction data and corresponding offers presented to different users;

presenting the set of offers through the device;

monitoring in real-time user interaction with the set of offers; and updating the offer selection machine learning model according to the real-time user interaction with the set of offers.

2. The computer-implemented method of claim 1, further comprising:

receiving a selection of an offer of the set of offers through the device.

3. The computer-implemented method of claim 1, wherein identifying the set of offers further comprises:

identifying a set of rules corresponding to the available offers, wherein the set of rules define different requirements for presentation of different offers from the available offers.

4. The computer-implemented method of claim 1, wherein identifying the set of offers further comprises:

processing a set of rules with the user interaction data and the available offers through the offer selection machine learning model to identify the set of offers.

5. The computer-implemented method of claim 1, wherein the set of offers is categorized according to a set of offer parameters, and wherein the set of offers is presented through the device according to the set of offer parameters.

6. The computer-implemented method of claim 1, wherein:

the device is a mixed-reality device, and the previous images displayed on the device include images captured by the mixed-reality device.

7. The computer-implemented method of claim 1, wherein:

the previous images displayed on the device include images corresponding to a set of products previously selected by the user.

8. The computer-implemented method of claim 1, further comprising:

displaying, through the device, transaction terms for the product.

9. The computer-implemented method of claim 1, wherein the available offers correspond to different entities providing the available offers.

10. The computer-implemented method of claim 1, wherein the dataset includes labels indicating whether the corresponding offers were accepted by the different users.

11. The computer-implemented method of claim 1, wherein the user interaction data comprises facial expression data of the user captured using user-facing cameras of the device.

12. The computer-implemented method of claim 1, wherein:

the real-time user interaction is the user declining an offer of the set of offers, and updating the offer selection machine learning model includes training the offer selection machine learning model with the offer and a label of the offer being declined.

13. A system comprising:

one or more processors; and a non-transitory computer readable medium storing a plurality of instructions that, as a result of being executed by the one or more processors, causes the system to perform a method including:

capturing real-time images of a product in surroundings of a user, wherein capturing includes using one or more outward-facing sensors on a device;

identifying the product by using an identification machine learning model;

obtaining user interaction data corresponding to previous images displayed on the device;

identifying available offers;

identifying a set of offers from the available offers, wherein the set of offers are identified by inputting the product, the user interaction data, and the available offers through an offer selection machine learning model trained to automatically select offers presentable to users through devices, and wherein the offer selection machine learning model is trained using a dataset of historical user interaction data and corresponding offers presented to different users;

presenting the set of offers through the device;

monitoring in real-time user interaction with the set of offers; and updating the offer selection machine learning model according to the real-time user interaction with the set of offers.

14. The system of claim 13, wherein:

the system is a mixed-reality device, and the previous images displayed on the device include images captured by the mixed-reality device.

15. The system of claim 13, wherein:

the previous images displayed on the device include images corresponding to a set of products previously selected by the user.

16. The system of claim 13, wherein the previous images displayed on the device include images corresponding to a set of products previously selected by the user.

17. A non-transitory, computer-readable medium storing a plurality of instructions that, as a result of being executed by one or more processors of a computer system, cause the computer system to perform a method comprising:

capturing real-time images of a product in surroundings of a user, wherein capturing includes using one or more outward-facing sensors on a device;

identifying the product by using an identification machine learning model;

obtaining user interaction data corresponding to previous images displayed on the device;

identifying available offers;

identifying a set of offers from the available offers, wherein the set of offers are identified by inputting the product, the user interaction data, and the available offers through an offer selection machine learning model trained to automatically select offers presentable to users through devices, and wherein the offer selection machine learning model is trained using a dataset of historical user interaction data and corresponding offers presented to different users;

presenting the set of offers through the device;

monitoring in real-time user interaction with the set of offers; and updating the offer selection machine learning model according to the real-time user interaction with the set of offers.

18. The non-transitory, computer-readable medium of claim 17, wherein the method further comprises displaying, through the device, transaction terms for the product.

19. The non-transitory, computer-readable medium of claim 17, wherein the method further comprises receiving a selection of an offer of the set of offers through the device.

20. The non-transitory, computer-readable medium of claim 17, the real-time user interaction is the user declining an offer of the set of offers, and updating the offer selection machine learning model includes training the offer selection machine learning model with the offer and a label of the offer being declined.

* * * * *